United States Patent
Choi et al.

(10) Patent No.: US 11,464,035 B2
(45) Date of Patent: Oct. 4, 2022

(54) METHOD FOR TRANSMITTING AND RECEIVING SHARED CHANNEL IN WIRELESS COMMUNICATION SYSTEM, AND DEVICE SUPPORTING SAME

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 17/514,157

(22) Filed: Oct. 29, 2021

(65) Prior Publication Data
US 2022/0116968 A1    Apr. 14, 2022

Related U.S. Application Data

(63) Continuation of application No. PCT/KR2020/005924, filed on May 4, 2020.

(30) Foreign Application Priority Data

May 2, 2019 (KR) .................. 10-2019-0051862
May 9, 2019 (KR) .................. 10-2019-0054577
Nov. 7, 2019 (KR) .................. 10-2019-0141791

(51) Int. Cl.
*H04W 72/12* (2009.01)
*H04W 72/04* (2009.01)

(52) U.S. Cl.
CPC .... *H04W 72/1268* (2013.01); *H04W 72/0413* (2013.01); *H04W 72/1278* (2013.01)

(58) Field of Classification Search
CPC ......... H04W 72/1268; H04W 72/0413; H04W 72/1278
See application file for complete search history.

(56) References Cited

U.S. PATENT DOCUMENTS

| 11,025,456 B2 | 6/2021 | Chatterjee et al. |
| 2017/0325225 A1 | 11/2017 | Dinan |

FOREIGN PATENT DOCUMENTS

| WO | 2018/128029 | 7/2018 |
| WO | 2020/221055 | 11/2020 |
| WO | 2020/222625 | 11/2020 |

OTHER PUBLICATIONS

LG Electronics, Channel access procedure for NR-U (Year: 2019).*
(Continued)

*Primary Examiner* — Ayanah S George
(74) *Attorney, Agent, or Firm* — Ladas & Parry, LLP

(57) ABSTRACT

In a method for transmitting and receiving a shared channel in a wireless communication system, the method performed by a terminal is characterized by comprising: a step for receiving, from a base station, first resource information for transmitting and receiving a shared channel; and a step for receiving, from the base station, the shared channel on a first resource determined on the basis of the first resource information or transmitting, to the base station, the shared channel on the first resource.

20 Claims, 33 Drawing Sheets

(56) References Cited

OTHER PUBLICATIONS

Intel Corporation, Enhancements to configured grants for NR-unlicensed (Year: 2019).*
International Search Report for PCT/KR2020/005924 dated Aug. 24, 2020 and its English translation from WIPO (now published as WO 2020/222625).
Written Opinion of the International Searching Authority for PCT/KR2020/005924 dated Aug. 24, 2020 (now published as WO 2020/222625) and its English translation by Google Translate.
LG Electronics. Channel access procedure for NR-U. R1-1902040. 3GPP TSG RAN WG1 Meeting #96, Athens, Greece, Feb. 16, 2019.
Intel Corp. Enhancements to configured grants for NR-unlicensed. R1-1904288. 3GPP TSG RAN WG1 Meeting #96bis. Xi'an, China, Mar. 30, 2019.
ZTE et al. Remaining issues for data resource allocation. R1-1803796. 3GPP TSG RAN WG1 Meeting #92bis. Sanya, China, Apr. 6, 2018.
ZTE et al. considerations on resource allocation issues. R1-1719491. 3 GPP TSG RAN WG1 Meeting #91, Reno, USA, Nov. 17, 2017.
Office Action dated Mar. 25, 2022 for Indian Patent Application No. 202127050320.
Office Action dated Jul. 8, 2022 for Korean Patent Application No. 10-2021-7035089 and its English translation provided by Applicant's foreign counsel.
Qualcomm Incorporated: "PDCCH Enhancements for eURLLC", 3GPP TSG-RAN WG1 Meeting #96b, R1-1905019, Apr. 8-12, 2019, Xi'an, China, pp. 1-11.
OPPO: "On Cross-carrier Scheduling with Different Numerologies", 3GPP TSG RAN WG1 #96, R1-1902709, Athens, Greece, Feb. 25-Mar. 1, 2019, pp. 1-5.
VIVO: "Support of cross-carrier scheduling with mix numerologies", R1-1900155, 3 GPP TSG RAN WG1 Ad-Hoc Meeting 1901, Taipei, Jan. 21-25, 2019, pp. 1-6.
Nokia, Nokia Shanghai Bell: Summary of contributions on potential enhancements for PUSCH for NR URLLC (AI 7.2.6.1.3), 3GPP TSG-RAN WG1 Meeting #96, R1-1903368, Athens, Greece, Feb. 25-Mar. 1, 2019, pp. 1-26.
Office Action dated Jul. 4, 2022 for Japanese Patent Application No. 2021-565089 and its English translation provided by Applicant's foreign counsel.
3GPP TS 38.214 V15.5.0: $3^{rd}$ Generation Partnership Project; Technical Specification Group Radio Access Network; NR; Physical layer procedures for data (Release 15), Mar. 27, 2019, pp. 1-103.
3GPP TS 38.211 V15.5.0: $3^{rd}$ Generation Partnership Project; Technical Specification Group Radio Access Network; NR; Physical channels and modulation (Release 15), Mar. 27, 2019, pp. 1-96.

* cited by examiner

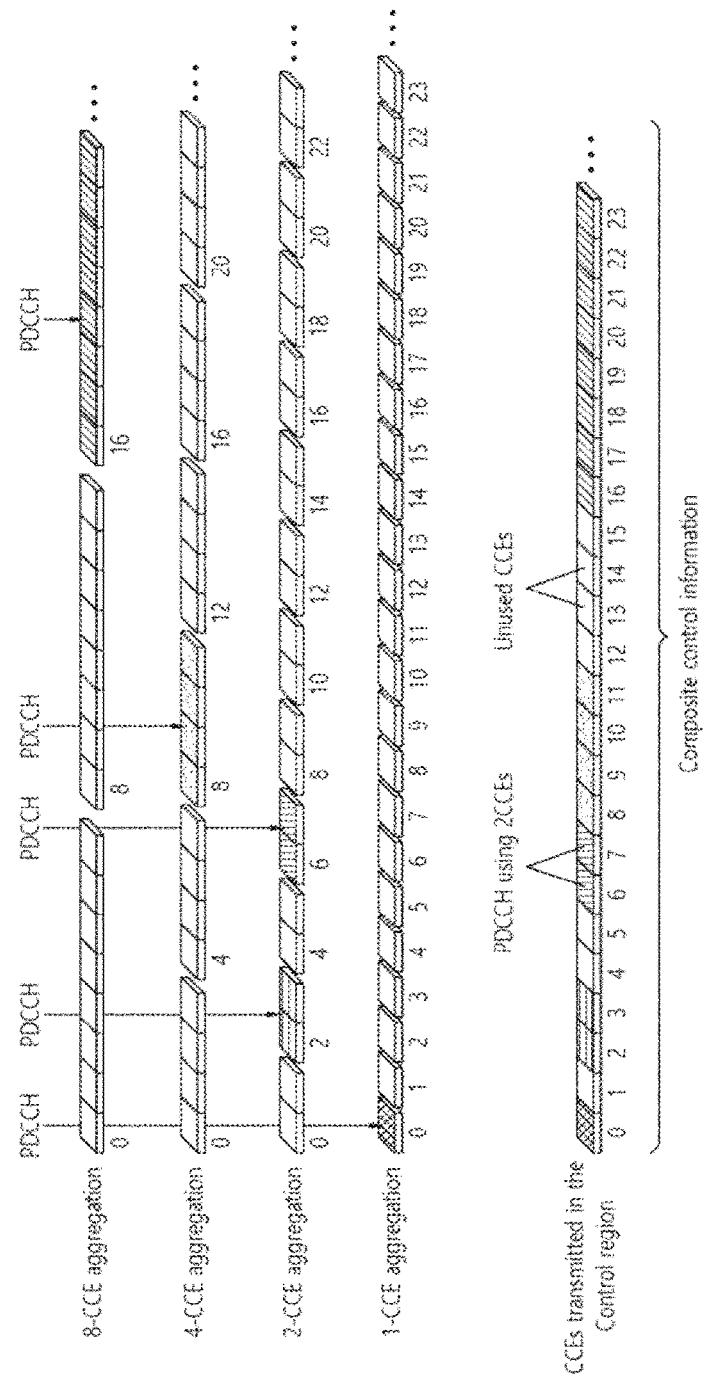

FIG. 13
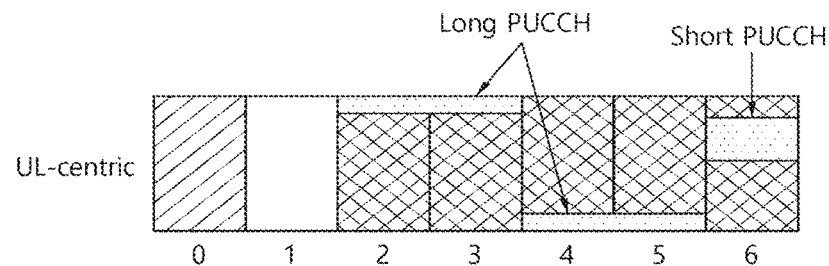
(a)
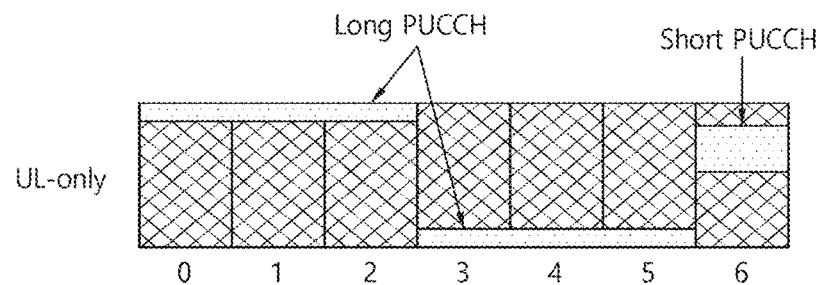
(b)
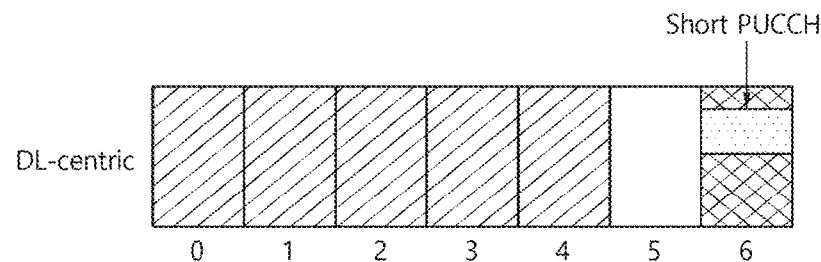
(c)

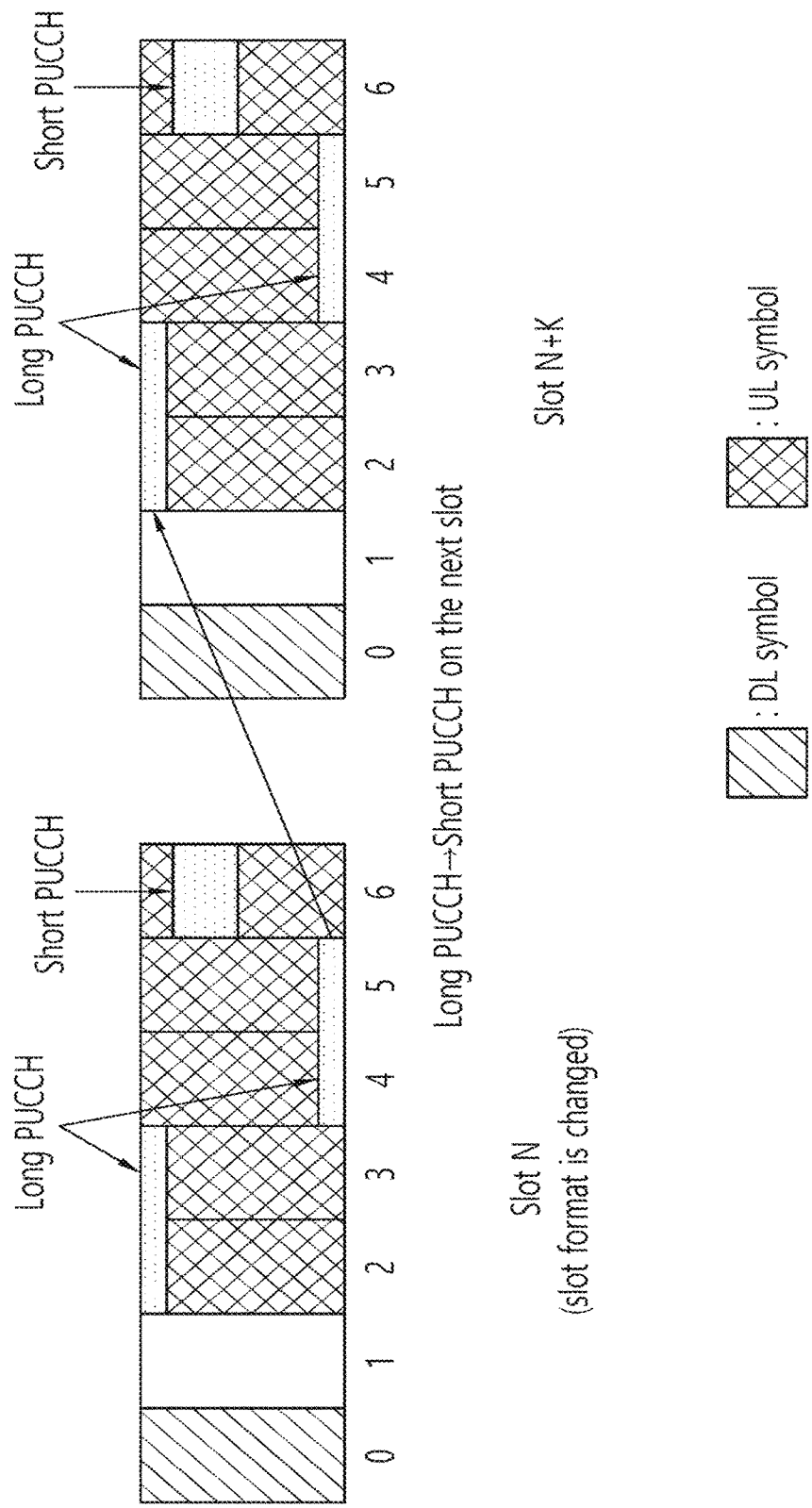

FIG. 16
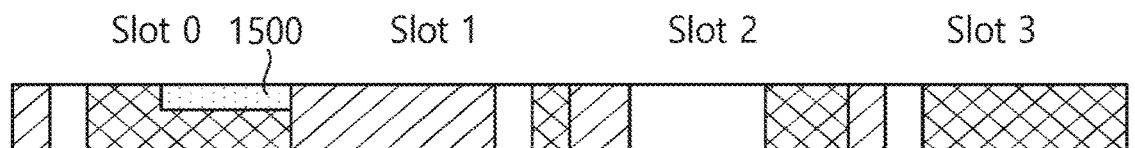
(a)
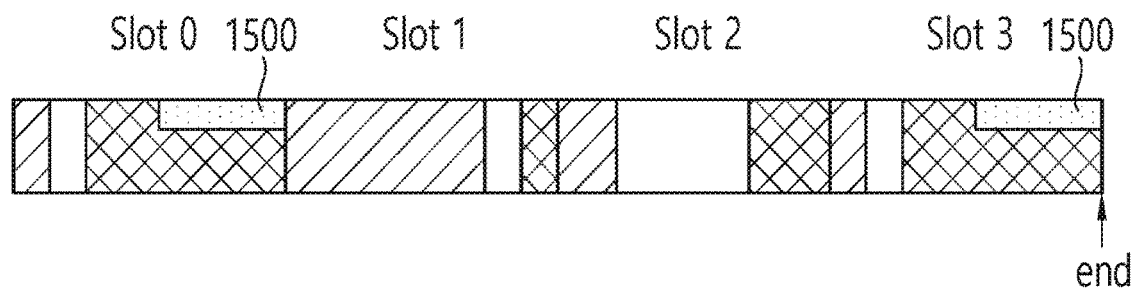
(b)
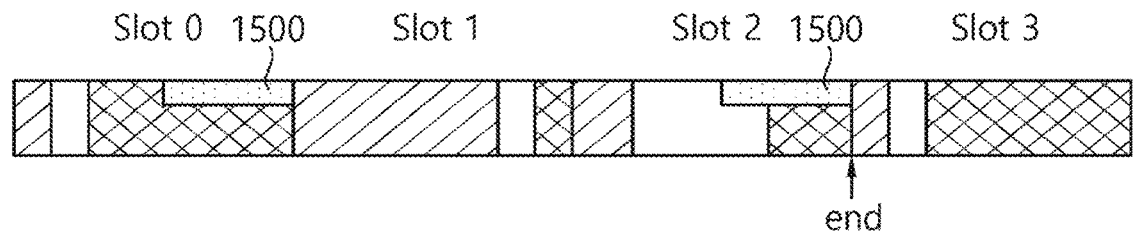
(c)

FIG. 17
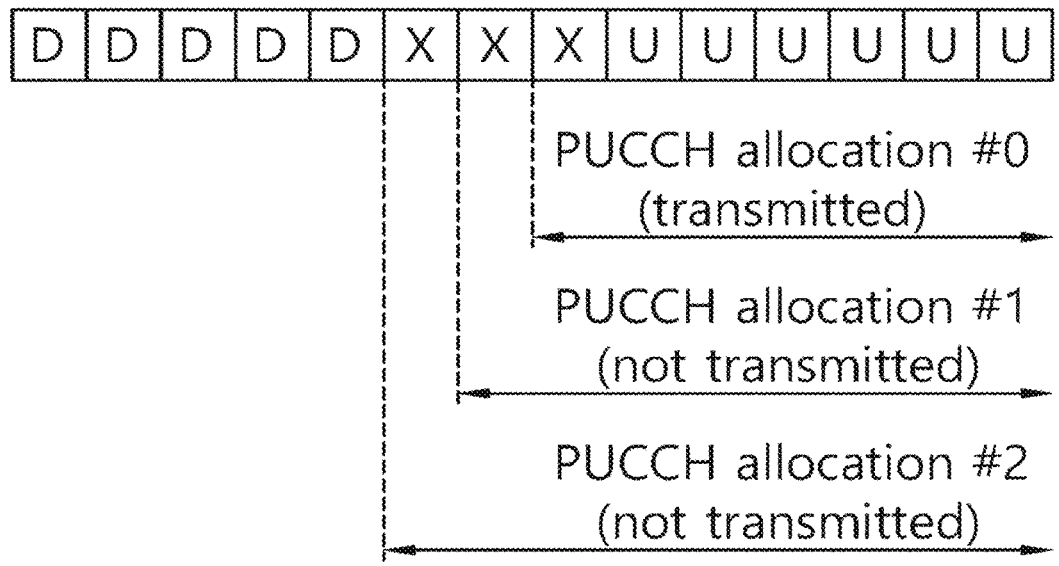
G=2 case
(a)
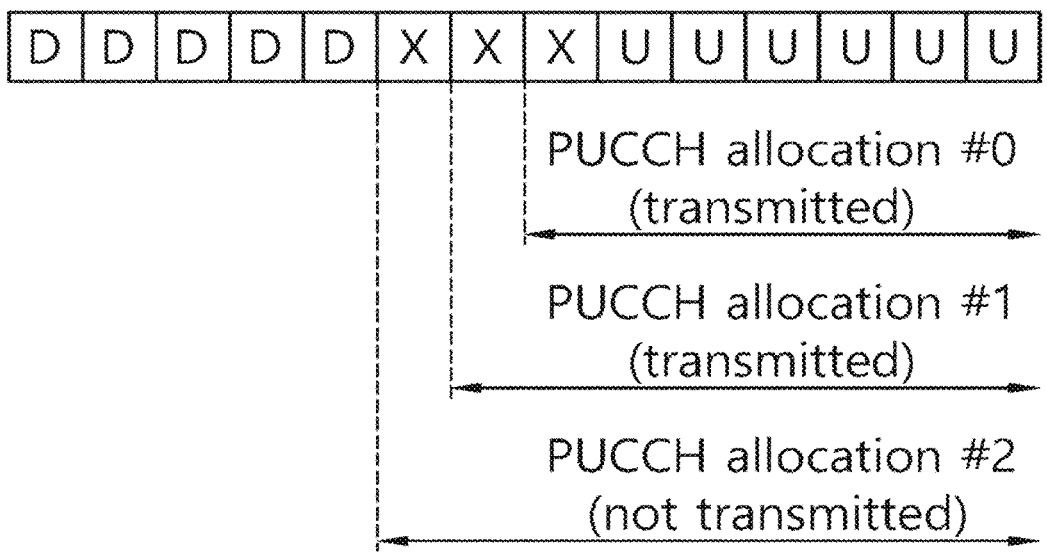
G=1 case
(b)

METHOD FOR TRANSMITTING AND RECEIVING SHARED CHANNEL IN WIRELESS COMMUNICATION SYSTEM, AND DEVICE SUPPORTING SAME

CROSS-REFERENCE TO RELATED APPLICATIONS

This application is a continuation of pending PCT International Application No. PCT/KR2020/005924, which was filed on May 4, 2020, and which claims priority under 35 U.S.C 119(a) to Korean Patent Application No. 10-2019-0051862 filed with the Korean Intellectual Property Office on May 2, 2019, Korean Patent Application No. 10-2019-0054577 filed with the Korean Intellectual Property Office on May 9, 2019, and Korean Patent Application No. 10-2019-0141791 filed with the Korean Intellectual Property Office on Nov. 7, 2019. The disclosures of the above patent applications are incorporated herein by reference in their entirety.

TECHNICAL FIELD

The present specification relates to a wireless communication system and, more particularly, to a method and a device for transmitting or receiving a shared channel.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

The present specification is to provide a method for transmitting or receiving an uplink shared channel.

Solution to Problem

The present specification provides a method for transmitting or receiving a shared channel in a wireless communication system.

Specifically, a method performed by a terminal includes: receiving, from a base station, first resource information for transmission or reception of a shared channel, wherein the first resource information includes a symbol length and a relative start symbol index in a time domain resource for transmission or reception of the shared channel; and receiving, from the base station, the shared channel on a first resource determined based on the first resource information, or transmitting the shared channel to the base station on the first resource, wherein a start symbol index of the first resource is determined based on the relative start symbol index and a pre-defined reference symbol index.

In the present specification, the reference symbol index is 0.

In the present specification, the reference symbol index is determined based on a length and a start symbol of a resource including the first resource information.

In the present specification, the first resource is determined based on a first subcarrier spacing (SCS) of a first cell including the first resource information and a second SCS of a second cell including the shared channel.

In the present specification, if the first SCS and the second SCS are the same, the reference symbol index is an index of an earliest symbol among symbols including the first resource information of the first cell.

In the present specification, if the first SCS is smaller than the second SCS, the reference symbol index is an index of an earliest symbol among symbols including the shared channel of the second cell, which overlap in the time domain with symbols including the first resource information of the first cell.

In the present specification, if the first SCS is smaller than the second SCS, the reference symbol index is an index of a last symbol among symbols including the shared channel of the second cell, which overlap in the time domain with symbols including the first resource information of the first cell.

In the present specification, if the first SCS is greater than the second SCS, the reference symbol index is an index of an earliest symbol among symbols that do not precede symbols including the first resource information, from among symbols including the shared channel of the second cell, which overlap in the time domain with symbols of the first cell.

In the present specification, the first resource information further includes a first position of a demodulation-reference signal (DM-RS) mapped to the first resource.

In the present specification, if the first resource includes the first position, the DM-RS is mapped to the first position, and if the first resource does not include the first position, the DM-RS is mapped to a symbol indicated by the start symbol index of the first resource.

In the present specification, if the shared channel is transmitted first on the first resource and is repeatedly transmitted second on a second resource, the DM-RS is mapped to the first position in the first resource, and the DM-RS is mapped to a first symbol of the second resource in the second resource.

In the present specification, if the shared channel is transmitted first on the first resource and is repeatedly transmitted second on a second resource, the DM-RS is mapped to the first position in the first resource, the DM-RS is mapped to a position corresponding to the first position in the second resource, and the corresponding position is a position separated from a first symbol of a second duration by a duration that the first position and a first symbol of the first resource are separated.

In the present specification, the DM-RS is mapped to a symbol indicated by the start symbol index of the first resource regardless of the first position.

In the present specification, the method further includes receiving, from the base station, second resource information for transmission or reception of the shared channel, wherein the second resource information includes information on a use of multiple symbols constituting a slot of the first resource, and the reference symbol index is determined based on the first resource information and the second resource information.

In the present specification, if the shared channel is transmitted to the base station on the first resource, the reference symbol index is an index of a symbol, which has a direction configured to flexible and is immediately subsequent to a last symbol the use of which is configured to downlink, from among the multiple symbols.

In the present specification, if the shared channel is transmitted to the base station on the first resource, the reference symbol index is an index of a symbol, which has a use configured to flexible or uplink and is immediately subsequent to a gap symbol located after a last symbol the use of which is configured to downlink, from among the multiple symbols.

In the present specification, a terminal for transmitting or receiving a shared channel in a wireless communication system includes: a transceiver; a processor; and a memory connected to the processor and configured to store instructions for operations executed by the processor, wherein the operations include: receiving first resource information for transmission of a shared channel from a base station, wherein the first resource information includes a symbol length and a relative start symbol index in a time domain resource for transmission of the shared channel; and receiving, from the base station, the shared channel on a first resource determined based on the first resource information, or transmitting the shared channel to the base station on the first resource, wherein a start symbol index of the first resource is determined based on the relative start symbol index and a pre-defined reference symbol index.

In the present specification, the reference symbol index is 0.

In the present specification, the reference symbol index is determined based on a resource including the first resource information.

In the present specification, the first resource is determined based on a first subcarrier spacing (SCS) of a first cell including the first resource information and a second SCS of a second subcarrier of a second cell including the shared channel.

Advantageous Effects of Invention

The present specification provides a method for efficiently determining a resource used for shared channel transmission.

BRIEF DESCRIPTION OF DRAWINGS

FIGS. 5a and 5b illustrate a procedure for transmitting control information and a control channel in a 3GPP NR system.

FIG. 13 is a diagram illustrating a physical uplink control channel (PUCCH) used in a wireless communication system according to an embodiment of the present disclosure.

FIGS. 15a and 15b are diagrams illustrating an example of transmitting PUCCH to another slot according to a change in a slot configuration.

FIG. 16 is a diagram illustrating a slot in which repetition PUCCH transmission is performed according to a slot configuration.

FIG. 17 illustrates whether PUCCH is transmitted according to a slot configuration.

BEST MODE FOR CARRYING OUT THE INVENTION

Figure 1:
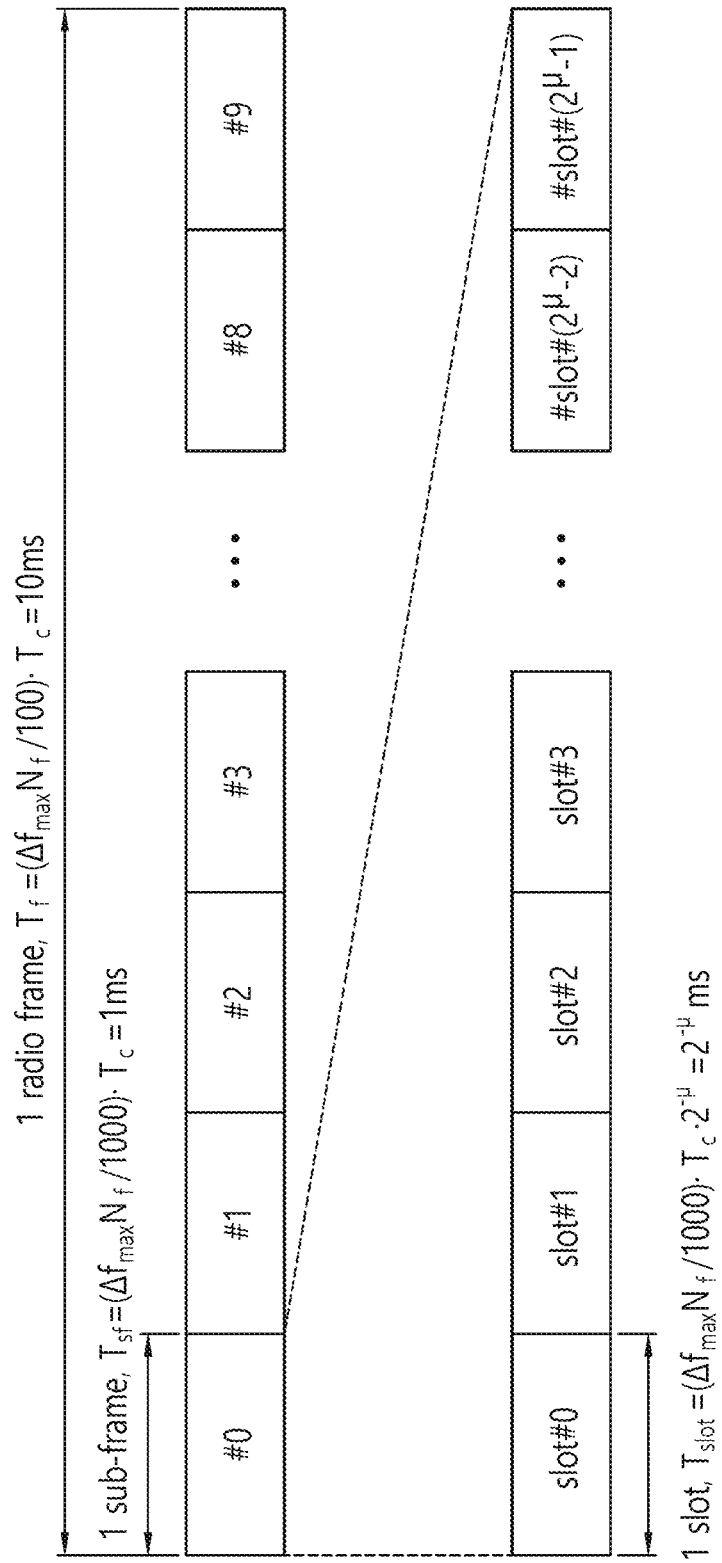
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configure an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one subframe. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
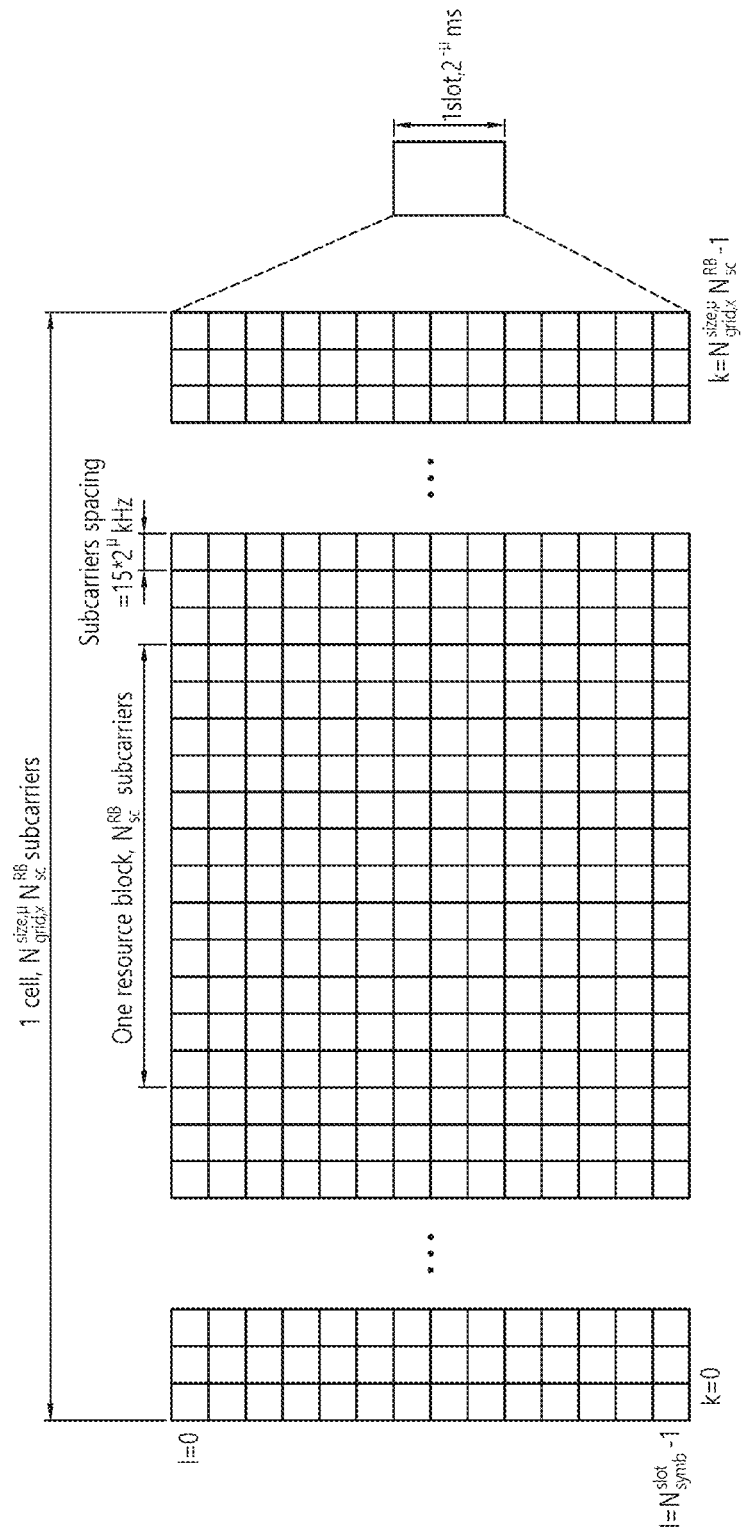
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{0\ grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
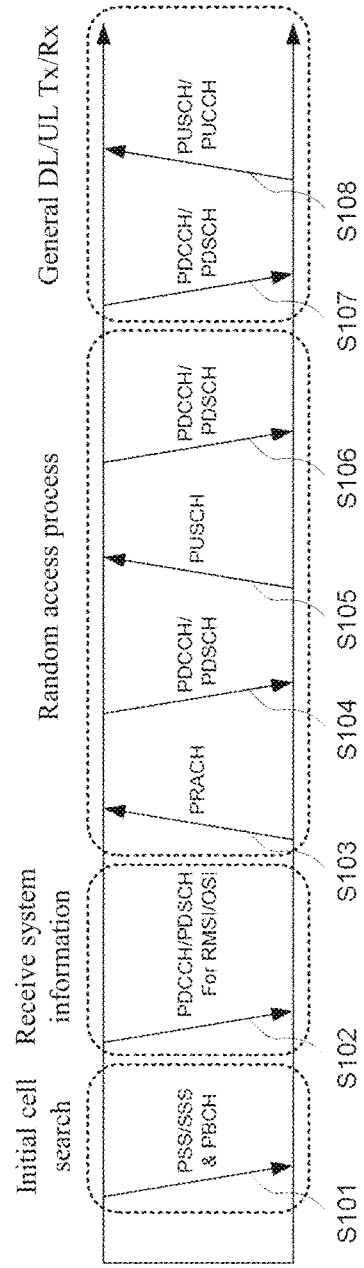
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Figure 4A:
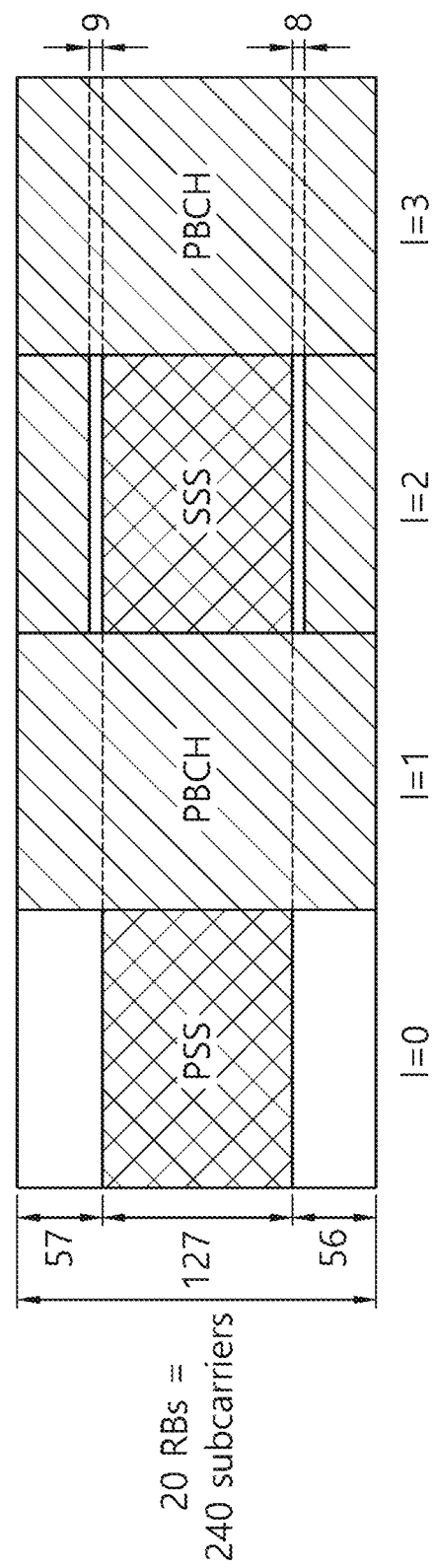
FIGS. 4a and 4b illustrate an SS/PBCH block for initial cell access in a 3GPP NR system.

Referring to FIG. 4a, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4a and Table 1, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number l relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)=$$

$$m(n+43N^{(2)}_{ID}) \bmod 127$$

$$0 \le n < 127$$

Here, $x(i+7)=(x(i+4)+x(i)) \bmod 2$ and is given as,
[x(6) x(5) x(4) x(3) x(2) x(1) x(0)]=[1 1 1 0 1 1 0]
Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$

$$m_0 = 15\left\lfloor \frac{N^{(1)}_{ID}}{112} \right\rfloor + 5N^{(2)}_{ID}$$

$$m_1 = N^{(1)}_{ID} \bmod 112$$

$$0 \le n < 127$$

$$x_0(i+7)=(x_0(i+4)+x_0(i)) \bmod 2$$

Here, $x_1(i+7)=(x_1(i+1)+x_1(i)) \bmod 2$ and is given as, $[x_0(6)x_0(5)x_0(4)x_0(3)x_0(2)x_0(1)x_0(o)]=[0\ 0\ 0\ 0\ 0\ 0\ 1]$ $[x_1(6)x_1(5)x_1(4)x_1(3)x_1(2)x_1(1)x_1(0)]=[0\ 0\ 0\ 0\ 0\ 0\ 1]$ A radio frame with a 10 ms length may be divided into two half frames with a 5 ms length.

Figure 4B:
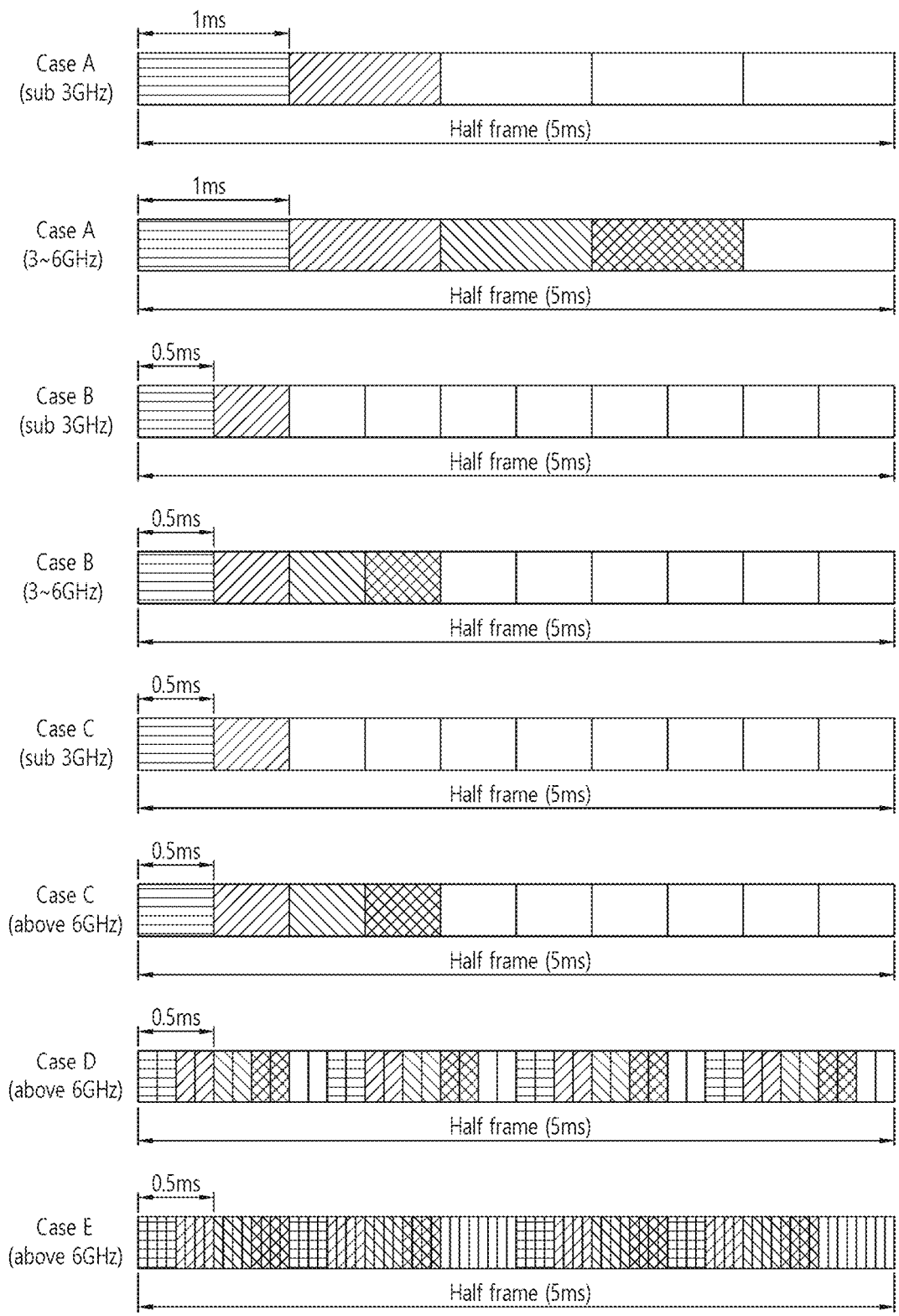

Referring to FIG. 4b, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less.

In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
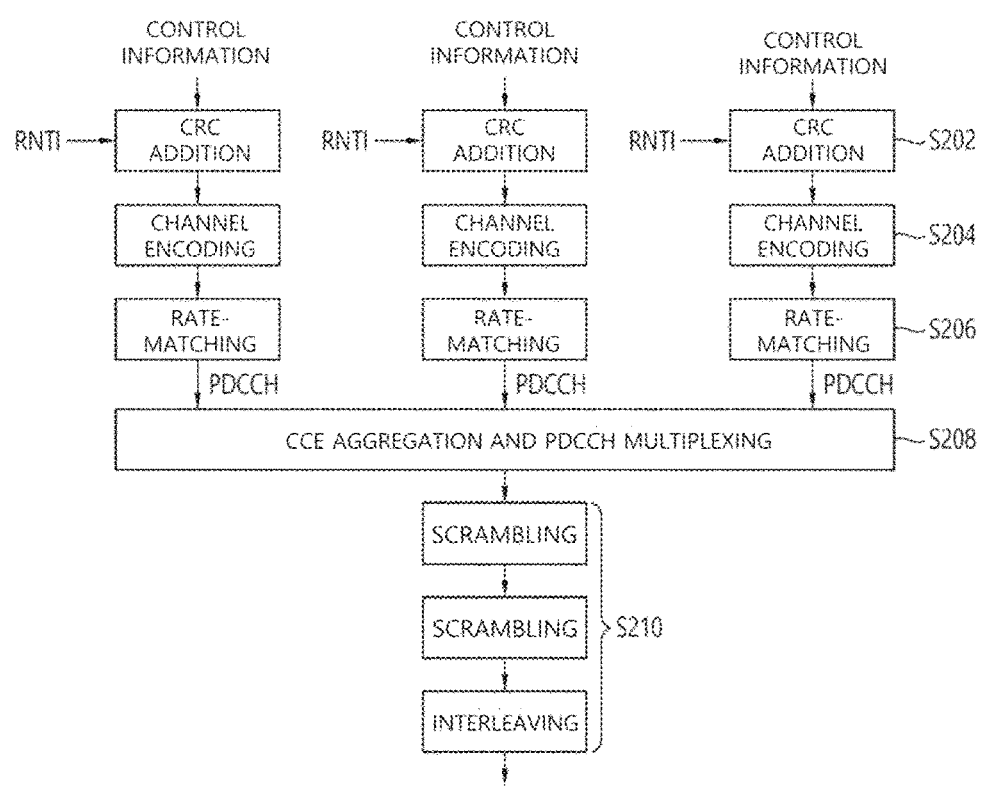

FIG. 5 illustrates a procedure for transmitting control information and a control channel in a 3GPP NR system. Referring to FIG. 5a, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used.

FIG. 5b is a diagram related to a CCE aggregation level and the multiplexing of a PDCCH and illustrates the type of a CCE aggregation level used for one PDCCH and CCE(s) transmitted in the control area according thereto.

Figure 6:
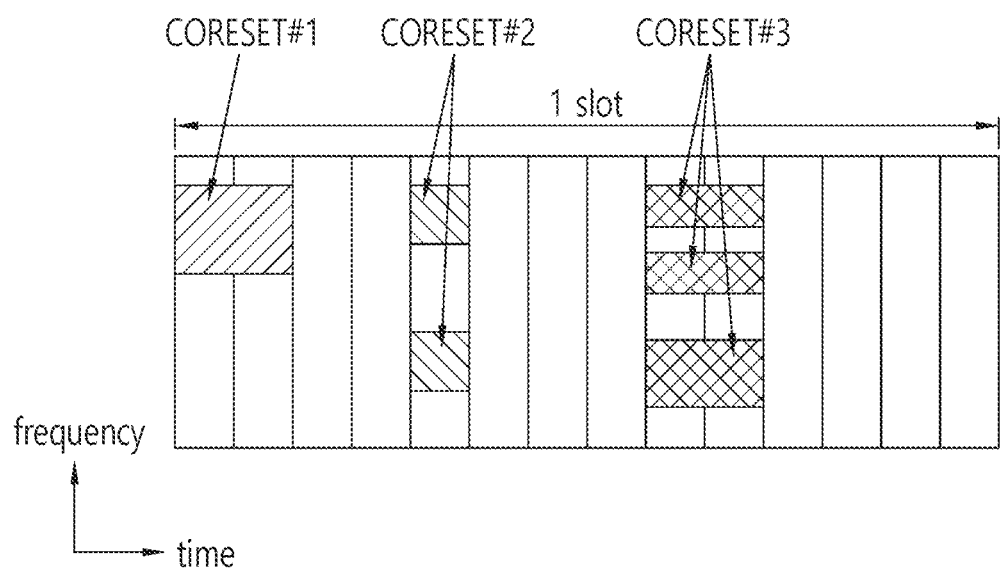
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
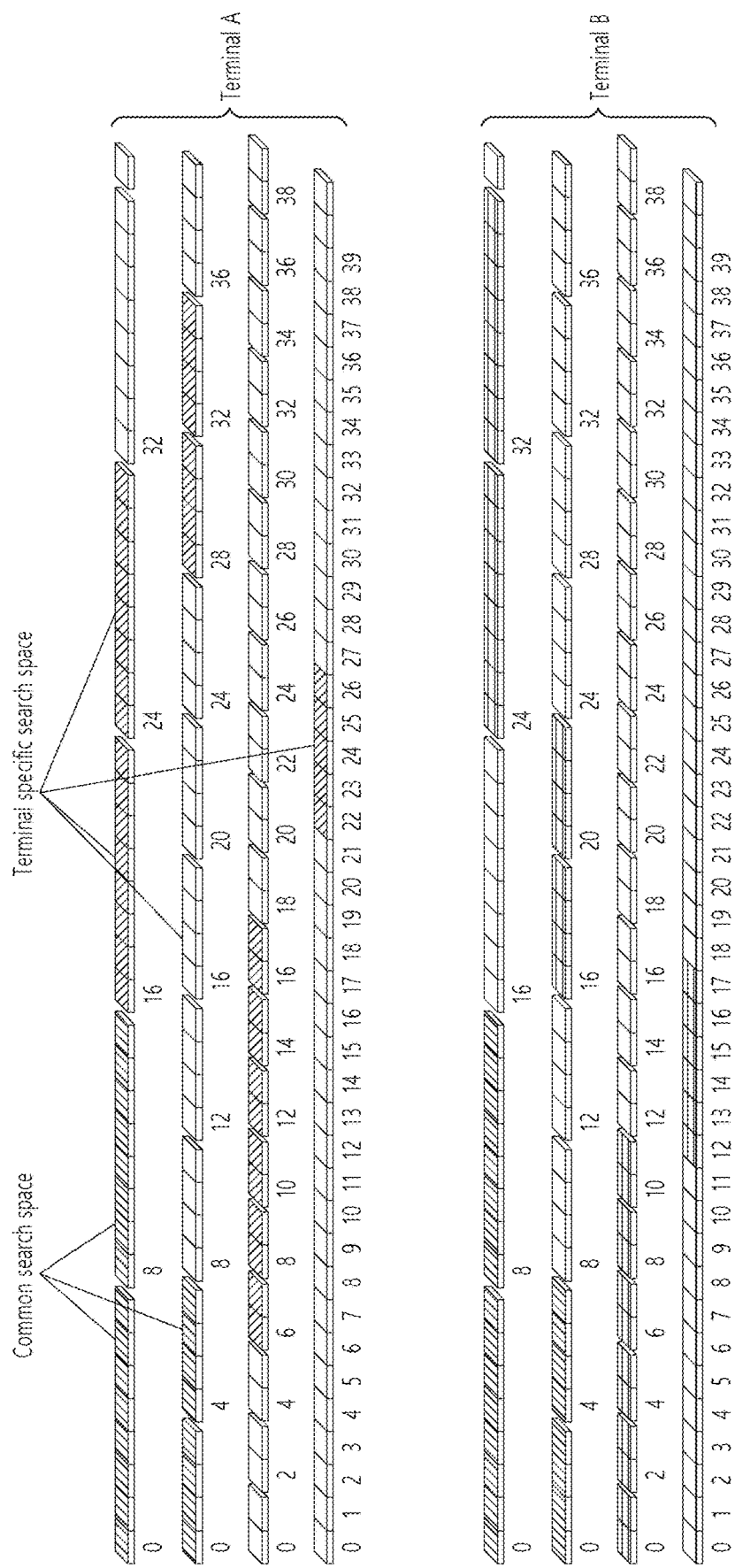
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 2 shows an embodiment of a physical uplink control channel (PUCCH) used in a wireless communication system.

TABLE 2

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one RB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value $m_{cs}$ according to the $M_{bit}$ bit UCI ($M_{bit}$=1 or 2). In addition, a sequence in which a base sequence of length 12 is cyclically shifted based on a predetermined CS value $m_{cs}$ may be mapped to 1 OFDM symbol and 12 REs of 1 RB and transmitted. When the number of cyclic shifts available to the UE is 12 and $M_{bit}$=1, 1 bit UCI 0 and 1 may be mapped to two cyclic shifted sequences having a difference of 6 cyclic shift values, respectively. In addition, when $M_{bit}$=2, 2 bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}=1$, may be BPSK-modulated. The UE may modulate UCI, which is $M_{bit}=2$, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , $d(M_{symbol}-1)$. Here, $M_{symbol}$ may be $M_{bit}/2$. Through this, the UE may obtain a frequency diversity gain. More specifically, $M_{bit}$ bit UCI ($M_{bit}>2$) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}>2$) with π/2-Binary Phase Shift Keying (BPSK) or QPSK to generate a complex valued symbol d(0) to $d(M_{symb}-1)$. Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP in the DCI scheduling the PDSCH to change the DL BWP of the UE. In the case of an uplink carrier (or cell) operating in FDD, the base station may include a BPI indicating the activated BWP in the DCI scheduling the PUSCH to change the UL BWP of the UE.

Figure 8:
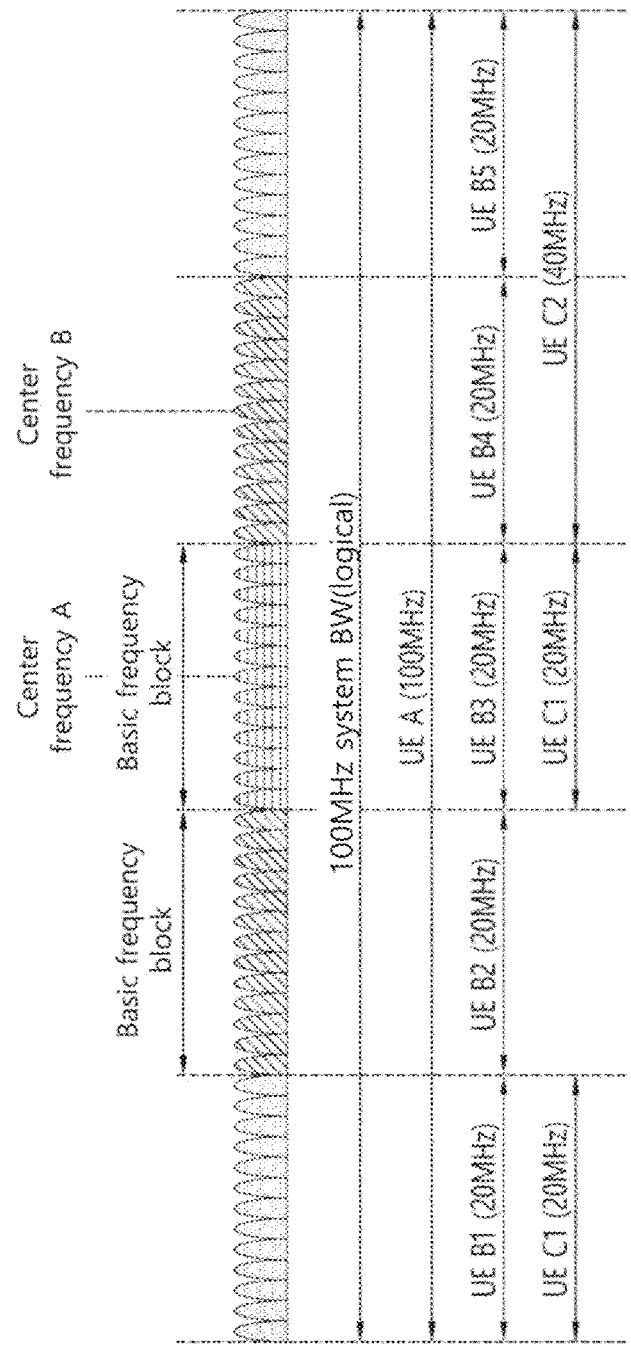
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
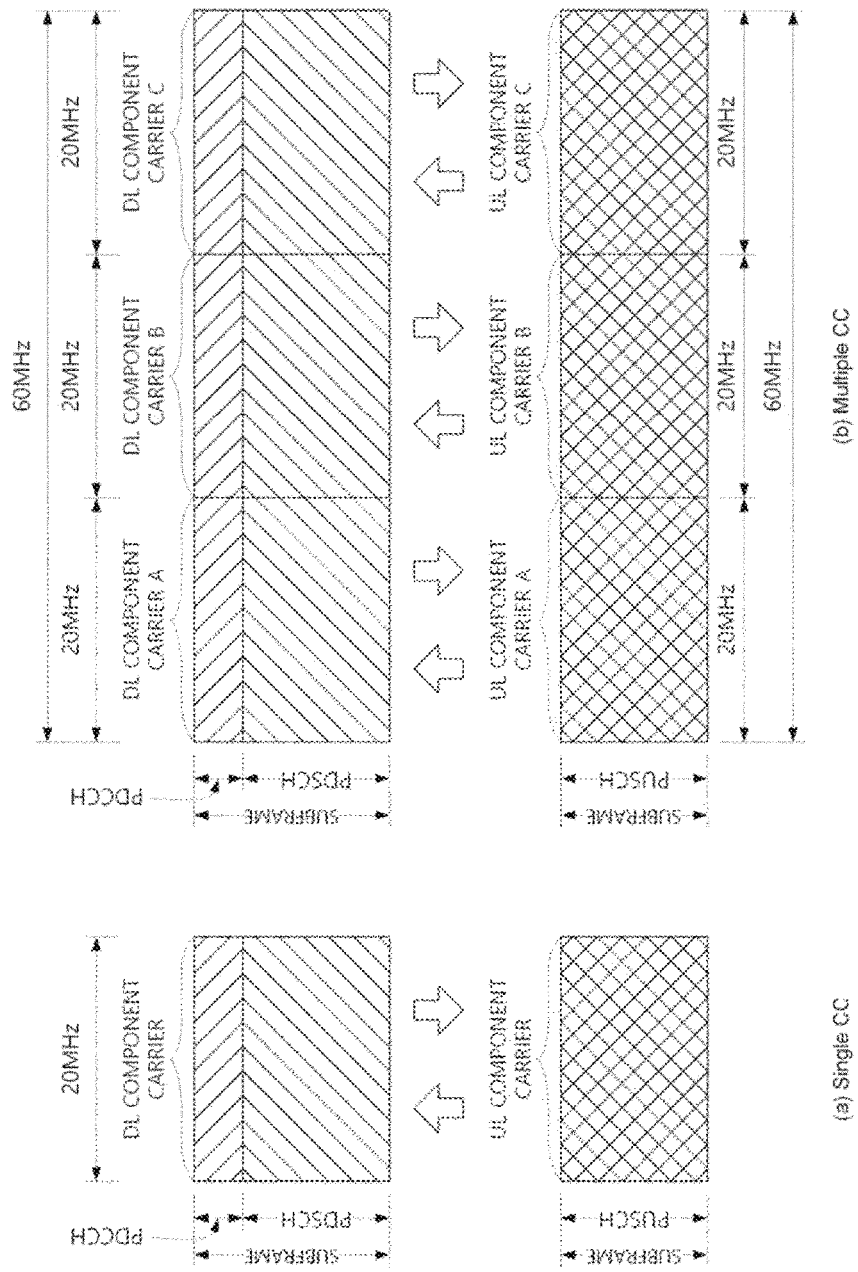
FIG. 9 is a diagram for explaining signal carrier communication and multiple carrier communication.

FIG. 9 is a drawing for explaining signal carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
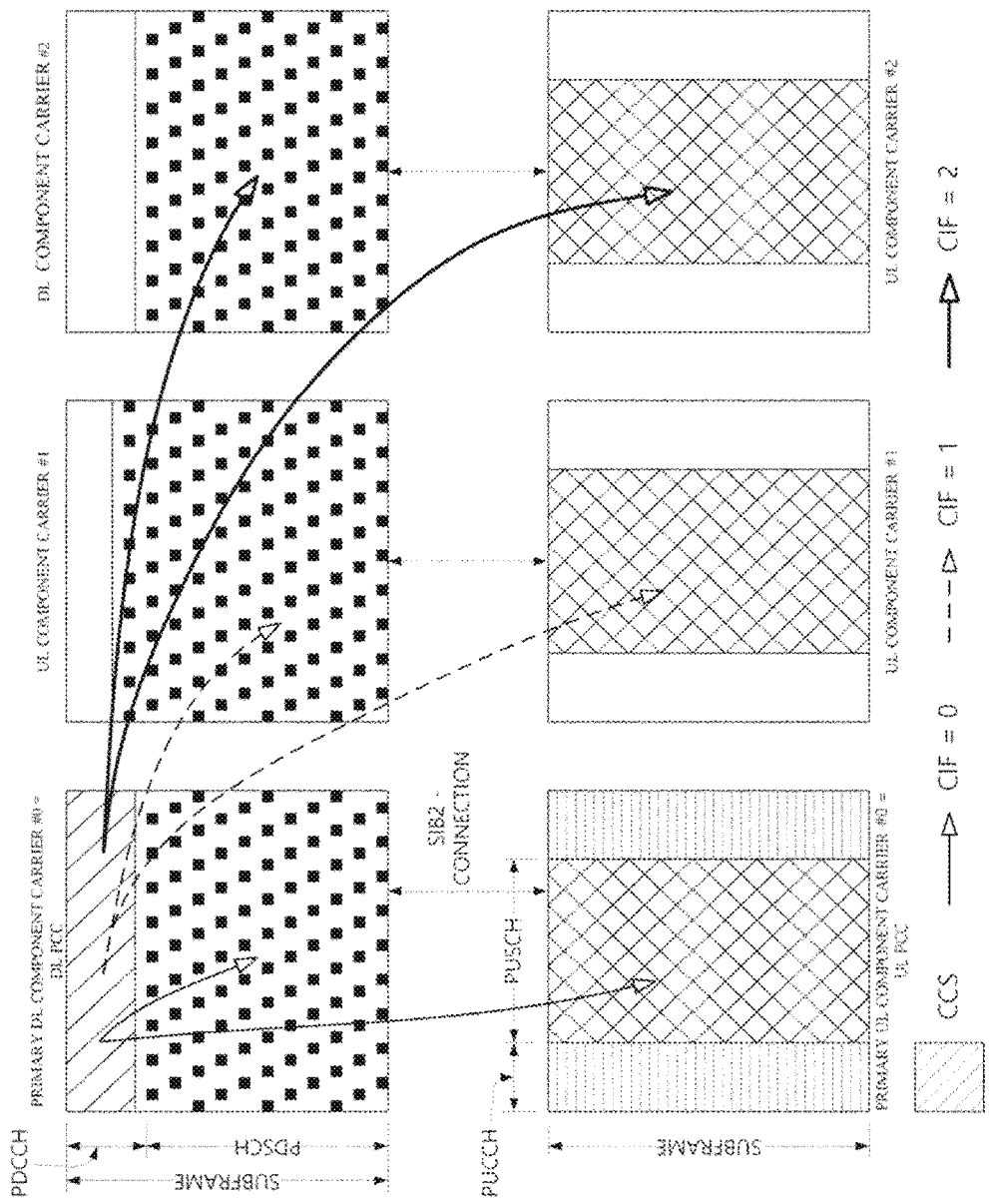
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
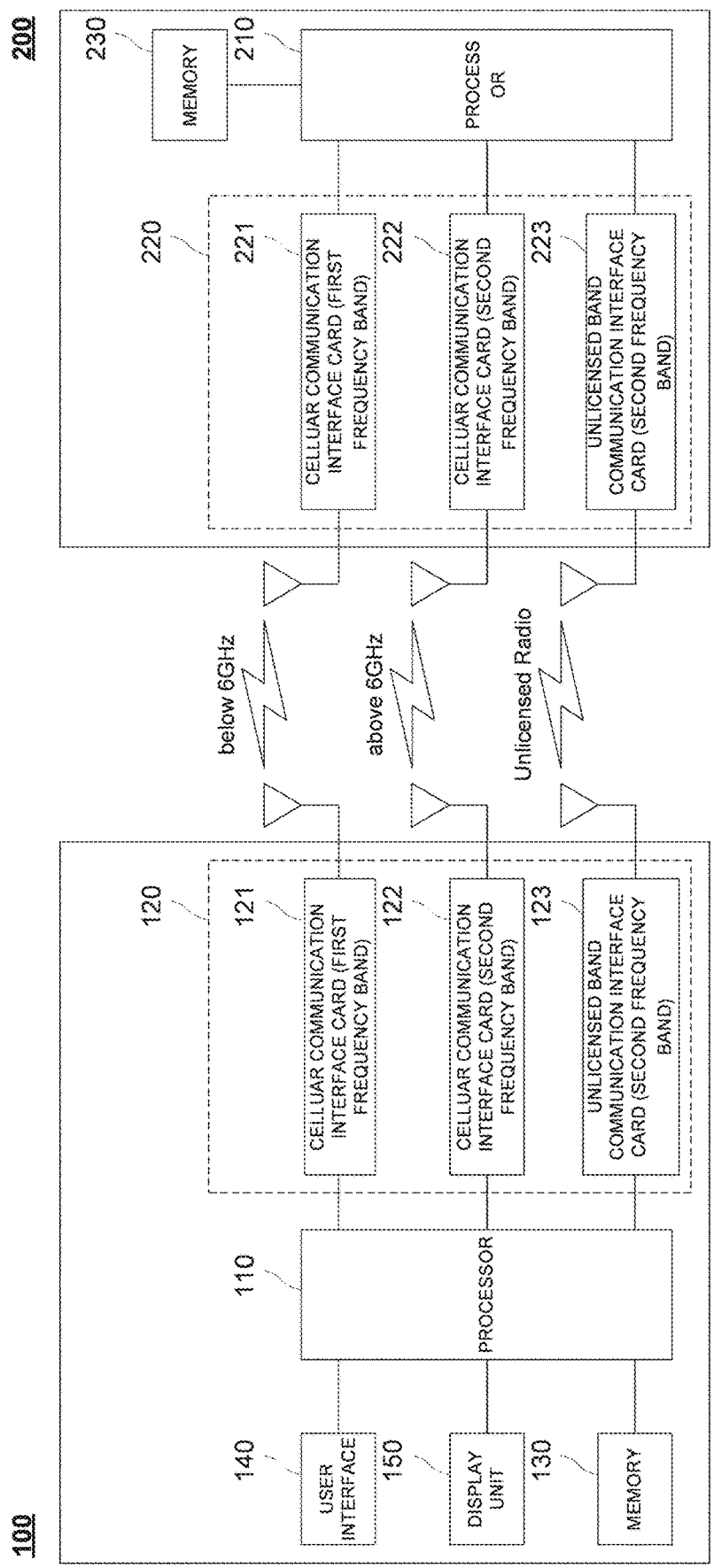
FIG. 11 is a block diagram showing the configurations of a UE and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Figure 12:
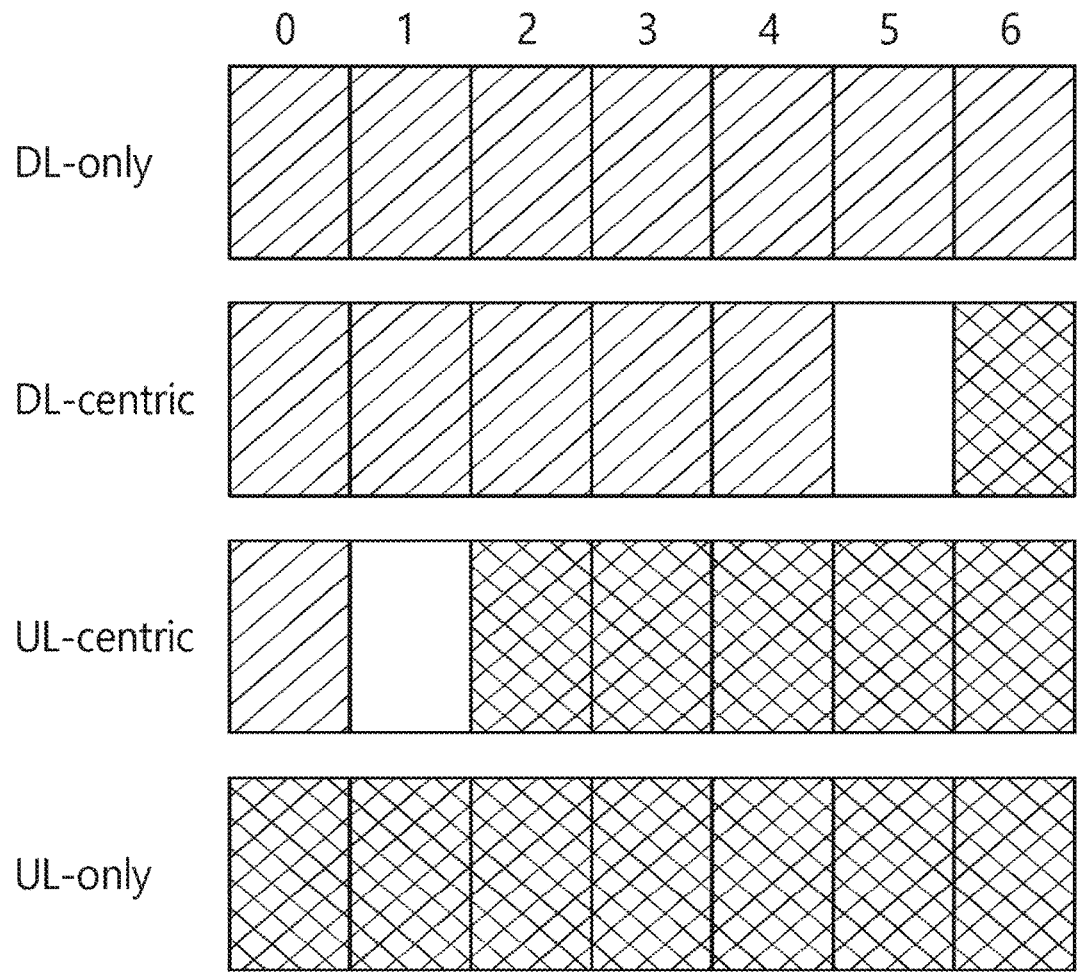
FIG. 12 is a diagram illustrating a slot configuration of a TDD-based mobile communication system according to an embodiment of the present disclosure.

FIG. 12 is a diagram illustrating a slot configuration of a TDD-based mobile communication system according to an embodiment of the present disclosure.

Referring to FIG. 12, a slot may be defined by four configurations of a slot (DL-only) including only DL symbols, a DL symbol-centric slot (DL-centric), a UL symbol-centric slot (UL-centric), and a slot (UL-only) including only UL symbols.

One slot may include 7 symbols. A gap (GP) may exist when changing from a downlink to an uplink or from an uplink to a downlink. That is, a gap may be inserted between a downlink and an uplink or between an uplink and a downlink. One symbol may be used to transmit downlink control information. Hereinafter, a symbol that configures a gap is referred to as a gap symbol.

A slot (DL-only) including only DL symbols literally includes only DL symbols. For example, a slot including only DL symbols includes 7 DL symbols as in DL-only of FIG. 12.

A DL symbol-centric slot (DL-centric) includes multiple DL symbols, at least one gap symbol, and at least one UL symbol. For example, a DL symbol-centric slot may sequentially include 5 DL symbols, 1 gap symbol, and 1 UL symbol as in DL-centric of FIG. 12.

A UL symbol-centric slot (UL-centric) may include at least one DL symbol, at least one gap symbol, and multiple UL symbols. For example, a UL symbol-centric slot may sequentially include 1 DL symbol, 1 gap symbol, and 5 UL symbols as in UL-centric of FIG. 12.

A slot (UL-only) including only UL symbols literally includes only UL symbols. For example, a slot including only UL symbols includes 7 UL symbols as in UL-only of FIG. 12.

A network may inform a terminal of a default slot configuration, and to this end, RRC signaling may be used. Information on the default slot configuration configured via RRC signaling may be referred to as semi-static DL/UL assignment information. The default slot configuration is a slot configuration that the terminal may assume that the network uses, when a base station does not transmit signaling for a separate slot configuration change to the terminal. A 3GPP NR system supports dynamic TDD that changes the slot configuration according to various traffic situations of terminals. To this end, the base station may inform the terminal of the slot configuration of current or future slots every slot, every several slots, or each time the base station changes the slot configuration. In order to inform about the slot configuration, two methods may be used in the NR system.

A first method is a method of using group common PDCCH. Group common PDCCH is PDCCH broadcast to multiple terminals, and may be transmitted every slot, every several slots, or only when a base station is needed. Group common PDCCH may include a (dynamic) slot format information indicator (SFI) to transmit information relating to a slot configuration, and the slot format information indicator may inform about the current slot configuration, in which group common PDCCH is transmitted, or multiple future slot configurations including the current slot configuration. When group common PDCCH is received, the terminal may know the current slot configuration or the future slot configuration including the current slot via the slot configuration information indicator included in group common PDCCH. If reception of group common PDCCH fails, the terminal cannot determine whether the base station has transmitted group common PDCCH.

A second method is a method of transmitting information on a slot configuration in terminal-specific (UE-specific) PDCCH for scheduling of PDSCH or PUSCH. UE-specific PDCCH may be transmitted in unicast only to a specific user requiring scheduling. UE-specific PDCCH may transmit, as slot configuration information of a scheduled slot, the same slot format information indicator as that transmitted in group common PDCCH. Alternatively, UE-specific PDCCH may include information that allows a configuration of the scheduled slot to be inferred. For example, the terminal may know a slot, to which PDSCH or PUSCH is allocated, and a position of an OFDM symbol within the slot, by receiving UE-specific PDCCH allocated to the terminal itself, and may infer the configuration of the slot therefrom. UE-specific PDCCH for scheduling of PDSCH may indicate a slot, in which PUCCH including HARQ-ACK feedback information is transmitted, and a position of an OFDM symbol in the slot, and a configuration of the slot in which PUCCH is transmitted may be inferred therefrom.

Hereinafter, a downlink signal used in the present specification is a radio signal transmitted from a base station to a terminal and may include a physical downlink channel generated and processed in a physical layer, a sequence, reference signals (DM-RS, CSI-RS, TRS, PT-RS, etc.), and a MAC message and an RRC message (or RRC signaling) generated and processed in a MAC layer and an RRC layer respectively. The MAC message and the RRC message may be referred to as higher layer signaling as being distinguished from a signal of the physical layer constituting a lower layer of OSI. Here, the physical downlink channel may further include a physical downlink shared channel (PDSCH), a physical downlink control channel (PDCCH), and a physical broadcast channel (PBCH).

An uplink signal used in the present specification is a radio signal transmitted by a terminal to a base station, and may include a physical uplink channel generated and processed in a physical layer, a sequence, reference signals (SRS, etc.), and a MAC message and an RRC message (or RRC signaling) generated and processed in a MAC layer and an RRC layer, respectively. The physical uplink channel may again include an physical uplink shared channel (PUSCH), an physical uplink uplink control channel (PUCCH), and a physical random access channel (PRACH).

FIG. 13 is a diagram illustrating a physical uplink control channel (PUCCH) used in a wireless communication system according to an embodiment of the present disclosure.

Referring to FIG. 13, the 3GPP NR system may use two types of PUCCH according to a size (i.e., the number of symbols) of a time resource used for PUCCH transmission.

First type PUCCH may be referred to as long PUCCH and may be transmitted by being mapped to four or more consecutive symbols of a slot. The first type PUCCH may be mainly used to transmit a large amount of uplink control information (UCI) or may be allocated to users with a low signal strength, so as to enable an increase in coverage of PUCCH. The first type PUCCH may be repeatedly transmitted in multiple slots to increase the coverage of PUCCH. The first type PUCCH may include PUCCH format 1 which transmits UCI of a 1 or 2 bit size, PUCCH format 3 which does not support multiplexing between users while transmitting UCI exceeding 2 bits, and PUCCH format 4 which supports multiplexing between users while transmitting UCI exceeding 2 bits.

Second type PUCCH may be referred to as short PUCCH, may be transmitted by being mapped to one or two symbols of a slot, may be used to transmit a small amount of UCI or allocated to users with a high signal strength, and may also be used to support a service requiring low latency. Second type PUCCH may include PUCCH format 0 for transmission of 1 or 2 bit UCI and PUCCH format 2 for transmission of UCI exceeding 2 bits.

In one slot, there may be a time-frequency resource available for the first type PUCCH and a time-frequency resource available for the second type PUCCH, which may be allocated to different terminals respectively, or to one terminal. When allocated to one terminal, the first type PUCCH and the second type PUCCH may be transmitted in different time resources (i.e., different OFDM symbols). That is, when allocated to one terminal, the first type PUCCH and the second type PUCCH may be time division multiplexed (TDM) so as to be transmitted.

UCI mapped to PUCCH may include a scheduling grant (SR), HARQ-ACK, rank information (RI), CSI, and beam-related information (BRI). The SR is information that informs a base station that there is uplink transmission. The HARQ-ACK is information that informs whether reception of a physical downlink shared channel (PDSCH) transmitted by a base station is successful. The RI is information that informs about a rank transmittable through a radio channel when multiple antennas are used. The CSI is information that the terminal informs about a value of measuring a channel situation between the base station and the terminal. The BRI is information that provides information on beamforming of a transmitter and a receiver.

Referring to FIG. 13 (a), a DL symbol centric (DL-centric) slot may be configured and indicated by five DL symbols, one flexible symbol, and one UL symbol. Second type PUCCH having symbol length 1 may be allocated to the DL symbol centric slot. The second type PUCCH may be located in a last symbol of the slot.

Referring to FIG. 13 (b), an illustrated UL symbol centric (UL-centric) slot may be configured and indicated by one DL symbol, one flexible symbol, and five UL symbols. First type PUCCH and/or second type PUCCH may be allocated to the UL symbol centric slot. The first type PUCCH may be mapped to four symbols and the second type PUCCH may be mapped to a last symbol of the slot.

Referring to FIG. 13 (c), first type PUCCH and/or second type PUCCH may be allocated to a slot in which only UL symbols exist (UL only). For example, the first type PUCCH may be mapped to six symbols and the second type PUCCH may be mapped to last one symbol of the slot.

Referring to FIG. 12 and FIG. 13, a slot configuration in which second type PUCCH transmission is possible is a DL symbol centric slot, a UL symbol centric slot, and a slot including only UL symbols, and a slot configuration in which first type PUCCH transmission is possible is a UL symbol centric slot and a slot including only UL symbols. The first type PUCCH and the second type PUCCH are TDMed, and transmittable slots are a UL symbol centric slot and a slot including only UL symbols. For reference, there is one symbol assigned to uplink in the DL symbol centric slot, and therefore the second type PUCCH is transmittable but the first type PUCCH is not transmittable. Accordingly, PDCCH for scheduling of PUCCH may allocate the first type PUCCH to a UL symbol centric slot or a slot including only UL symbols. PDCCH for scheduling of PUCCH may allocate the second type PUCCH to a DL symbol centric slot, a UL symbol centric slot, or a slot including only UL symbols.

As described above, a base station (or network) may change a slot configuration according to traffic and various situations of a terminal, and may inform the terminal of a change in the corresponding slot configuration. The slot configuration may be changed as described above, and thus the terminal should receive information on the slot configuration or a slot configuration information indicator by monitoring group common PDCCH and UE-specific PDCCH. However, due to problems, such as interference and radio channel situations between the base station and the terminal, the terminal may fail to receive group common PDCCH and UE-specific PDCCH.

If the terminal fails to receive group common PDCCH and/or UE-specific PDCCH, the terminal may not recognize whether the base station has changed the slot configuration or not. However, in a case where the base station has changed the slot configuration and PUCCH transmission scheduled by the terminal is not suitable for the changed slot configuration, if the terminal enforces PUCCH transmission as scheduled, PUCCH transmission may fail and this may cause a problem, such as temporary loss of communication or delay. Therefore, in this case, a clear procedure or a preliminary protocol between the terminal and the base station is required, wherein the procedure or protocol relates to whether the terminal transmits or drops indicated PUCCH, and how to perform transmission if the terminal transmits PUCCH.

Hereinafter, an operation method of the terminal and the base station will be described, wherein the operation method is to solve a case where the terminal fails to receive group common PDCCH and/or UE-specific PDCCH including a slot configuration information indicator and slot configuration-related information.

Provided are definitions of a terminal and an operation method thereof, and a base station and an operation method thereof, wherein, although the terminal has succeeded in receiving UE-specific PDCCH and/or group common PDCCH including a slot configuration information indicator and slot configuration-related information, if a configuration of a slot to which PUCCH has been allocated (or PUCCH transmission has been scheduled) is changed and the allocated PUCCH is thus unable to be transmitted, the terminal processes transmission of PUCCH, and the base station processes reception of the allocated PUCCH.

First Embodiment

The first embodiment relates to a method of implementing a predictable communication situation between a terminal and a base station, by placing certain restrictions on a change in a slot configuration of the base station. In this case, PUCCH transmission of the terminal may be performed regardless of a success or failure of reception of group common PDCCH and UE-specific PDCCH.

(Method 1)—Slot Configuration of Slot Including Symbol in which PUCCH is Allocated (or to be Transmitted) Remains Same without Change Method 1 may be applied differently depending on a type of the allocated (or to be transmitted) PUCCH, that is, whether PUCCH is first type PUCCH or second type PUCCH.

i) A slot configuration of a symbol in which the first type PUCCH is allocated (or to be transmitted) remains the same without a change. That is, the base station does not change the slot configuration of an OFDM symbol in which the first type PUCCH is allocated (or to be transmitted), and the terminal also assumes (or agrees or expects) that the slot configuration of the OFDM symbol in which the first type PUCCH is allocated (or to be transmitted) is not changed. Accordingly, the terminal may transmit the first type PUCCH regardless of receiving the slot configuration information indicator and the slot configuration-related information transmitted in group common PDCCH and UE-specific PDCCH.

ii) A slot configuration of a symbol in which the second type PUCCH is allocated (or to be transmitted) remains the same without a change. That is, the base station does not change the slot configuration of the symbol in which the second type PUCCH is allocated (or to be transmitted), and the terminal also assumes (or agrees or expects) that the slot configuration of the symbol in which the second type PUCCH is allocated (or to be transmitted) is not changed. Accordingly, the terminal may transmit second type PUCCH regardless of receiving the slot configuration information indicator and the slot configuration-related information transmitted in group common PDCCH and UE-specific PDCCH.

Method 1 described above has some disadvantages in terms of scheduling flexibility. Therefore, the following describes a method in another aspect that allows a slot configuration change of a base station within a certain range.

(Method 2)—Slot Configuration of Symbol in which PUCCH is Allocated (or to be Transmitted) May be Changed Only within Certain Range Even if a slot configuration of a symbol in which PUCCH is allocated (or to be transmitted) is changed, the slot configuration may be changed only to a slot configuration in which PUCCH transmission is possible, and may not be changed to a slot configuration in which PUCCH transmission is impossible. Therefore, the terminal does not expect a change to a slot in which PUCCH transmission is impossible, with respect to the slot indicated with PUCCH transmission by the base station. Method 2 may be applied differently depending on a type of the allocated (or to be transmitted) PUCCH, that is, whether PUCCH is first type PUCCH or second type PUCCH.

When the base station changes the slot configuration of the symbol to which the first type PUCCH is allocated, the slot configuration may be changed to only a slot configuration in which the first type PUCCH transmission is possible, and may not be changed to a slot configuration in which the first type PUCCH transmission is impossible. Therefore, the terminal does not expect a change to a slot in which the first type PUCCH cannot be transmitted, with respect to the slot indicated with the first type PUCCH transmission by the base station. Even if the terminal fails to receive group common PDCCH including the slot configuration information indicator of the slot that transmits the first type PUCCH, the terminal may always transmit the first type PUCCH in an assigned resource.

For example, the base station may change a UL symbol centric slot, to which first type PUCCH of a four OFDM symbol length is allocated, to a slot including only UL symbols, but cannot change the same to a slot including only a DL symbol having one UL symbol or a DL symbol centric slot. On the other hand, the terminal may expect that the UL symbol centric slot, to which the first type PUCCH of a four OFDM symbol length that the base station has indicated for transmission is allocated, may be changed to a slot including only UL symbols but does not expect a change to a slot including only DL symbols or to a DL symbol centric slot. The terminal does not expect a change in the slot configuration in which UL symbol(s) indicated by the base station to transmit the first type PUCCH is changed to the DL symbol(s).

ii) When the base station changes the slot configuration of the symbol to which the second type PUCCH is allocated, the slot configuration may be changed to a slot configuration in which the second type PUCCH transmission is possible, and may not be changed to a slot configuration in which the second type PUCCH transmission is impossible. Therefore, the terminal does not expect a change to a slot in which the second type PUCCH transmission is impossible, with respect to the slot indicated with the second type PUCCH transmission by the base station. Even if the terminal fails to receive group common PDCCH including the slot configuration information indicator of the slot that transmits the second type PUCCH, the terminal may always transmit the second type PUCCH in an assigned resource. More specifically, the base station may change the UL symbol centric slot, to which the second type PUCCH is allocated, to a DL symbol centric slot in which the second type PUCCH transmission is possible or a slot including only UL symbols, but cannot change the same to a slot including only DL symbols, in which the second type PUCCH transmission is impossible. The terminal does not expect the base station to make a change to a slot in which the second type PUCCH cannot be transmitted, with respect to the slot indicated for transmission of the second type PUCCH.

For example, the terminal may expect (or predict) that a UL symbol centric slot, to which the second type PUCCH of a one or two symbol length that the base station has indicated for transmission is allocated, may be changed to a DL symbol centric slot in which the second type PUCCH may be included or a slot including only UL symbols, but does not expect (or predict) the UL symbol centric slot to be changed to a slot including only DL symbols, in which the second type PUCCH cannot be included. The terminal does not expect a change in the slot configuration in which the UL symbol(s) indicated by the base station to transmit the second type PUCCH is changed to the DL symbol(s).

Hereinafter, another method in another aspect for further increasing scheduling flexibility is described in comparison with aforementioned method 2 that allows a slot configuration change of a base station to be within a certain range.

(Method 3)—Slot Configuration of Symbol in which PUCCH is Allocated (or to be Transmitted) May be Freely Changed The base station may freely change a configuration of a slot to which PUCCH is allocated.

In a case where PUCCH is first type PUCCH, if the terminal fails to receive group common PDCCH including the slot configuration information indicator of the slot for transmission of the first type PUCCH, the terminal may not transmit the first type PUCCH in an assigned resource.

In a case where PUCCH is second type PUCCH, if the terminal fails to receive group common PDCCH including the slot configuration information indicator of the slot for transmission of the second type PUCCH, the terminal may not transmit the second type PUCCH in the assigned resource.

When the aforementioned method is applied, even if the terminal fails to receive group common PDCCH and/or UE-specific PDCCH from the base station, since determination of transmission or non-transmission and a transmission procedure of scheduled PUCCH are clearly defined, communication errors or delay problems may be solved.

Second Embodiment

The second embodiment relates to an operation procedure of a terminal and a base station when a slot configuration of the base station is free to change and the terminal succeeds in receiving at least one of UE-specific PDCCH and group common PDCCH including a slot configuration information indicator and slot configuration-related information.

More specifically, the present disclosure relates to a terminal and an operation method thereof, and a base station and an operation method thereof, wherein, when a configuration of a slot in which PUCCH is allocated (or PUCCH transmission is scheduled) is changed, and the changed slot configuration is contradicted to PUCCH (i.e., when a symbol to which PUCCH is allocated in the slot to which the PUCCH is allocated overlaps a DL symbol due to the changed slot configuration), the terminal processes transmission of the PUCCH, and the base station processes reception of the PUCCH.

In the changed slot configuration, transmission of the allocated PUCCH may or may not be possible (or valid, suitable) (if the slot configuration is contradicted). Here, a slot in which PUCCH transmission is possible may include, with reference to FIG. 13, a UL symbol centric slot or slot including only UL symbols, to which first type PUCCH is allocated, and a DL symbol centric slot, UL symbol centric slot, or slot including only UL symbols, to which second type PUCCH is allocated. A slot in which PUCCH cannot be transmitted may include, for example, a case where the slot to which the first type PUCCH is allocated is changed to a DL symbol centric slot or a slot configuration including only DL symbols, a case where the slot to which the second type PUCCH is allocated is changed to a slot configuration including only DL symbols, or the like.

When the configuration of the slot indicated for transmission of PUCCH is changed, if transmission of PUCCH is possible (or valid, suitable) in the changed slot configuration, the terminal may perform transmission of PUCCH by using the changed slot. However, in order to transmit PUCCH even when the configuration of the indicated slot is changed and thus contradicts transmission of PUCCH, a special protocol between the terminal and the base station is required.

Hereinafter, in the present specification, a method of processing PUCCH under a contradicted slot configuration will be described. Since uplink control information (UCI) may be transmitted to a base station through PUCCH, PUCCH described herein may be used interchangeably with UCI. For example, a method of processing PUCCH in a contradicted slot configuration corresponds to a method of processing UCI (HARQ-ACK, RI, etc.) in a contradicted slot configuration.

(Method 1)—Method of Processing PUCCH in Indicated Slot

First, a PUCCH processing method under a contradicted slot configuration when allocated PUCCH is the first type PUCCH will be described. UCI (HARQ-ACK, RI, CSI, etc.) described with reference to FIG. 3 is mapped to the first type PUCCH.

In description of PUCCH processing method, the terminal may receive group common PDCCH including a slot configuration information indicator of a slot indicated for transmission of the first type PUCCH, and the terminal may perform transmission of the first type PUCCH or the second type PUCCH in the indicated slot. In order for the terminal to transmit the first type PUCCH or the second type PUCCH in the indicated slot, the following conditions may be considered.

As an example, the terminal may transmit the first type PUCCH in the indicated slot on the basis of a result of comparing a UL symbol according to a slot configuration of the slot indicated for transmission of the first type PUCCH with a UL symbol assigned to transmission of the first type PUCCH. If the UL symbol according to the slot configuration in the slot indicated for transmission of the first type PUCCH is larger than (or greater than or equal to) the UL symbol required for transmission of the first type PUCCH, the terminal transmits the first type PUCCH in an assigned resource in the slot.

As another example, the terminal may transmit first type PUCCH or drop or suspend the transmission on the basis of a result of comparing the number of UL symbols according to a slot configuration in a slot indicated for transmission of the first type PUCCH with the number of UL symbols required for transmission of the first type PUCCH. Specifically, if the number of UL symbols according to the slot configuration in the slot indicated for transmission of the first type PUCCH is less than the number of UL symbols required for transmission of the first type PUCCH, the terminal may drop transmission of the first type PUCCH in the indicated slot. For example, if the slot indicated for transmission of PUCCH corresponds to multiple slots, the terminal may delay transmission of the first type PUCCH to a second slot that provides a UL symbol required for transmission of the first type PUCCH, instead of a scheduled first slot, thereby transmitting the first type PUCCH on the second slot. On the other hand, if the slot indicated for transmission of PUCCH is a single slot, the terminal may drop or suspend the scheduled first type PUCCH transmission.

As another example, the terminal may transmit first type PUCCH on the basis of a result of comparing the number of UL symbols according to a slot configuration in a slot indicated for transmission of the first type PUCCH, the number of flexible symbols, and the number of UL symbols assigned to transmission of the first type PUCCH. Specifically, if the sum of the number of UL symbols and the number of flexible symbols according to the slot configuration in the slot indicated for transmission of the first type PUCCH is larger than (or greater than or equal to) the number of UL symbols required for transmission of the first type PUCCH, the terminal transmits the first type PUCCH in an assigned resource in the slot.

As another example, the terminal may transmit the first type PUCCH or drop or suspend the transmission on the basis of a result of comparing the number of UL symbols according to the slot configuration in the slot indicated for transmission of the first type PUCCH, the number of flexible symbols, and the number of UL symbols assigned for transmitting the first type PUCCH.

Specifically, if the sum of the number of UL symbols and the number of flexible symbols according to the slot configuration in the slot indicated for transmission of the first type PUCCH is less than the number of UL symbols required for transmission of the first type PUCCH, the terminal may drop transmission of the first type PUCCH in the indicated slot. If the slot indicated for transmission of PUCCH corresponds to multiple slots, the terminal may transmit the first type PUCCH in a slot that satisfies the number of UL symbols assigned to transmission of the first type PUCCH among the multiple slots. On the other hand, if the slot indicated for transmission of PUCCH is a single slot, the terminal may drop or suspend the scheduled first type PUCCH transmission.

In another example of the method of processing PUCCH, the terminal may receive group common PDCCH and UE-specific PDCCH indicating a slot configuration of a slot indicated for transmission of first type PUCCH, and may transmit the first type PUCCH or the second type PUCCH according to a condition to be described later. In this case, the terminal may determine whether to transmit the first type PUCCH in the indicated slot, based on a condition according to the following examples.

Figure 14:
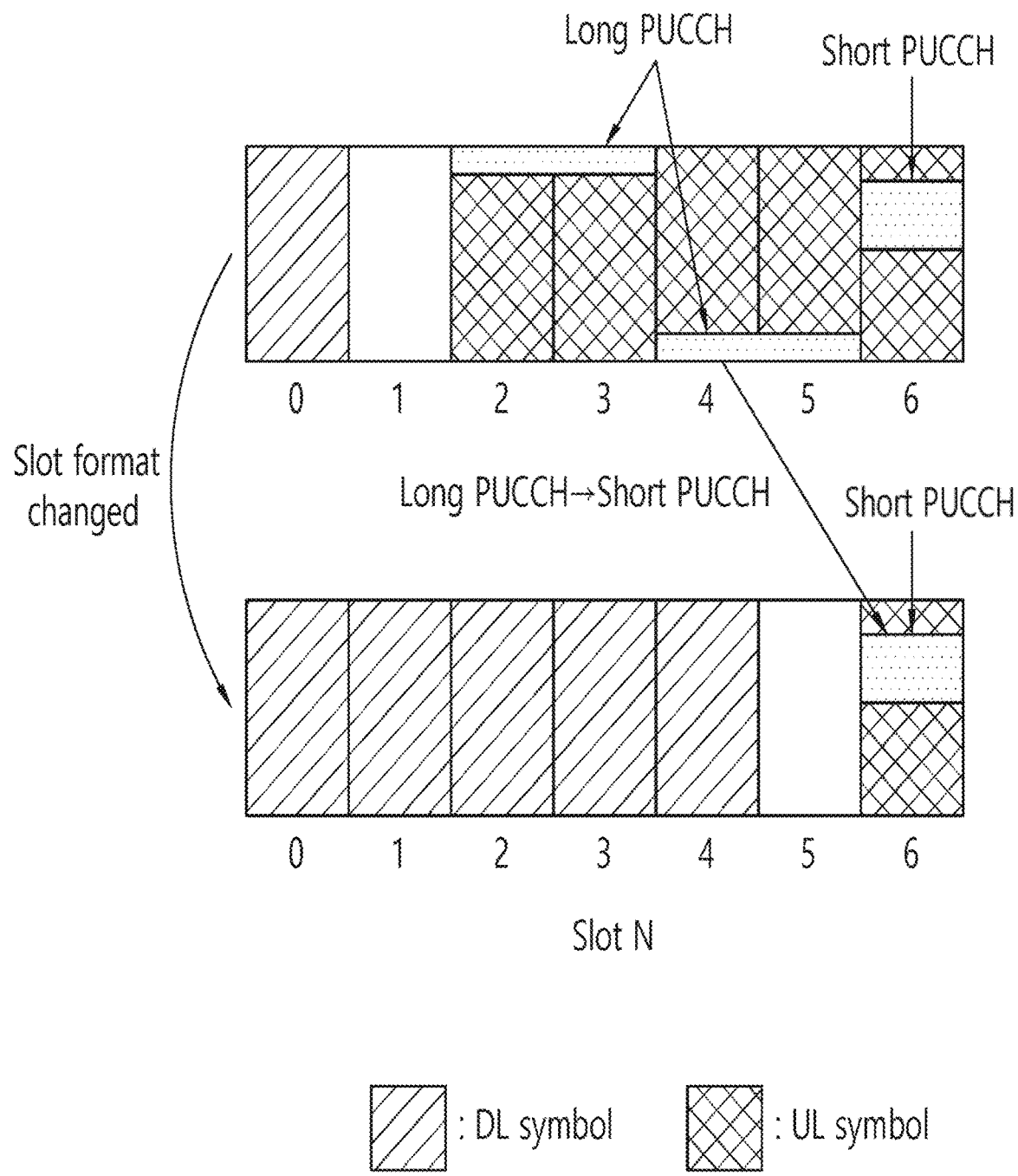
FIG. 14 is a diagram illustrating a method of transmitting PUCCH in a slot.

FIG. 14 is a diagram illustrating a method of transmitting PUCCH on a slot according to an embodiment of the present disclosure.

As an example, i) a base station may change a configuration of a slot to which first type PUCCH is allocated, ii) when a terminal successfully receives group common PDCCH and UE-specific PDCCH indicating the configuration of the slot to which the first type PUCCH is allocated, iii) if the configuration of the slot corresponds to a slot in which the first type PUCCH can be transmitted, the terminal may transmit the first type PUCCH in an allocated resource of the slot.

As another example, i) the base station may change the configuration of the slot to which the first type PUCCH is allocated, ii) the terminal may successfully receive group common PDCCH and UE-specific PDCCH indicating the configuration of the slot to which the first type PUCCH is allocated. However, iii) if the configuration of the slot corresponds to a slot in which the first type PUCCH cannot be transmitted, the terminal may not perform transmission of the first type PUCCH in the slot, may transmit the first type PUCCH corresponding to the changed slot configuration, or may transmit (referring to FIG. 14) second type PUCCH in the slot instead of the first type PUCCH. The specific PUCCH transmission operation of the terminal is summarized as follows.

a. The terminal does not perform allocated first type PUCCH transmission.

b-1. In a case of a slot configuration (or format) having a length (e.g., 4 to 12 symbols) of a symbol that can configure the first type PUCCH, if the number of UL symbols which may configure the first type PUCCH in the corresponding slot is less than the preconfigured number of first type PUCCH symbols to be transmitted, the terminal transmits the first type PUCCH in accordance with UL symbols transmittable in the changed slot configuration (or format) or corresponding to at least 4 symbols in length even if it is less than the number of UL symbols.

b-2. Transmission of UCI intended for the terminal may be configured so that the terminal transmits the first type PUCCH corresponding to a fixed symbol length (i.e. 4 symbol length) regardless of the UL symbol transmittable in the corresponding slot.

c. Although the configuration of the slot enables no first type PUCCH, if the slot is capable of transmitting the second type PUCCH, the terminal may transmit, instead of transmitting the allocated first type PUCCH, the second type PUCCH in the slot. The amount of UCI transmittable through the second type PUCCH in the slot may be limited. In this case, the terminal may transmit the UCI, based on at least one of the following several methods.

c-1. The terminal may transmit some information according to the importance of the UCI to be transmitted through the first type PUCCH. For example, the importance or priority of the information transmittable in the first type PUCCH may be defined in the order of HARQ-ACK, rank information (RI), channel state information (CSI), beam-related information (BRI) (e.g., beam recovery request) (i.e., HARQ-ACK>RI>CSI>BRI). As another example, the importance or priority of information transmittable in the first type PUCCH may be defined in the order of HARQ-ACK, beam-related information, RI, and CSI (i.e., HARQ-ACK>BRI>RI>CSI). As another example, the importance or priority of information transmittable in the first type PUCCH may be defined in the order of beam-related information, HARQ-ACK, RI, and CSI (i.e., BRI>HARQ-ACK>RI>CSI).

c-2. The terminal may transmit some information of high importance through the second type PUCCH according to the amount of UCI transmittable through the second type PUCCH.

c-3. When information to be transmitted in the first type PUCCH includes information of a primary cell (PCell) and a secondary cell (SCell), the terminal may transmit some information according to the importance or priority between the PCell and the SCell. For example, the terminal may transmit only information related to the PCell through the second type PUCCH. As another example, when information to be transmitted in the first type PUCCH includes information of a PCell or a primary secondary cell (PSCell), the terminal may transmit only information related to the PCell or PSCell through the second type PUCCH.

c-4. The terminal may preferentially transmit UCI for DL associated with a PUCCH transmittable cell (e.g., SIB linked DL Cell) on each PUCCH group through the second type PUCCH.

c-5. The terminal may transmit the second type PUCCH, based on the importance between the SCell and the PCell and the importance of the UCI. For example, the terminal may transmit a type of UCI having a high priority among UCI (HARQ-ACK, BRI, RI, CSI, etc.) related to the PCell through the second type PUCCH. In c-5, rather than a type of UCI to be transmitted through the second type PUCCH, a serving cell to which the UCI is related is preferentially considered. Of course, a type of UCI to be transmitted through the second type PUCCH may be considered preferentially over a serving cell to which the UCI is related. The priority between the serving cell and the UCI may be, while being included in configuration information such as RRC signaling, transmitted to the terminal by the base station, or may be individually defined according to a payload size of the second type PUCCH.

c-6. The terminal may transmit only UCI up to a specific bit through the second type PUCCH according to the payload size of the UCI. For example, the terminal may be configured to transmit UCI up to X bits through the second type PUCCH, where X may be 2 to several tens of bits.

c-7. The terminal may be configured to transmit HARQ-ACK or BRI up to X bits through the second type PUCCH on the basis of a specific type of UCI (i.e., HARQ-ACK or BRI), where X may be 2 to several tens of bits.

As another example, there may be a case where i) the base station may change the configuration of the slot to which the first type PUCCH is allocated, and ii) the terminal successfully receives group common PDCCH and UE-specific PDCCH indicating the configuration of the slot to which the first type PUCCH is allocated. In this case, iii) the configuration of the slot corresponds to a slot in which first type PUCCH may be transmitted, iv) PUSCH is allocated to the slot (or PUSCH transmission is scheduled), and is configured for concurrent transmission of PUCCH and PUSCH, and v) if the inter-modulation distortion (IMD) may occur due to frequency separation between PUCCH and PUSCH, and it is thus configured to transmit no first type PUCCH, the terminal performs at least one of the specific operations (a to c-7).

Next, a case where the allocated PUCCH is the second type PUCCH will be described. UCI (HARQ-ACK, RI, CSI, etc.) described in FIG. 3 is mapped to the second type PUCCH.

In description of PUCCH processing method, the terminal may receive group common PDCCH including a slot configuration information indicator of a slot indicated for transmission of the second type PUCCH, and the terminal may perform transmission of the second type PUCCH in the indicated slot. In this case, conditions to be described below may be considered for whether the terminal is to perform transmission of the second type PUCCH in the indicated slot.

For example, the terminal may transmit second type PUCCH on the basis of a result of comparing the number of UL symbols according to a slot configuration in a slot indicated for transmission of the second type PUCCH with the number of UL symbols assigned to transmission of the second type PUCCH. Specifically, if the number of UL symbols according to the slot configuration in the slot indicated for transmission of the second type PUCCH is larger than (or greater than or equal to) the number of UL symbols required for transmission of the second type PUCCH, the terminal transmits the second type PUCCH in an assigned resource in the slot.

As another example, the terminal may transmit second type PUCCH or drop or suspend the transmission on the basis of a result of comparing the number of UL symbols according to a slot configuration in a slot indicated for transmission of the second type PUCCH with the number of UL symbols required for transmission of the second type PUCCH. Specifically, if the number of UL symbols according to the slot configuration in the slot indicated for transmission of the second type PUCCH is less than the number of UL symbols required for transmission of the second type PUCCH, the terminal may drop transmission of the second type PUCCH in the indicated slot. For example, if the slot indicated for transmission of PUCCH corresponds to multiple slots, the terminal may transmit the second type PUCCH in a second slot that satisfies the number of UL symbols required for transmission of the second type PUCCH among the multiple slots. On the other hand, if the slot indicated for transmission of PUCCH is a single slot, the terminal may drop or suspend the scheduled second type PUCCH transmission.

As another example, the terminal may transmit second type PUCCH on the basis of a result of comparing the number of UL symbols according to a slot configuration in a slot indicated for transmission of the second type PUCCH, the number of flexible symbols, and the number of UL symbols assigned to transmission of the second type PUCCH. Specifically, if the sum of the number of UL symbols and the number of symbols including flexible symbols according to the slot configuration in the slot indicated for transmission of the second type PUCCH is larger than (or greater than or equal to) the number of UL symbols required for transmission of the second type PUCCH, the terminal transmits the second type PUCCH in an allocated resource in the slot.

As another example, the terminal may transmit the second type PUCCH or drop or suspend the transmission on the basis of a result of comparing the number of UL symbols according to the slot configuration in the slot indicated for transmission of the second type PUCCH, the number of flexible symbols, and the number of UL symbols required for transmitting the second type PUCCH. Specifically, if the sum of the number of UL symbols and the number of flexible symbols according to the slot configuration in the slot indicated for transmission of the second type PUCCH is less than the number of UL symbols required for transmission of the second type PUCCH, the terminal may drop transmission of the second type PUCCH in the indicated slot. For example, if the slot indicated for transmission of PUCCH corresponds to multiple slots, the terminal may transmit the second type PUCCH in a second slot that satisfies the number of UL symbols required for transmission of the second type PUCCH among the multiple slots. On the other hand, if the slot indicated for transmission of PUCCH is a single slot, the terminal may drop or suspend the scheduled second type PUCCH transmission.

(Method 2)—Method of Processing PUCCH in Slot Different from Indicated Slot

In description of PUCCH processing method according to method 2, if the configuration of the slot indicated for transmission of PUCCH is changed, the terminal may perform PUCCH transmission in another slot after the indicated slot. That is, if a UL symbol carrying the PUCCH in a slot to which PUCCH is allocated overlaps a DL symbol in the slot due to a changed slot configuration, the terminal may postpone or defer transmission of PUCCH to another slot in which transmission of PUCCH is possible, instead of the indicated slot.

In the other deferred slot, PUCCH of the same type as the allocated specific type of PUCCH may be transmitted, or PUCCH of a type different from the allocated specific type of PUCCH may be transmitted. In the other deferred slot, a resource when PUCCH of the same type as PUCCH of the allocated specific type is transmitted may be different from a resource in the time domain for transmission of pre-allocated PUCCH of the specific type.

In the present specification, first, a PUCCH processing method under a contradicted slot configuration when allocated PUCCH is first type PUCCH will be described. First type PUCCH may include the UCI described in FIG. 3, in particular, HARQ-ACK, RI, CSI, and the like. Since information mapped to first type PUCCH is UCI, PUCCH described in the present specification may be used interchangeably with UCI.

FIG. 15 is a diagram illustrating an example of a configuration in which PUCCH is transmitted on another slot according to a change in a slot configuration.

Referring to FIG. 15(a), a terminal may recognize that UL symbol centric slot N to which first type PUCCH (long PUCCH) is allocated has been changed to a DL symbol centric slot configuration in which first type PUCCH cannot be transmitted by a base station, via reception of group common PDCCH and/or UE-specific PDCCH indicating the slot configuration change. In this case, the terminal may transmit first type PUCCH in deferred slot N+K without transmitting first type PUCCH in slot N. That is, in the deferred slot N+K, first type PUCCH having the same type as the allocated first type PUCCH is transmitted. Here, slot N+K is a closest slot in which the allocated first type PUCCH is transmittable, and may be a UL symbol centric slot.

That is, even if the base station changes the configuration of the slot to which first type PUCCH is allocated and the terminal succeeds in receiving group common PDCCH and UE-specific PDCCH including the slot configuration information, if the configuration of the slot corresponds to a slot in which first type PUCCH cannot be transmitted, the terminal may not transmit first type PUCCH in the slot, and may transmit first type PUCCH in a closest slot in which first type PUCCH is transmittable, from among subsequent slots.

Figure 15B:
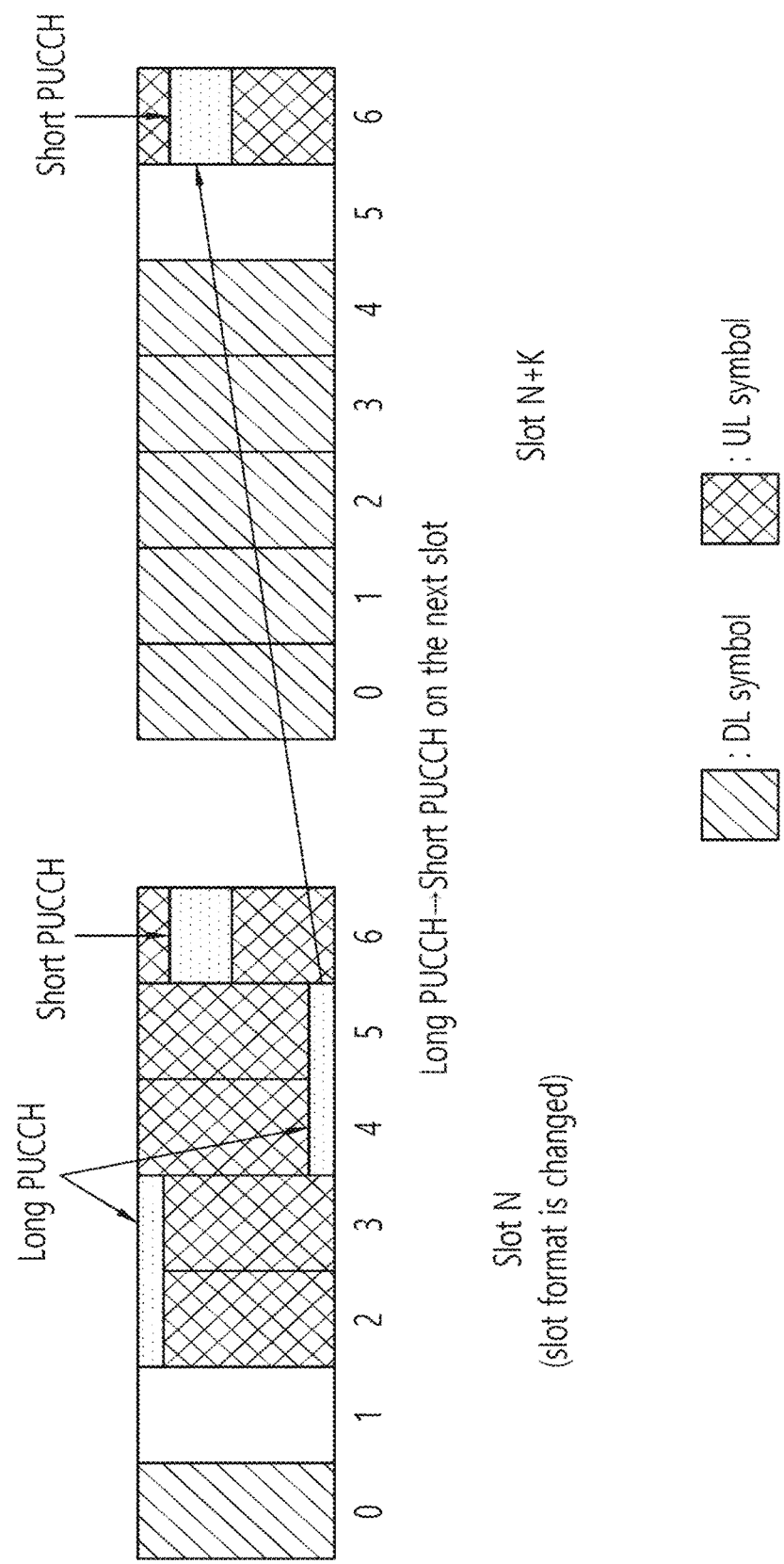

Referring to FIG. 15(b), the terminal may recognize that UL symbol centric slot N to which first type PUCCH (long PUCCH) is allocated has been changed to a slot configuration in which first type PUCCH cannot be transmitted by a base station, via reception of group common PDCCH and/or UE-specific PDCCH indicating the slot configuration change. In this case, the terminal may transmit second type PUCCH (short PUCCH) in slot N+K without transmitting first type PUCCH in slot N. In the deferred slot N+K, second type PUCCH having a type different from that of the allocated first type PUCCH is transmitted. That is, in the deferred slot N+K, second type PUCCH, which has a type changed from that of the allocated first type PUCCH, is transmitted. Here, slot N+K is a closest slot in which the second type PUCCH is transmittable, and may be a DL symbol centric slot.

That is, even if the base station changes the configuration of the slot to which first type PUCCH is allocated and the terminal succeeds in receiving group common PDCCH and UE-specific PDCCH including the slot configuration information, if the configuration of the slot corresponds to a slot in which first type PUCCH cannot be transmitted, the terminal may not transmit first type PUCCH in the slot, and may transmit the second type PUCCH in a closest slot in which the second type PUCCH is transmittable, from among subsequent slots.

Here, UCI transmitted through the second type PUCCH may include only a part of UCI that is originally scheduled for transmission according to its importance, and may not include the remaining part.

The terminal may transmit some information according to the importance of the UCI to be transmitted through first type PUCCH. For example, the importance or priority of the information transmittable in first type PUCCH may be defined in the order of HARQ-ACK, rank information (RI), channel state information (CSI), beam-related information (BRI) (e.g., beam recovery request) (i.e., HARQ-ACK>RI>CSI>BRI). As another example, the importance or priority of information transmittable in first type PUCCH may be defined in the order of HARQ-ACK, beam-related information, RI, and CSI (i.e., HARQ-ACK>BRI>RI>CSI). As another example, the importance or priority of information transmittable in first type PUCCH may be defined in the order of beam-related information, HARQ-ACK, RI, and CSI (i.e., BRI>HARQ-ACK>RI>CSI).

The terminal may transmit some information of high importance through the second type PUCCH according to the amount of UCI transmittable through the second type PUCCH.

When information to be transmitted in first type PUCCH includes information of a primary cell (PCell) and a secondary cell (SCell), the terminal may transmit some information according to the importance or priority between the PCell and the SCell. For example, the terminal may transmit only information related to the PCell through the second type PUCCH. As another example, when information to be transmitted in first type PUCCH includes information of a PCell or a primary secondary cell (PSCell), the terminal may transmit only information related to the PCell or PSCell through the second type PUCCH.

The terminal may preferentially transmit UCI for DL associated with a PUCCH transmittable cell (e.g., SIB linked DL Cell) on each PUCCH group through the second type PUCCH.

The terminal may transmit the second type PUCCH, based on the importance between the SCell and the PCell and the importance of the UCI. For example, the terminal may transmit a type of UCI having a high priority in UCIs (HARQ-ACK, beam-related information, RI, CSI, etc.) related to the primary cell through the second type PUCCH. In c-5, rather than a type of UCI to be transmitted through the second type PUCCH, a serving cell to which the UCI is related is preferentially considered. Of course, a type of UCI to be transmitted through the second type PUCCH may be considered preferentially over a serving cell to which the UCI is related. The priority between the serving cell and the UCI may be, while being included in configuration information such as RRC signaling, transmitted to the terminal by the base station, or may be individually defined according to a payload size of the second type PUCCH.

The terminal may transmit only UCI up to a specific bit through the second type PUCCH according to the payload size of the UCI. For example, the terminal may be configured to transmit UCI up to X bits through the second type PUCCH, where X may be 2 to several tens of bits.

The terminal may be configured to transmit HARQ-ACK or BRI up to X bits through the second type PUCCH on the basis of a specific type of UCI (i.e., HARQ-ACK or BRI), where X may be 2 to several tens of bits.

(Method 3)—Method of Processing HARQ-ACK in Slot Different from Indicated Slot

In description of the HARQ-ACK processing method, the base station may change the configuration of slot N to which PUCCH is allocated, and the terminal may receive group common PDCCH and/or UE-specific PDCCH including information on the changed slot configuration. If the allocated PUCCH cannot be transmitted under the changed slot configuration (i.e., if the changed slot configuration is contradicted to the allocated PUCCH), the terminal may transmit the allocated PUCCH after deferring HARQ-ACK information from slot N by K slots (i.e., N+K) among the allocated PUCCHs. The "allocated PUCCH" may be first type PUCCH or second type PUCCH. Value K may be determined according to the time taken by the base station to PUCCH feedback in PDSCH scheduling. No PUCCH for HARQ-ACK feedback of another terminal may be allocated in a slot, in which PUCCH is transmittable, after slot N+K. For example, when the terminal and the base station communicate with each other based on frequency division duplex (FDD), PUCCH for HARQ-ACK of other terminals may not be transmitted (or allocated) (common to 3GPP LTE, LTE-A, and NR) in a slot for transmission after 4 ms. Value K may be provided via an RRC signal.

In description of another HARQ-ACK processing method, the base station may change the configuration of slot N to which first type PUCCH is allocated, and the terminal may receive group common PDCCH and/or UE-specific PDCCH including information on the changed slot configuration. If, based on the changed slot configuration, first type PUCCH cannot be transmitted, but the second type PUCCH can be transmitted, the terminal may wait or request for PUCCH reallocation of the base station without transmitting first type PUCCH. For example, the base station may retransmit PDSCH to the terminal that has transmitted no first type PUCCH including the HARQ-ACK of PDSCH and may assign a resource in which first type PUCCH is newly transmitted in PDCCH for scheduling of PDSCH.

In description of another HARQ-ACK processing method, the base station may change the configuration of slot N to which PUCCH is allocated, and if the terminal has failed to receive group common PDCCH for transmission of the configuration information of slot N but has received UE-specific PDCCH for scheduling of PDSCH (or PUSCH) so as to know the slot configuration of slot N, the terminal may selectively transmit the PUCCH on the basis of the slot configuration. For example, if the slot configuration is a slot configuration in which the allocated PUCCH is transmittable, the terminal may transmit the PUCCH. As another example, if the slot configuration is a slot configuration in which the allocated PUCCH cannot be transmitted, the terminal may not transmit PUCCH. Here, the allocated PUCCH may be first type PUCCH or second type PUCCH.

Third Embodiment

The third embodiment relates to information on a slot configuration transmitted to a terminal by a base station, and a method of operating a terminal and a base station on the basis of the information. The base station may inform the terminal of information on the slot configuration by using a variety of information and procedures.

(Method 1)—Information on Slot Configuration

The information on a slot configuration includes semi-static DL/UL assignment information. For example, the base station may transmit a default slot format or semi-static DL/UL assignment information (or semi-static slot-format information (SFI)) to the terminal in a cell-specific manner, and may additionally transmit semi-static DL/UL assignment information to the terminal via a UE-specific RRC message. When the semi-static DL/UL assignment information (or default slot format) is received, the terminal may know slot configurations of subsequent slots. Specifically, semi-static DL/UL assignment information (or default slot format) indicates information on whether each symbol in the slot is a DL symbol, a UL symbol, or a flexible symbol other than the DL symbol and the UL symbol. Here, the terminal may assume that a symbol indicated as neither a DL symbol nor a UL symbol is indicated as "flexible", via semi-static DL/UL assignment information (or default slot format).

Information on the slot configuration includes dynamic slot-format information (SFI) included in group common PDCCH so as to be transmitted. The dynamic slot format information indicates information on whether each symbol in the slot is a DL symbol, a UL symbol, or a flexible symbol other than the DL symbol and the UL symbol. The flexible symbol may replace a gap and may be used for different purposes other than the gap. Group common PDCCH in which dynamic slot format information is transmitted may be scrambled with SFI-RNTI. Whether the terminal monitors the dynamic slot format information may be configured or indicated by an RRC message. The terminal not indicated for monitoring by the RRC message may not monitor the dynamic slot format information.

Information on the slot configuration may be scheduling information included in downlink control information (DCI) mapped to UE-specific PDCCH. For example, if information on a start position and a length of PDSCH is included in DCI, symbols in which the PDSCH is scheduled may be assumed to be DL symbols. If information on a start position and a length of PUSCH is included in DCI, symbols in which the PUSCH is scheduled may be assumed to be UL symbols. If information on a start position and a length of PUCCH for HARQ-ACK transmission is included in DCI, the symbols in which PUCCH is scheduled may be assumed to be UL symbols.

(Method 2)—Method of Determining Symbol Direction and Method of Processing PUCCH Since there is a variety of information on a slot configuration as described above, the terminal may receive information on different types of slot configuration for the same slot. Further, the base station may allow information on each slot configuration to indicate a different symbol direction in the same slot. In this case, a change or determination of a symbol direction by the terminal and the base station may follow the rules below.

The directions of DL symbols and UL symbols of semi-static DL/UL assignment information (or default slot format) are not changed by dynamic slot configuration information or scheduling information. Therefore, if PUCCH is located in UL symbols configured by semi-static DL/UL assignment information (or default slot format), the terminal may transmit PUCCH regardless of dynamic slot configuration information or scheduling information. If at least one of the symbols to which PUCCH is allocated overlaps the DL symbol of the default slot format, the terminal may not transmit the corresponding PUCCH, or may change the length of PUCCH in accordance with the length of the remaining symbols except for the corresponding DL symbol so as to transmit PUCCH. Here, the allocated PUCCH may be first type PUCCH or second type PUCCH.

The direction of the flexible symbol configured by the semi-static DL/UL assignment information (or default slot format) may be determined or changed by dynamic slot configuration information or scheduling information. If at least one of the symbols to which PUCCH is allocated overlaps the flexible symbol of semi-static DL/UL assignment information (or default slot format), the terminal may determine whether to transmit PUCCH according to the type (HARQ-ACK, RI, SR, CSI, etc.) of the information (i.e., UCI) transmitted by PUCCH. PUCCH may be first type PUCCH or second type PUCCH. For example, if the information transmitted through PUCCH includes the HARQ-ACK for PDSCH, the terminal transmits PUCCH at a determined position regardless of the dynamic slot configuration information indicated by group common PDCCH. Here, the determined position is indicated in DCI for scheduling of the PDSCH. If the information transmitted through PUCCH does not include HARQ-ACK for PDSCH, the terminal transmits PUCCH when the flexible symbol overlapping PUCCH is indicated as the UL symbol by the dynamic slot configuration information.

If at least one of the symbols to which PUCCH is allocated is indicated as a different symbol (e.g., DL symbol or flexible symbol) other than the UL symbol by dynamic slot configuration information, the terminal does not transmit PUCCH. Alternatively, if the terminal fails to receive the dynamic slot configuration information for the symbol to which PUCCH is allocated, the terminal does not transmit PUCCH.

If at least one of the symbols to which PUCCH is allocated overlaps the flexible symbol configured by semi-static DL/UL assignment, the terminal may determine whether to transmit PUCCH according to signaling that triggers transmission of PUCCH. For example, if PUCCH is triggered via DCI, the terminal transmits PUCCH at a determined position regardless of the dynamic slot configuration information. Here, the determined position is indicated in the DCI. If PUCCH is triggered through the UE-specific RRC message, the terminal transmits PUCCH when the symbols to which PUCCH is allocated are indicated as the UL symbol by the dynamic slot configuration information.

If at least one of the symbols to which PUCCH is allocated is indicated as a different symbol (e.g., DL symbol or flexible symbol) other than the UL symbol by dynamic slot configuration information, the terminal does not transmit PUCCH. Alternatively, if the terminal fails to receive the dynamic slot configuration information for the symbol to which PUCCH is allocated, the terminal does not transmit PUCCH.

(Method 3)—Method of Processing Repetition PUCCH

The terminal may repeatedly transmit PUCCH over several slots. In the present specification, this PUCCH is described as repetition PUCCH. Repetition PUCCH may be first type PUCCH or second type PUCCH. The base station may configure the number of slots, in which repetition PUCCH is transmitted, to the terminal via an RRC message.

Within each slot, a start symbol and an end symbol of PUCCH may be the same for each repeated slot. According to each case where DL symbols, UL symbols, and flexible symbols are configured by RRC, such as semi-static DL/UL assignment information (or default slot pattern), and the dynamic slot configuration information, the terminal may or may not transmit repetition PUCCH. Hereinafter, a method of processing repetition PUCCH in each case will be described.

(Method 3-1)—When Repetition PUCCH Overlaps UL Symbol

If UL symbols configured with semi-static DL/UL assignment information (or default slot pattern) are located in each of slots indicated for transmission of repetition PUCCH, the terminal may transmit PUCCH in the slot in which the UL symbols are located regardless of reception of the dynamic slot configuration information or the scheduling information. Here, Directions of DL symbols and UL symbols according to the slot configuration configured by the RRC message, such as semi-static DL/UL assignment information (or the default slot pattern), are not changed by the dynamic slot configuration information or the scheduling information.

(Method 3-2)—When Repetition PUCCH Overlaps DL Symbol

If at least one of symbols assigned to repetition PUCCH in each slot among the slots indicated for transmission of repetition PUCCH overlaps the DL symbol according to the semi-static DL/UL assignment information, the terminal does not transmit PUCCH in a slot including a symbol overlapping the DL symbol or transmits PUCCH by changing the length thereof in accordance with the length of the remaining symbols except for the overlapping DL symbol. Alternatively, if at least one of the symbols assigned to repetition PUCCH in one of the slots indicated for transmission of repetition PUCCH overlaps the DL symbol configured with semi-static DL/UL assignment information (or default slot pattern), the terminal does not transmit repetition PUCCH in a subsequent slot as well as in the slot including the overlapping DL symbol.

(Method 3-3)—When Repetition PUCCH Overlaps Flexible Symbol

At least one of symbols to which repetition PUCCH is allocated in each slot among slots indicated for transmission of repetition PUCCH may overlap a flexible symbol configured by semi-static DL/UL assignment. In this case, i) the terminal may determine whether to transmit repetition PUCCH according to the type (HARQ-ACK, RI, CSI, etc.) of information (i.e., UCI) transmitted by repetition PUCCH. ii) The terminal may determine whether to transmit repetition PUCCH according to signaling that triggers PUCCH transmission. iii) The terminal may determine whether to transmit repetition PUCCH according to the dynamic slot configuration information. Repetition PUCCH may be first type PUCCH or second type PUCCH.

The terminal may determine whether to transmit repetition PUCCH according to the type (HARQ-ACK, RI, CSI, etc.) of information (i.e., UCI) transmitted by repetition PUCCH. For example, if information transmitted through repetition PUCCH includes HARQ-ACK for PDSCH scheduled by PDCCH, the terminal transmits repetition PUCCH at a determined position regardless of the dynamic slot configuration information indicated by group common PDCCH. Here, the determined position is indicated in DCI for scheduling of the PDSCH. If the information transmitted through repetition PUCCH does not include HARQ-ACK for PDSCH or includes HARQ-ACK for PDSCH configured via RRC, the terminal transmits repetition PUCCH when the flexible symbol overlapping repetition PUCCH is indicated as the UL symbol by the dynamic slot configuration information. As another example, if at least one of symbols to which repetition PUCCH is allocated in each slot among slots indicated for transmission of repetition PUCCH is indicated as a different symbol (e.g., DL symbol or flexible symbol) other than a UL symbol by dynamic slot configuration information, the terminal does not transmit repetition PUCCH in the slot. Alternatively, if the terminal fails to receive the dynamic slot configuration information for the symbol to which repetition PUCCH is allocated, the terminal does not transmit repetition PUCCH in the slot. Even if repetition PUCCH has failed to be transmitted in the corresponding slot, if a certain condition is satisfied in a subsequent slot (when the flexible symbol overlapping repetition PUCCH is indicated as the UL symbol by the dynamic slot configuration information), the terminal transmits repetition PUCCH in the subsequent slot.

If the terminal fails to transmit repetition PUCCH in any one of the slots indicated for repetition PUCCH to be transmitted, the terminal does not perform repetition transmission of PUCCH even in subsequent slots. An example of not being able to transmit the repetition PUCCH may include contradiction in symbol directions caused by the dynamic slot configuration information, a case where the terminal fails to receive the dynamic slot configuration information, or the like.

If at least one of the symbols to which repetition PUCCH is allocated overlaps the flexible symbol configured by semi-static DL/UL assignment, the terminal may determine whether to transmit repetition PUCCH according to signaling that triggers transmission of repetition PUCCH. For example, if repetition PUCCH is triggered via DCI, the terminal transmits repetition PUCCH at a determined position regardless of the dynamic slot configuration information. Here, the determined position is indicated in the DCI. If repetition PUCCH is triggered via a UE-specific RRC message, the terminal transmits repetition PUCCH when the symbols to which repetition PUCCH is allocated are indicated as the UL symbol by the dynamic slot configuration information.

In each slot among the slots indicated for transmission of repetition PUCCH, if at least one of the symbols to which repetition PUCCH is allocated is indicated as a different symbol (e.g., DL symbol or flexible symbol) other than the UL symbol by dynamic slot configuration information, the terminal does not transmit repetition PUCCH in the slot. Alternatively, if the terminal fails to receive the dynamic slot configuration information for the symbol to which repetition PUCCH is allocated, the terminal does not transmit repetition PUCCH in the slot. Even if repetition PUCCH has failed to be transmitted in the corresponding slot, if a certain condition is satisfied in a subsequent slot, the terminal transmits repetition PUCCH in the subsequent slot. An example of the certain condition may include a case where a flexible symbol overlapping repetition PUCCH is indicated as a UL symbol by dynamic slot configuration information.

If the terminal does not transmit repetition PUCCH in the slot for some reason (contradiction in symbol directions caused by the dynamic slot configuration information, or the terminal fails to receive the dynamic slot configuration information) in one of the slots indicated for transmission of repetition PUCCH, the terminal does not perform repetition transmission of PUCCH even in the subsequent slot.

Here, the number K of slots in which PUCCH transmission is repeated (or attempted) may be configured/defined as follows.

i) K slots configured for transmission of repetition PUCCH are not necessarily consecutive. For example, if the terminal is configured to repeatedly transmit PUCCH during K slots, PUCCH may be repeatedly transmitted until the count of the number of slots actually transmitted reaches K except for the slot in which repetition PUCCH is not transmitted.

ii) K slots configured for transmission of repetition PUCCH should be consecutive. For example, if the terminal is configured to repeatedly transmit PUCCH during K slots, PUCCH may be repeatedly transmitted from slot N indicated for transmission of the repetition PUCCH until the count of the number of slots (including slots in which no repetition PUCCH is transmitted) having attempted to transmit PUCCH reaches K. That is, the terminal having first attempted to transmit PUCCH in slot N attempts to transmit PUCCH up to slot (N+K−1), and even if the number (or slots) of repetition transmissions of PUCCH actually performed is less than K, the terminal no longer transmits PUCCH in slot (N+K).

The terminal makes an attempt to transmit PUCCH in K consecutive slots from slot N indicated for transmission of repetition PUCCH, wherein the K consecutive slots are among the remaining slots except for slots in which PUCCH cannot be transmitted according to semi-static DL/UL assignment information.

FIG. 16 is a diagram illustrating a slot in which repetition PUCCH transmission is performed according to a slot configuration.

Referring to FIG. 16(a), a description is provided for a case where a terminal transmits first type PUCCH 1500 when the terminal is configured (slot configuration according to semi-static DL/UL assignment) to transmit the first type PUCCH 1500 repeatedly over two slots. Here, flexible symbols may be changed into DL symbols or UL symbols by dynamic slot configuration information or scheduling information of UE-specific DCI. A symbol in which the first type PUCCH 1500 is transmitted is assumed to be symbol 8 to symbol 13 within a slot. 14 symbols are included in one slot, and indices of the symbols are from 0 to 13.

Looking at each slot configuration according to the semi-static DL/UL assignment, symbol 0 is a DL symbol and symbol 7-symbol 13 are UL symbols, in slot 0. In slot 1, symbol 0-symbol 10 are DL symbols, and symbol 12-symbol 13 are UL symbols. In slot 2, symbol 0-symbol 1 are DL symbols, and symbol 10-symbol 13 are UL symbols. In slot 3, symbol 0 is a DL symbol, and symbol 7-symbol 13 are UL symbols. The remaining symbols except for the UL symbols and the DL symbols are flexible symbols.

Therefore, the first type PUCCH 1500 can be transmitted in slot 0 and slot 3 regardless of dynamic slot configuration information, and cannot be transmitted in slot 1 regardless of dynamic slot configuration information, and if symbol 8 and symbol 9 are indicated as the UL symbols by the dynamic slot configuration information in slot 2, the first type PUCCH 1500 may be transmitted, but may not be transmitted otherwise.

FIG. 16(a) illustrates a slot in which the terminal attempts to transmit the first type PUCCH 1500 according to the aforementioned i). In this case, since symbols 8 and 9 of slot 2 are not indicated as UL symbols by the dynamic slot configuration information, it is assumed that the terminal cannot transmit first type PUCCH. The terminal actually transmits the first type PUCCH 1500 twice in slot 0 and slot 3. Therefore, the terminal no longer repeatedly transmits the first type PUCCH 1500 after slot 3.

FIG. 16(*b*) illustrates a slot making an attempt to transmit the first type PUCCH 1500 by using the aforementioned ii). Since the first type PUCCH 1500 is configured to be repeatedly transmitted in two slots (K=2), the terminal attempts to transmit the first type PUCCH 1500 in slot 0 and slot 1. The terminal attempts to transmit first type PUCCH in slot 1, but cannot transmit first type PUCCH due to an overlap with the DL symbol according to the configuration of semi-static DL/UL assignment information.

FIG. 16(*c*) illustrates a slot attempting to transmit the first type PUCCH 1500 by using the aforementioned repetition iii). The first type PUCCH 1500 is configured to be repeatedly transmitted in two slots (K=2), but slot 1 is a slot in which first type PUCCH 1500 cannot be transmitted due to semi-static DL/UL assignment information. Therefore, the terminal attempts to transmit first type PUCCH 1500 in slots 0 and 2. Slot 2 may or may not actually transmit first type PUCCH 1500 as indicated by the dynamic slot configuration information.

Fourth Embodiment

The fourth embodiment relates to a method of transmitting a physical channel by a terminal or a base station to improve physical channel coverage in a wireless communication system based on a slot configuration including a TDD-based DL symbol, a flexible symbol, and a UL symbol and a determination procedure relating thereto. The physical channel transmitted by the terminal is a physical uplink channel and includes PRACH, PUCCH, PUSCH, SRS, and the like. The physical channel transmitted by the base station is a physical downlink channel and includes PDSCH, PDCCH, PBCH, and the like. Hereinafter, in the present specification, procedures for a terminal and a base station for repetition transmission of PUCCH are defined, procedures for a terminal and a base station for repetition transmission of PUSCH are defined, and procedures of a terminal and a base station for a method of repetition transmission of PDSCH are defined. PUCCH or repetition PUCCH described below may be first type PUCCH or second type PUCCH.

(Method 1)—Resource Determination Procedures of Terminal and Base Station, for Repetition Transmission of PUCCH The number of slots in which PUCCH is transmitted or the number of repetitions of PUCCH transmission may be one of predetermined values (e.g., 1, 2, 4, and 8), and a value actually configured to the terminal among the values is transmitted by an RRC message. If the number of repetitions of PUCCH transmission is configured to 1, this indicates general PUCCH transmission rather than repeatedly transmitted PUCCH.

A starting point and a length of a symbol in a slot in which PUCCH is transmitted are included in information related to one PUCCH resource configured by the base station. Information related to the PUCCH resource may be configured by an RRC parameter. A PUCCH resource set including at least one PUCCH resource may be configured or assigned to the terminal by RRC signaling. The base station may indicate, to the terminal, at least one PUCCH resource index in the PUCCH resource set via dynamic signaling (i.e., DCI). For example, the base station may indicate the PUCCH resource index to the terminal, based on a PUCCH resource indicator (PRI) included in DCI or a combination of PRI and implicit mapping. PRI may have a size of 2 bits or 3 bits.

In this way, the configured PUCCH resource set or PUCCH resource index may be maintained the same over multiple slots in which PUCCH is repeatedly transmitted. The terminal determines whether to transmit PUCCH indicated by DCI, and the determination is made based on semi-static DL/UL assignment information. The semi-static DL/UL assignment information may include at least one of UL-DL configuration common information (TDD-UL-DL-ConfigurationCommon) that may be indicated via RRC signaling, and UL-DL configuration dedicated information (TDD-UL-DL-ConfigDedicated) that may be additionally indicated to the terminal via RRC signaling.

For example, i) the UL-DL configuration common information may indicate a period in which semi-static DL/UL assignment information is applied, and may indicate the number of DL symbols, the number of UL symbols, and the number of flexible symbols configured over multiple slots included in the period. ii) the UL-DL configuration dedicated information may include information for overriding a flexible symbol in a semi-static DL/UL slot configuration provided by the UL-DL configuration common information with a UL symbol, a DL symbol, and a flexible symbol. That is, the terminal may override the flexible symbol in the slot format provided by the UL-DL configuration common information with another type of symbol on the basis of the UL-DL configuration dedicated information.

If a symbol in which PUCCH is to be transmitted overlaps the symbol(s) indicated by semi-static UL/DL assignment information (at least one of UL-DL configuration common information and UL-DL configuration dedicated information) in each slot indicated by the base station for PUCCH transmission, the terminal determines whether to transmit the PUCCH, based on the direction of the indicated symbol(s). For example, if the symbol(s) in the slot indicated by the base station are DL symbols, the terminal defers transmission of PUCCH to a subsequent slot, and if one of the indicated symbol(s) is a UL symbol(s) and a flexible symbol(s), the terminal transmits PUCCH in the corresponding slot. As another example, if a symbol in the slot indicated by the base station is a DL symbol or a flexible symbol(s), the terminal defers transmission of PUCCH to a subsequent slot, and if the indicated symbol is a UL symbol, the terminal transmits PUCCH in the corresponding slot. PUCCH that is not transmitted in the corresponding slot may be deferred to the subsequent slot.

The terminal repeatedly transmits PUCCH on multiple slots until the number of repetitions of PUCCH transmission, which is indicated/configured by the RRC message, is reached. The terminal may determine a slot for transmission of PUCCH on the multiple slots, based on a UL symbol and an unknown (or flexible) symbol according to information transmitted via an RRC message. For example, the terminal may determine a slot including a start position of a symbol for PUCCH transmission and the number of UL symbols, as a slot resource for performing PUCCH transmission. The slot includes a UL symbol and a flexible symbol configured by the RRC message. The base station may receive PUCCH repeatedly transmitted by the terminal via multiple slots, based on at least one of UL-DL configuration common information and UL-DL configuration dedicated information.

If at least one of symbols in which PUCCH is transmitted in a first slot of the slots to which repetition PUCCH transmission is assigned overlaps a DL symbol, the terminal cancels PUCCH transmission without transmitting PUCCH in the corresponding slot. That is, if the symbols in which PUCCH is transmitted in the first slot of the slots in which repetition PUCCH transmission is assigned are configured by UL symbol(s) and a flexible symbol, the terminal may transmit PUCCH in the corresponding slot. If at least one of the symbols in which PUCCH is transmitted, after PUCCH transmission in a slot subsequent to the first slot of the slots to which repetition PUCCH transmission is assigned, overlaps a DL symbol or a flexible symbol, the terminal cancels PUCCH transmission without transmitting PUCCH in the slot. That is, if the slot, in which PUCCH transmission is indicated by the base station in the slot subsequent to the first slot of the slots to which repetition PUCCH transmission is assigned, and the symbols of the slot are configured by the UL symbol(s), that is, symbols indicated for transmission of PUCCH, the terminal may transmit PUCCH in the corresponding slot.

Hereinafter, a PUCCH processing method related to a gap symbol is described.

There may be a gap for DL-UL switching between a DL symbol and an UL symbol. A gap may be located in a flexible symbol. That is, some symbol(s) of the flexible symbol(s) between the DL symbol and the UL symbol may be used for the DL-UL switching gap and may not be used for DL reception or UL transmission. If the number of symbols for the gap is denoted as G, G may be fixed to a specific value such as 1 or 2, may be set/configured to the terminal by an RRC message, and may be obtained via a timing advance (TA) value.

If the symbol in which PUCCH is to be transmitted overlaps the symbol(s) configured by semi-static UL/DL assignment information (at least one of UL-DL configuration common information and UL-DL configuration dedicated information) in each slot indicated by the base station for PUCCH transmission, the terminal determines whether to transmit the PUCCH, based on a type (or direction) of the indicated symbol(s). For example, if the indicated symbol(s) are all UL symbols, the terminal transmits PUCCH, and if at least one of the indicated symbol(s) includes a DL symbol or one of G consecutive flexible symbol(s) immediately subsequent to the DL symbol, the terminal does not transmit PUCCH in the corresponding slot. The terminal may defer, to a subsequent slot, PUCCH that is not transmitted in the corresponding slot. In other words, in the slot indicated by the base station for PUCCH transmission, if the symbol in which PUCCH is to be transmitted is a UL symbol, the terminal transmits PUCCH, and if the symbol in which PUCCH is to be transmitted overlaps a DL symbol or at least one of G consecutive flexible symbol(s) immediately subsequent to the DL symbol, the terminal does not transmit PUCCH in the slot. The terminal may defer, to a subsequent slot, PUCCH that is not transmitted in the corresponding slot. That is, PUCCH is not transmitted if overlapped with any one of G symbols that can be used as a gap with a DL symbol, and transmission is deferred to a subsequent slot.

In relation to the PUCCH processing method in multiple slots, the terminal repeatedly transmits PUCCH until the number of repetitions of PUCCH transmission set/configured by the RRC message is reached on the multiple slots. The terminal may determine a slot for PUCCH transmission on the multiple slots, based on the type and number of symbols according to information transmitted via the RRC message.

The terminal determines a slot for PUCCH transmission, based on the number of UL symbols, the number of flexible symbols, and the number of gap symbols set/configured by semi-static UL/DL assignment information. For example, if "the number of UL symbols+the number of flexible symbols—the number of gap symbols" in a slot includes a transmission start symbol position of PUCCH and the number of UL symbols in which PUCCH is to be transmitted, the terminal may determine the corresponding slot as a slot for PUCCH transmission and may transmit PUCCH. Alternatively, when considering that one slot includes 14 symbols, if "14−(the number of DL symbols in slot+the number of gap symbols)" includes a transmission start symbol position of PUCCH and the number of UL symbols in which PUCCH is to be transmitted, the terminal may determine the corresponding slot as a slot for PUCCH transmission and may transmit PUCCH.

In this case, the base station may receive PUCCH repeatedly transmitted by the terminal via multiple slots, based on at least one of UL-DL configuration common information and UL-DL configuration dedicated information.

FIG. 17 illustrates whether PUCCH is transmitted according to a slot configuration.

Referring to FIG. 17, a slot configuration configured according to semi-static DL/UL assignment information includes five DL symbols (denoted as "D"), three flexible symbols (denoted as "X"), and six UL symbols (denoted as "U") in sequence.

For PUCCH allocation #0, an 8th symbol to a 14th symbol are configured as resources for PUCCH transmission, and for PUCCH allocation #1, a 7th symbol to the 14th symbol are configured as resources for PUCCH transmission, and for PUCCH allocation #3, a 6th symbol to the 14th symbol are configured as resources for PUCCH transmission.

FIG. 17(a) illustrates a case where a gap corresponds to one symbol (G=1). If G=1, PUCCH allocation #0 and PUCCH allocation #1 which do not include one flexible symbol immediately subsequent to DL symbols are transmittable, but PUCCH allocation #2 including one flexible symbol immediately subsequent to DL symbols cannot be transmitted. In this case, transmission of PUCCH allocation #2 may be deferred to a subsequent slot. Of course, the terminal also determines, based on the same criteria, whether to transmit PUCCH allocation #2 in the subsequent slot.

FIG. 17(b) illustrates a case where a gap corresponds to two symbols (G=2). If G=2, PUCCH allocation #0 which does not include two consecutive or flexible symbols immediately subsequent to DL symbols are transmittable, but PUCCH allocation #1 and PUCCH allocation #2 which include two consecutive flexible symbols immediately subsequent to DL symbols cannot be transmitted. In this case, transmission of PUCCH allocations #1 and #2 may be deferred to a subsequent slot. Of course, the terminal also determines, based on the same criteria, whether to transmit PUCCH allocations #1 and #2 in the subsequent slot.

(Method 2)—Resource Determination Procedures of Terminal and Base Station, for Repetition Transmission of PUSCH The number of slots in which PUSCH is transmitted or the number of repetitions of PUCCH transmission may be, for example, one of predetermined values (e.g., 1, 2, 4, and 8), and a value actually configured to the terminal among the values is transmitted by an RRC message. If the number of repetitions of PUSCH transmission is configured to 1, this indicates general PUSCH rather than repeatedly transmitted PUSCH.

In a case of PUSCH transmission, PUSCH transmission is performed only in a slot configuration suitable for PUSCH transmission from among K consecutive slots, and a postponing operation of PUSCH transmission is not performed.

A start symbol and a length (transmission duration) of PUSCH transmission in a slot are indicated by DCI, and may be maintained the same in all slots. The terminal determines whether to transmit PUSCH indicated by DCI, and whether to transmit PUSCH may be determined based on semi-static DL/UL assignment information. The semi-static DL/UL assignment information used for determining whether to transmit PUSCH may include at least one of UL-DL configuration common information (TDD-UL-DL-ConfigurationCommon) that may be indicated via RRC signaling, and UL-DL configuration dedicated information (TDD-UL-DL-ConfigDedicated) that may be additionally indicated to the terminal via RRC signaling. For example, the UL-DL configuration common information may indicate a period to apply semi-static DL/UL assignment information. The UL-DL configuration common information may be used to configure the number of UL/DL symbols per slot, which is configured over multiple slots included in the period, a slot format configured by the number of UL/DL symbols per slot and the number of flexible symbols per slot, and the number of slots. That is, the terminal may configure a slot format for each slot by using the number of slots indicated by the UL-DL configuration common information. As another example, the UL-DL configuration dedicated information may include information for overriding a flexible symbol in a semi-static DL/UL slot configuration provided by the UL-DL configuration common information with a UL symbol, a DL symbol, and a flexible symbol. That is, the terminal may override the flexible symbol in the slot format provided by the UL-DL configuration common information with another type of symbol on the basis of the UL-DL configuration dedicated information.

If the symbol in which PUSCH is to be transmitted overlaps the symbol(s) indicated by semi-static UL/DL assignment information (at least one of UL-DL configuration common information and UL-DL configuration dedicated information) in each slot indicated by the base station for PUSCH transmission, the terminal determines whether to transmit the PUSCH, based on a type (or direction) of the indicated symbol(s). For example, if at least one of the indicated symbol(s) is a DL symbol, the terminal does not perform PUSCH transmission and cancels PUSCH transmission. If the indicated symbol(s) are UL symbol(s) and flexible symbol(s), the terminal transmits PUSCH in the corresponding slot. As another example, if at least one of the indicated symbol(s) is a DL symbol or a flexible symbol(s), the terminal does not perform PUSCH transmission and cancels PUSCH transmission. If the indicated symbol(s) are UL symbols, the terminal transmits PUSCH in the corresponding slot.

If at least one of the symbols for PUSCH transmission in a first slot of the slots indicated for repetition PUSCH transmission overlaps a DL symbol, the terminal does not transmit PUSCH in the corresponding slot and cancels PUSCH transmission. That is, if symbols for PUSCH transmission in the first slot of the slots indicated for repetition PUSCH transmission are configured by a UL symbol(s) and a flexible symbol, the terminal may transmit PUSCH in the corresponding slot. If at least one of the symbols for PUSCH transmission in a slot subsequent to the first slot of the slots indicated for repetition PUSCH transmission overlaps a DL symbol or a flexible symbol, the terminal does not transmit PUSCH in the corresponding slot and cancels PUSCH transmission. That is, if the symbols configured/indicated for PUSCH transmission in a slot subsequent to the first slot of the slots indicated for repetition PUSCH transmission are configured by UL symbol(s), the terminal may transmit PUSCH in the corresponding slot.

Hereinafter, a PUSCH processing method related to a gap symbol is described.

There may be a gap for DL-UL switching between a DL symbol and an UL symbol. A gap may be located in a flexible symbol. Some symbol(s) of the flexible symbol(s) between the DL symbol and the UL symbol may be used for a DL-UL switching gap and may not be used for DL reception or UL transmission. If the number of symbols for the gap is denoted as G, G may be fixed to a specific value such as 1 or 2, may be configured to the terminal by an RRC message, and may be obtained via a timing advance (TA) value.

If the symbol in which PUSCH is to be transmitted overlaps the symbol(s) indicated by semi-static UL/DL assignment information (at least one of UL-DL configuration common information and UL-DL configuration dedicated information) in each slot indicated by the base station for PUSCH transmission, the terminal may determine whether to transmit the PUSCH, based on the type (or direction) of the indicated symbol. For example, if all the indicated symbols are UL symbols, the terminal transmits PUSCH, and if at least one of the indicated symbols is a DL symbol or G consecutive flexible symbol(s) immediately subsequent to the DL symbol, the terminal does not transmit PUSCH in the corresponding slot. That is, in each slot indicated by the base station for PUSCH transmission, if the symbol in which PUSCH is to be transmitted is a UL symbol, the terminal transmits PUSCH, and if at least one of the symbols in which PUSCH is to be transmitted overlaps a DL symbol or at least one of G consecutive flexible symbol(s) immediately subsequent to the DL symbol, the terminal does not transmit PUSCH and cancels PUSCH transmission. That is, PUSCH is not transmitted if overlapped with any one of G symbols that can be used as a gap with a DL symbol, and transmission of PUSCH is cancelled.

(Method 3)—Resource Determination Procedures of Terminal and Base Station, for Repetition Reception of PDSCH The number of slots in which PDSCH is received or the number of repetitions of PDSCH reception may be, for example, one of predetermined values (e.g., 1, 2, 4, and 8), and a value actually configured to the terminal among the values is transmitted by an RRC message. If the number of repetitions of PDSCH reception is configured to 1, this indicates general PDSCH rather than repeatedly transmitted PDSCH.

A start symbol and a symbol duration (length) of symbols in which PDSCH is received in a slot are indicated by DCI, and may be maintained the same in all slots. The terminal determines whether to receive PDSCH indicated by DCI. This determination may be based on semi-static DL/UL assignment information. The semi-static DL/UL assignment information used for the determination may include at least one of UL-DL configuration common information (TDD-UL-DL-ConfigurationCommon) that may be indicated via RRC signaling, and UL-DL configuration dedicated information (TDD-UL-DL-ConfigDedicated) that may be additionally indicated to the terminal via RRC signaling. For example, the UL-DL configuration common information may indicate a period to apply semi-static UL/DL assignment information. The UL-DL configuration common information may be used to configure the number of UL/DL symbols per slot, which is configured over multiple slots included in the period, a slot format configured by the number of UL/DL symbols per slot and the number of flexible symbols per slot, and the number of slots. That is, the terminal may configure a slot format for each slot by using the number of slots indicated by the UL-DL configuration common information. As another example, the UL-DL configuration dedicated information may include information for overriding a flexible symbol in a semi-static DL/UL slot configuration provided by the UL-DL configuration common information with a UL symbol, a DL symbol, and a flexible symbol. That is, the terminal may override the flexible symbol in the slot configuration provided by the UL-DL configuration common information with another type of symbol on the basis of the UL-DL configuration dedicated information.

If a symbol in which the terminal is to receive PDSCH overlaps the symbol(s) indicated by semi-static UL/DL assignment information (at least one of UL-DL configuration common information and UL-DL configuration dedicated information) in a slot indicated by the base station for PDSCH reception, the terminal may determine whether to receive the PDSCH, based on the type (or direction) of the indicated symbol. For example, if at least one of the indicated symbol(s) is a UL symbol, the terminal does not perform PDSCH reception. On the other hand, if the indicated symbol(s) are DL symbol(s) and flexible symbol(s), the terminal may receive PDSCH in the corresponding slot. As another example, if at least one of the indicated symbol(s) is a UL symbol or unknown (or flexible symbol(s)), the terminal does not perform PDSCH reception. If the indicated symbol(s) are DL symbols, the terminal receives PDSCH in the corresponding slot.

If at least one of the symbols for PDSCH reception in a first slot of the slots indicated for repetition PDSCH reception overlaps a UL symbol, the terminal does not receive PDSCH in the corresponding slot. That is, if symbols for PDSCH reception in the first slot of the slots indicated for repetition PDSCH reception are configured by a DL symbol(s) and a flexible symbol, the terminal may receive PDSCH in the corresponding slot. If at least one of the symbols for PDSCH reception in a slot subsequent to the first slot of the slots indicated for repetition PDSCH reception overlaps a UL symbol or a flexible symbol, the terminal does not receive PUSCH in the corresponding slot. That is, if the slot indicated by the base station for PDSCH reception in the slot subsequent to the first slot of the slots indicated for repetition PDSCH reception, and the symbols of the slot are configured by the DL symbol(s), that is, symbols indicated for reception of PDSCH, the terminal may receive PDSCH in the corresponding slot. The terminal may receive, in a deferred subsequent slot, PDSCH that has failed to be additionally received.

Hereinafter, a PDSCH processing method related to a gap symbol is described.

There may be a gap for DL-UL switching between a DL symbol and an UL symbol. A gap may be located in a flexible symbol. Some symbol(s) of the flexible symbol(s) between the DL symbol and the UL symbol may be used for a DL-UL switching gap and may not be used for DL reception or UL transmission. If the number of symbols for the gap is denoted as G, G may be fixed to a specific value such as 1 or 2, may be configured to the terminal by an RRC message, and may be obtained via a timing advance (TA) value.

If the symbol in which PDSCH is to be received overlaps the symbol(s) indicated by semi-static UL/DL assignment information (at least one of UL-DL configuration common information and UL-DL configuration dedicated information) in a slot indicated by the base station for PDSCH reception, the terminal determines whether to receive the PDSCH, based on the type (or direction) of the indicated symbol. For example, if the indicated symbol(s) are all DL symbols, the terminal receives PDSCH, and if at least one of the indicated symbol(s) is a UL symbol or G consecutive flexible symbol(s) immediately preceding the UL symbol, the terminal does not receive PDSCH.

That is, in the slot indicated by the base station for PDSCH reception, if the symbol in which PDSCH is to be received is a DL symbol, the terminal receives PDSCH, and if the symbol in which PDSCH is to be received overlaps a UL symbol or at least one of G consecutive flexible symbol(s) immediately preceding the UL symbol, the terminal does not perform PDSCH reception. That is, if the symbol in which PDSCH is to be transmitted overlaps any one of G symbols that can be used as a gap with the UL symbol, the base station does not transmit PDSCH and cancels transmission of PDSCH. Then, the base station defers transmission of PDSCH to a subsequent slot.

If the terminal cancels reception of PDSCH according to the semi-static DL/UL assignment information, since HARQ-ARQ timing may be changed, a new HARQ-ARQ timing configuration method needs to be defined.

If reception of PDSCH is canceled, new HARQ-ARQ timing may be determined according to received PDSCH without being canceled. That is, in order to determine a slot in which actual HARQ-ACK is transmitted, the terminal may use last received PDSCH except for HARQ-ACK timing and canceled PDSCH included in DCI indicating PDSCH reception. For example, the terminal indicated with 4 slots as HARQ-ACK timing may transmit HARQ-ACK after 4 slots from the slot in which last PDSCH is received.

Even if reception of PDSCH is canceled, HARQ-ARQ timing is not changed and may be determined by assuming that PDSCH is received. That is, in order to determine the slot in which actual HARQ-ACK is transmitted, the terminal may perform calculation based on last PDSCH before determination on cancellation and HARQ-ACK timing included in DCI indicating PDSCH reception. For example, the terminal indicated with 4 slots as HARQ-ACK timing may transmit HARQ-ACK after 4 slots from last slot of allocated PDSCH, even if reception of PDSCH is cancelled.

The terminal may be configured to perform inter-slot frequency hopping for frequency diversity. Therefore, even when the terminal repeatedly transmits PUCCH (or PDSCH, or PUSCH) via multiple slots, it is required to define a method for performing inter-slot frequency hopping by the terminal. Hereinafter, the present specification provides descriptions of a physical resource block (PRB) via which PUCCH (or PDSCH or PUSCH) is to be transmitted in each slot during inter-slot frequency hopping. The present specification also provides descriptions of an algorithm for determining a PRB according to a difference between a slot in which PUCCH is first transmitted and a current slot regardless of the number of repetition PUCCH transmissions.

The inter-slot frequency hopping method during PUCCH transmission may include determining, by the terminal, a resource block (RB) for transmission of PUCCH according to an index of a first slot and an index of a second slot in which repetition PUCCH is first transmitted. In this case, the first slot is a slot indicated by the base station for PUCCH transmission, and the second slot is a slot in which PUCCH is transmitted after the first slot during repetition PUCCH transmission. Here, an RB in which PUCCH is transmitted in slot $n_s$ or start RB indices of RBs may be obtained by Equation 1 below.

$$RB(n_s) = \begin{cases} RB_1(n_s - n_{s,0}) \bmod 2 = 0 \\ RB_2(n_s - n_{s,0}) \bmod 2 = 1 \end{cases} \quad \text{[Equation 1]}$$

In Equation 1, $RB_1$ and $RB_2$ are start RB indices of a first hop and a second hop, respectively, and are signaled to the terminal via an RRC message so as to be set/configured for the terminal. $n_{s,0}$ is an index of a slot in which PUCCH is first transmitted. In this scheme, according to deferral of repetition PUCCH, transmission may be performed through only one hop while PUCCH is being repeatedly transmitted.

The inter-slot frequency hopping method during PUCCH transmission may include performing hopping every time when the terminal actually transmits repetition PUCCH. The RB may be determined by a slot index via which PUCCH is to be transmitted and the number of actual repetitions. More specifically, an RB in which PUCCH is transmitted in slot $n_s$ or start RB indices of RBs may be obtained by Equation 2.

$$RB(n_s) = \begin{cases} RB_1 \, n^{repeat}(n_s) \bmod 2 = 0 \\ RB_2 \, n^{repeat}(n_s) \bmod 2 = 1 \end{cases} \quad \text{[Equation 2]}$$

In Equation 2, $RB_1$ and $RB_2$ are start RB indices of a first hop and a second hop, respectively, and are signaled to the terminal via an RRC message so as to be set/configured for the terminal. $n_{repeat}(n_s)$ is the number of repetition transmissions of PUCCH before slot $n_s$. In this scheme, PUCCH may be transmitted through two different hops regardless of deferral of repetition PUCCH.

Fifth Embodiment

The fifth embodiment describes a method of determining a slot, via which repetition PUCCH transmission is to be performed, from among multiple slots, in addition to a method and a determination procedure of repeatedly transmitting PUCCH over multiple slots in order to improve coverage of PUCCH. Specifically, a method of determining, by a terminal, a slot for PUCCH transmission among multiple slots is described.

The terminal may determine a slot for PUCCH transmission, based on an SS/PBCH block including a synchronization signal for radio resource management (RRM) measurement and information on initial cell access. The SS/PBCH block may be transmitted at a determined location, and a configuration on transmission of the SS/PBCH block may be transmitted to the terminal from the base station via an RRC message (e.g., SSB transmitted-SIB1 information or SSB transmitted) so as to be set/configured for the terminal. In the slot indicated by the configuration on the transmission of the SS/PBCH block, flexible symbols in which transmission of the SS/PBCH block is possible may exist. That is, the flexible symbol may be used not only for PUCCH transmission but also for transmission of an SS/PBCH block including information on synchronization and initial cell access. In this case, there may be a case where at least one of the flexible symbol(s), in which PUCCH transmission is possible, and the flexible symbol(s) for transmission of the SS/PBCH block overlap. For example, the terminal may determine a slot for repetition PUCCH in a manner excluding a slot including the overlapping symbol from the slots for repetition PUCCH transmission, thereby preventing a collision. As such, the terminal may determine multiple slots for transmission of PUCCH on the basis of SSB transmitted-SIB1 and SSB transmitted, and if PUCCH is repeatedly transmitted over the multiple slots, the base station may receive the repetition PUCCH from the terminal.

The terminal may determine a slot for PUCCH transmission, based on semi-static DL/UL assignment information and a gap.

In the present specification, it is assumed that a gap is located in a symbol immediately preceding symbols for PUCCH transmission, and the gap includes one or two symbols. However, the number of symbols and a position of a DL-UL switching gap between DLs and ULs may be variously configured according to configurations of the base station and the terminal, in addition to the description above. For example, a gap may include two or more symbols, and the terminal may determine a slot for PUCCH transmission or may determine whether to defer PUCCH transmission, in consideration of two or more gap symbols.

A slot may be determined based on at least one of whether to allocate PDSCH in a slot, whether to assign a control resource set (CORESET) for PDCCH monitoring to a DL symbol in a slot, whether to assign a CSI-RS in a slot, whether to assign an SS/PBCH block in a slot, and semi-static DL/UL assignment information. For example, if the symbol immediately preceding the flexible symbol is DL symbol(s) and PDSCH is allocated to the DL symbol(s), the terminal does not consider the flexible symbol as a resource for PUCCH transmission. Instead, the terminal may determine a slot including other UL symbols and flexible symbol(s), as a slot for PUCCH transmission. If the symbol immediately preceding the flexible symbol is DL symbol(s) and no PDSCH is allocated to the DL symbol(s), the flexible symbol is an unassigned symbol. Therefore, the terminal does not recognize the unassigned symbol as a gap for DL-UL switching. Then, the terminal may consider a flexible symbol immediately subsequent to the DL symbol(s) as a resource capable of repetition PUCCH transmission and make a determination as a slot for PUCCH transmission. As another example, if a symbol immediately preceding the flexible symbol is a DL symbol(s) and CORESET or search space for PDCCH monitoring is assigned to the DL symbol(s), the terminal may exclude the slot including the flexible symbol from the slots for repetition PUCCH transmission in order to monitor allocated PDCCH. As another example, if a symbol immediately preceding the flexible symbol is a DL symbol(s) and CORESET or search space for PDCCH monitoring is assigned to the DL symbol(s), the terminal may not monitor allocated PDCCH and may consider the flexible symbol as a resource capable of repetition PUCCH transmission and make a determination as a slot for PUCCH transmission.

As another example, the terminal may determine a slot for PUCCH transmission by using semi-static DL/UL assignment information. The terminal may recognize a slot and a symbol for performing PUCCH transmission via an RRC message and dynamic signaling (e.g., PRI). If at least one of the symbols indicated for PUCCH transmission overlaps the flexible symbols indicated in the semi-static DL/UL assignment information, and if the symbol immediately preceding the symbols indicated for PUCCH transmission is not the DL symbol indicated in the semi-static DL/UL assignment information, the terminal may determine a corresponding slot as a slot for repetition PUCCH transmission so as to transmit PUCCH in the corresponding slot. If the symbol immediately preceding the symbols indicated for PUCCH transmission is the DL symbol indicated in the semi-static DL/UL assignment information, the terminal may not transmit repetition PUCCH in the corresponding slot and may defer the PUCCH transmission to a subsequent available slot. In other words, if the terminal is able to recognize symbols for transmission of PUCCH in each slot via an RRC message and/or dynamic signaling (e.g., PRI), and even at least one of the symbols overlaps the DL symbol of the semi-static DL/UL assignment information, or, if the symbol immediately preceding the symbols in which PUCCH is to be transmitted is the DL symbol of the semi-static DL/UL assignment information, the terminal does not transmit PUCCH in the corresponding slot, and, otherwise, the terminal transmits PUCCH in the corresponding slot. This is because a switching gap between DL and UL may be needed. PUCCH that has failed to be transmitted may be deferred so as to be transmitted in a subsequent available slot.

As another example, the terminal may determine a slot for PUCCH transmission by using information scheduled from the base station. The terminal may recognize a slot and a symbol for PUCCH transmission via an RRC message and dynamic signaling (e.g., PRI). If at least one of the symbols indicated for PUCCH transmission overlaps the flexible symbols indicated in the semi-static DL/UL assignment information, and PDSCH is not scheduled in a symbol immediately preceding the symbols indicated for PUCCH transmission, the terminal may determine the corresponding slot as a slot for PUCCH transmission so as to transmit PUCCH in the corresponding slot. If PDSCH is scheduled in the symbol immediately preceding the symbols indicated for PUCCH transmission, the terminal may defer PUCCH transmission to a subsequent available slot without transmitting PUCCH in the corresponding slot. In other words, the terminal may recognize symbols in which PUCCH is to be transmitted in every slot, via an RRC message and/or dynamic signaling (e.g., PRI). If even at least one of the recognized symbols overlaps the DL symbol of the semi-static DL/UL assignment information, or PDSCH is scheduled in the symbol immediately preceding the symbols indicated for PUCCH transmission, the terminal may not transmit PUCCH in the corresponding slot and, otherwise, the terminal may transmit PUCCH in the corresponding slot. This is because a switching gap between DL and UL may be needed. PUCCH that has failed to be transmitted may be deferred so as to be transmitted in a subsequent available slot.

As another example, the terminal may determine a slot for PUCCH transmission by using CSI-RS information set/configured from the base station. The terminal may recognize in which symbol of which slot PUCCH should be transmitted, via an RRC message and dynamic signaling (e.g., PRI). If at least one of the symbols indicated for PUCCH transmission overlaps the flexible symbols indicated in the semi-static DL/UL assignment information, and CSI-RS reception is not configured in a symbol immediately preceding the symbols indicated for PUCCH transmission, the terminal may determine the corresponding slot as a slot for PUCCH transmission so as to transmit PUCCH in the corresponding slot. If CSI-RS reception is configured in the symbol immediately preceding the symbols indicated for PUCCH transmission, the terminal may defer PUCCH transmission to a subsequent available slot without transmitting PUCCH in the corresponding slot. In other words, the terminal may recognize symbols in which PUCCH is to be transmitted in every slot, via an RRC message and/or dynamic signaling (e.g., PRI). If even at least one of the recognized symbols overlaps the DL symbol of the semi-static DL/UL assignment information, or CSI-RS reception is configured in a symbol immediately preceding the symbols indicated for PUCCH transmission, the terminal may not transmit PUCCH in the corresponding slot and, otherwise, the terminal may transmit PUCCH in the corresponding slot. This is because a switching gap between DL and UL may be needed. PUCCH that has failed to be transmitted may be deferred so as to be transmitted in a subsequent available slot.

As another example, the terminal may determine a slot for PUCCH transmission by using PDCCH monitoring information configured to the terminal. The terminal may recognize in which symbol of which slot PUCCH should be transmitted, via an RRC message and dynamic signaling (e.g., PRI). If at least one of symbols indicated for PUCCH transmission overlaps flexible symbols in semi-static DL/UL assignment information, and PDCCH monitoring is not configured (or assigned) in a symbol immediately preceding the symbols indicated for PUCCH transmission, the terminal may determine the corresponding slot as a slot for PUCCH transmission so as to transmit PUCCH in the corresponding slot. If PDCCH monitoring is configured (or assigned) in the symbol immediately preceding the symbols indicated for PUCCH transmission, the terminal may defer PUCCH transmission to a subsequent available slot without transmitting PUCCH in the corresponding slot. In other words, if the terminal is able to recognize symbols, in which PUCCH is to be transmitted, in each slot from an RRC message and/or dynamic signaling (e.g., PRI), and even at least one of the symbols overlaps a DL symbol of the semi-static DL/UL assignment information, or, if PDCCH monitoring is configured in the symbol immediately preceding the symbols indicated for PUCCH transmission, the terminal may not transmit PUCCH in the corresponding slot and, otherwise, the terminal may transmit PUCCH in the corresponding slot. This is because a switching gap between DL and UL may be needed. PUCCH that has failed to be transmitted may be deferred so as to be transmitted in a subsequent available slot.

As another example, the terminal may recognize a slot and a symbol in which PUCCH should be transmitted, via an RRC message and dynamic signaling (e.g., PRI). There may be a case where at least one of the symbols indicated for PUCCH transmission overlaps flexible symbols indicated in semi-static DL/UL assignment information, and a symbol immediately preceding the symbols indicated for PUCCH transmission does not overlap an SS/PBCH block. In this case, the terminal may determine the corresponding slot as a slot for PUCCH transmission so as to transmit PUCCH in the corresponding slot. If the symbol immediately preceding the symbols indicated for PUCCH transmission overlaps the SS/PBCH block, the terminal may defer PUCCH transmission to a subsequent available slot without transmitting PUCCH in the corresponding slot. In other words, the terminal may recognize symbols in which PUCCH is to be transmitted in every slot, from an RRC message and/or dynamic signaling (e.g., PRI). If even at least one of the symbols overlaps a DL symbol of semi-static DL/UL assignment information, or the symbol immediately preceding the symbols indicated for PUCCH transmission overlaps the SS/PBCH block, the terminal may not transmit PUCCH in the corresponding slot and, otherwise, the terminal may transmit PUCCH in the corresponding slot. This is because a switching gap between DL and UL may be needed. PUCCH that has failed to be transmitted may be deferred so as to be transmitted in a subsequent available slot.

In the present specification, when describing whether to perform PUCCH transmission and deferral, descriptions are provided mainly based on at least one symbol in consideration of a symbol immediately preceding symbols for PUCCH transmission. However, a switching gap between DL and UL may be configured/applied variously according to configurations of a base station and a terminal, and therefore the number of gap symbols is not limited to one symbol and may be, of course, configured/applied to various symbols.

There may be a case where a symbol indicated as a DL symbol by dynamic signaling (e.g., SFI) in one slot ends at a symbol immediately preceding a symbol for repetition PUCCH transmission, and a PUCCH resource is configured so that transmission for repetition PUCCH is performed from a subsequent symbol. The terminal may not transmit PUCCH in the slot and defer transmission to a subsequent slot, and the deferred slot may be an earliest slot among slots in which the PUCCH is transmittable.

A method of determining a slot for PUCCH transmission according to whether the terminal allocates PDSCH in a slot will be described with a more specific example. Here, it is assumed that one slot includes 14 symbols.

For example, it is assumed that a UL symbol resource for PUCCH is configured with last 12 symbols of a slot, and a specific slot sequentially includes 2 DL symbols, 2 flexible symbols, and 10 UL symbols. If PDSCH is allocated to 2 DL symbols immediately preceding 2 flexible symbols, the terminal implicitly considers a first flexible symbol as a switching gap between DL and UL. The terminal determines whether 1 flexible symbol and 10 UL symbols remaining after excluding the first flexible symbol are configurable as a resource for PUCCH transmission. However, since the UL symbol resource for PUCCH is configured with last 12 symbols of the slot, the terminal may exclude the slot from the slot resource for PUCCH transmission (it is because UL symbols (including flexible symbols) available for PUCCH transmission are last 11 symbols). In the above example, if the UL symbol resource for PUCCH is configured with last 11 symbols of the slot, the terminal may determine the slot as the slot resource for PUCCH transmission.

As another example, it is assumed that a UL symbol resource for PUCCH is configured with last 6 symbols of a slot, and a specific slot sequentially includes 8 DL symbols, 2 flexible symbols, and 4 UL symbols. If PDSCH is allocated to the preceding 8 DL symbols, the terminal implicitly considers a first flexible symbol as a switching gap between DL and UL. The terminal determines whether 1 flexible symbol and 4 UL symbols remaining after excluding the first flexible symbol are configurable as a PUCCH resource. However, since the UL symbol resource for PUCCH is configured with last 6 symbols of the slot, the terminal may exclude the slot from the slot resource for PUCCH transmission (it is because UL symbols (including flexible symbols) available for PUCCH transmission are last 5 symbols). In the above example, if the UL symbol resource for PUCCH is configured with last 5 symbols of the slot, the terminal may determine the slot as the slot resource for PUCCH transmission.

Sixth Embodiment

The sixth embodiment relates to a method of determining a slot, via which repetition PUSCH transmission is to be performed, from among multiple slots, in addition to a method and a determination procedure of repeatedly transmitting PUSCH over multiple slots in order to improve coverage of PUSCH.

A slot in which PUSCH is to be transmitted may be determined based on at least one of whether to allocate PDSCH in a slot, whether to assign a control resource set (CORESET) for PDCCH monitoring to a DL symbol in a slot, whether to assign a CSI-RS in a slot, whether to assign an SS/PBCH block in a slot, and semi-static DL/UL assignment information. For example, the terminal may determine a slot for PUSCH transmission by using semi-static DL/UL assignment information. The terminal may recognize a slot and a symbol in which PUSCH is transmitted, via an RRC message and dynamic signaling (e.g., PRI). If symbols indicated for PUSCH transmission overlap flexible symbols indicated in semi-static DL/UL assignment information, and if a symbol immediately preceding the symbols indicated for PUSCH transmission is not a DL symbol indicated in the semi-static DL/UL assignment information, the terminal may determine the corresponding slot as a slot for PUSCH transmission so as to transmit PUSCH in the corresponding slot. If the symbol immediately preceding the symbols indicated for PUSCH transmission is the DL symbol indicated in the semi-static DL/UL assignment information, the terminal may not transmit PUSCH in the corresponding slot and may defer PUSCH transmission to a subsequent available slot. In other words, the terminal may recognize symbols in which PUSCH is to be transmitted in every slot, from an RRC message and/or dynamic signaling (e.g., PRI). If even at least one of the recognized symbols overlaps the DL symbol of the semi-static DL/UL assignment information, or a symbol immediately preceding symbols in which PUSCH is to be transmitted is the DL symbol of the semi-static DL/UL assignment information, the terminal may not transmit PUSCH in the corresponding slot and, otherwise, the terminal may transmit PUSCH in the corresponding slot. This is because a switching gap between DL and UL may be needed. PUSCH that has failed to be transmitted may be deferred so as to be transmitted in a subsequent available slot.

As another example, the terminal may determine a slot for PUSCH transmission by using information scheduled to the terminal. The terminal may recognize a slot and a symbol in which PUSCH should be transmitted, via an RRC message and dynamic signaling (e.g., PRI). If at least one of the symbols indicated for PUSCH transmission overlaps the flexible symbols indicated in the semi-static DL/UL assignment information, and PDSCH is not scheduled in a symbol immediately preceding the symbols indicated for PUSCH transmission, the terminal may determine the corresponding slot as a slot for PUSCH transmission so as to transmit PUSCH in the corresponding slot. If PDSCH is scheduled in the symbol immediately preceding the symbols indicated for PUSCH transmission, the terminal may defer PUSCH transmission to a subsequent available slot without transmitting PUSCH in the corresponding slot. In other words, the terminal may recognize symbols in which PUSCH is to be transmitted in every slot, from an RRC message and/or dynamic signaling (e.g., PRI). If even at least one of the recognized symbols overlaps the DL symbol of the semi-static DL/UL assignment information, or PDSCH is scheduled in the symbol immediately preceding the symbols in which PUSCH is to be transmitted, the terminal does not transmit PUSCH in the corresponding slot and, otherwise, the terminal transmits PUSCH in the corresponding slot. This is because a switching gap between DL and UL may be needed. PUSCH that has failed to be transmitted may be deferred so as to be transmitted in a subsequent available slot.

As another example, the terminal may determine a slot for PUSCH transmission by using CSI-RS information set/configured from the base station. The terminal may know in which symbol of which slot PUSCH should be transmitted, via an RRC message and dynamic signaling (e.g., PRI). If at least one of the symbols indicated for PUSCH transmission overlaps flexible symbols indicated in the semi-static DL/UL assignment information, and CSI-RS reception is not configured in a symbol immediately preceding the symbols indicated for PUSCH transmission, the terminal may determine the corresponding slot as a slot for PUSCH transmission so as to transmit PUSCH in the corresponding slot. If CSI-RS reception is configured in the symbol immediately preceding the symbols indicated for PUSCH transmission, the terminal does not transmit PUSCH in the corresponding slot. In other words, the terminal may recognize symbols in which PUSCH is to be transmitted in every slot, from an RRC message and/or dynamic signaling (e.g., PRI). If even at least one of the recognized symbols overlaps the DL symbol of the semi-static DL/UL assignment information, or CSI-RS reception is configured in a symbol immediately preceding the symbols indicated for PUSCH transmission, the terminal may not transmit PUSCH in the corresponding slot and, otherwise, the terminal may transmit PUSCH in the corresponding slot. This is because a switching gap between DL and UL may be needed. PUSCH that has failed to be transmitted may be deferred so as to be transmitted in a subsequent available slot.

As another example, the terminal may determine a slot for PUSCH transmission by using PDCCH monitoring information set/configured from the base station. The terminal may recognize a slot and a symbol in which PUSCH should be transmitted, via an RRC message and dynamic signaling (e.g., PRI). If at least one of symbols indicated for PUSCH transmission overlaps flexible symbols indicated in semi-static DL/UL assignment information, and PDCCH monitoring is not configured (or assigned) in a symbol immediately preceding the symbols indicated for PUSCH transmission, the terminal may determine the corresponding slot as a slot for PUSCH transmission so as to transmit PUSCH in the corresponding slot. If PDCCH monitoring is configured (or assigned) in the symbol immediately preceding the symbols indicated for PUSCH transmission, the terminal may not transmit PUSCH in the corresponding slot. In other words, the terminal may recognize symbols in which PUSCH is to be transmitted in every slot, via an RRC message and/or dynamic signaling (e.g., PRI). If even at least one of the recognized symbols overlaps the DL symbol of the semi-static DL/UL assignment information, or PDCCH monitoring is configured in a symbol immediately preceding the symbols in which PUSCH is to be transmitted, the terminal does not transmit PUSCH in the corresponding slot and, otherwise, the terminal transmits PUSCH in the corresponding slot. This is because a switching gap between DL and UL may be needed. PUSCH that has failed to be transmitted may be deferred so as to be transmitted in a subsequent available slot.

As another example, the terminal may recognize a slot and a symbol in which PUSCH should be transmitted, via an RRC message and dynamic signaling (e.g., PRI). If at least one of the symbols indicated for PUSCH transmission overlaps flexible symbols indicated in semi-static DL/UL assignment information, and a symbol immediately preceding the symbols indicated for PUSCH transmission does not overlap an SS/PBCH block, the terminal may determine the corresponding slot as a slot for PUSCH transmission so as to transmit PUCCH in the corresponding slot. If the symbol immediately preceding the symbols indicated for PUSCH transmission overlaps the SS/PBCH block, the terminal does not transmit PUSCH in the corresponding slot. In other words, the terminal may know symbols in which PUSCH is to be transmitted in every slot, via an RRC message and/or dynamic signaling (e.g., PRI). If even at least one of the recognized symbols overlaps a DL symbol of the semi-static DL/UL assignment information, or the symbol immediately preceding the symbols in which PUSCH is to be transmitted overlaps the SS/PBCH block, the terminal does not transmit PUSCH in the corresponding slot and, otherwise, the terminal transmits PUSCH in the corresponding slot. This is because a switching gap between DL and UL may be needed. PUSCH that has failed to be transmitted may be deferred so as to be transmitted in a subsequent available slot.

In the present disclosure, when describing PUSCH transmission and deferral, descriptions are provided mainly based on an example of at least one symbol in consideration of a symbol immediately preceding symbols for PUSCH transmission. However, a DL-UL switching gap may be configured variously according to configurations of a base station and a terminal, and therefore whether to perform PUSCH transmission and deferral may be, of course, determined in consideration of one or more symbols.

Seventh Embodiment

The seventh embodiment relates to a method of determining a slot, via which repetition PDSCH transmission is to be performed, from among multiple slots, in addition to a method and a determination procedure of repeatedly transmitting PDSCH over multiple slots in order to improve coverage of PDSCH.

A slot in which PDSCH is to be received may be determined based on at least one of whether to allocate PUSCH in a slot, whether to allocate PUCCH, whether to assign SRS transmission, whether to assign PRACH transmission, and semi-static DL/UL assignment information.

For example, the terminal may determine a slot in which PDSCH is to be received, by using semi-static DL/UL assignment information. The terminal may recognize a slot and a symbol in which PDSCH should be received, via an RRC message and dynamic signaling (e.g., PRI). If at least one of the symbols indicated for PDSCH reception overlaps flexible symbols indicated in semi-static DL/UL assignment information, and a symbol immediately subsequent to the symbols indicated for PDSCH reception is not a UL symbol indicated in the semi-static DL/UL assignment information, the terminal may determine the corresponding slot as a slot for PDSCH reception so as to receive PDSCH in the corresponding slot. If the symbol immediately subsequent to the symbols indicated for PDSCH reception is a UL symbol indicated in the semi-static DL/UL assignment information, the terminal does not receive PDSCH in the corresponding slot. In other words, the terminal may recognize symbols in which PDSCH is to be transmitted in every slot, from an RRC message and/or dynamic signaling (e.g., PRI). If even at least one of the recognized symbols overlaps the UL symbol of the semi-static DL/UL assignment information, or a symbol immediately subsequent to symbols in which PDSCH is to be transmitted is the UL symbol of the semi-static DL/UL assignment information, the terminal does not receive PDSCH in the corresponding slot and, otherwise, the terminal receives PDSCH in the corresponding slot.

As another example, the terminal may determine a slot for PDSCH reception by using uplink information (PUSCH, PUCCH, PRACH, SRS, etc.) scheduled from the base station. The terminal may recognize a slot and a symbol in which PDSCH should be received, via an RRC message and dynamic signaling (e.g., PRI). If at least one of symbols indicated for PDSCH reception overlaps flexible symbols indicated in semi-static DL/UL assignment information, and PUSCH, PUCCH, PRACH, or SRS is not scheduled in a symbol immediately subsequent to the symbols indicated for PDSCH reception, the terminal may determine the corresponding slot as a slot for PDSCH reception so as to receive PDSCH in the corresponding slot. If PUSCH, PUCCH, PRACH, or SRS is scheduled in the symbol immediately subsequent to the symbols indicated for PDSCH reception, the terminal does not receive PDSCH in the corresponding slot. In other words, the terminal may recognize symbols in which PDSCH is to be received in every slot, via an RRC message and/or dynamic signaling (e.g., PRI). If even at least one of the recognized symbols overlaps the UL symbol of the semi-static DL/UL assignment information, or PUSCH, PUCCH, PRACH, or SRS is scheduled in the symbol immediately subsequent to the symbols in which PDSCH is to be transmitted, the terminal does not receive PDSCH in the corresponding slot and, otherwise, the terminal receives PDSCH in the corresponding slot. Here, PUCCH may be for transmission of HARQ-ACK. Alternatively, PUCCH may be for transmission of a scheduling request (SR).

As another example, the terminal may determine a slot for PDSCH transmission by using CSI-RS information set/configured from the base station. The terminal may recognize a slot and a symbol in which PDSCH should be transmitted, via an RRC message and dynamic signaling (e.g., PRI). If at least one of the symbols indicated for PDSCH reception overlaps flexible symbols indicated in semi-static DL/UL assignment information, and CSI-RS reception is not configured in a symbol immediately preceding the symbols indicated for PDSCH reception, the terminal may determine the corresponding slot as a slot for PDSCH transmission so as to transmit PDSCH in the corresponding slot. If CSI-RS reception is configured in the symbol immediately preceding the symbols indicated for PDSCH reception, the terminal may defer PDSCH transmission to a subsequent available slot without transmitting PDSCH in the corresponding slot. In other words, the terminal may recognize symbols in which PDSCH is to be transmitted in every slot, via an RRC message and/or dynamic signaling (e.g., PRI). If even at least one of the recognized symbols overlaps the DL symbol of the semi-static DL/UL assignment information, or CSI-RS reception is configured in a symbol immediately preceding symbols in which PDSCH is to be transmitted, the terminal does not transmit PDSCH in the corresponding slot and, otherwise, the terminal transmits PDSCH in the corresponding slot. This is because a switching gap between DL and UL may be needed. PDSCH that has failed to be transmitted may be deferred so as to be transmitted in a subsequent available slot.

As another example, the terminal may determine a slot for PDSCH transmission by using PDCCH monitoring information set/configured from the base station. The terminal may recognize a slot and a symbol in which PDSCH should be transmitted, via an RRC message and dynamic signaling (e.g., PRI). If at least one of symbols indicated for PDSCH reception overlaps flexible symbols indicated in semi-static DL/UL assignment information, and PDCCH monitoring is not configured (or assigned) in a symbol immediately preceding symbols in which PDSCH is to be transmitted, the terminal may determine the corresponding slot as a slot for PDSCH transmission so as to transmit PDSCH in the corresponding slot. If PDCCH monitoring is configured (or assigned) in the symbol immediately preceding the symbols indicated for PDSCH reception, the terminal may defer PDSCH transmission to a subsequent available slot without transmitting PDSCH in the corresponding slot. In other words, the terminal may recognize symbols in which PDSCH is to be transmitted in every slot, via an RRC message and/or dynamic signaling (e.g., PRI). If even at least one of the recognized symbols overlaps the DL symbol of the semi-static DL/UL assignment information, or PDCCH monitoring is configured in the symbol immediately preceding the symbols in which PDSCH is to be transmitted, the terminal does not transmit PDSCH in the corresponding slot and, otherwise, the terminal transmits PDSCH in the corresponding slot. This is because a switching gap between DL and UL may be needed. PDSCH that has failed to be transmitted may be deferred so as to be transmitted in a subsequent available slot.

As another example, an SS/PBCH block may be configured to overlap a DL symbol, a flexible symbol, and a UL symbol of semi-static DL/UL assignment information relating to the terminal. In this case, the terminal may consider a symbol overlapping the SS/PBCH block as a semi-static DL symbol. That is, if a semi-static UL symbol is configured to the terminal, and the SS/PBCH block overlaps the symbol, the terminal may assume that the symbol is configured as a semi-static DL symbol. Additionally, if a symbol immediately subsequent to the symbols overlapping the SS/PBCH block is a semi-static UL symbol, the terminal may assume that the semi-static UL symbol corresponds to semi-static flexible symbols.

When describing whether to perform PDSCH transmission and deferral, descriptions have been provided based on at least one symbol in consideration of a symbol immediately preceding symbols for PDSCH transmission. However, a DL-UL switching gap may be configured variously according to configurations of a base station and a terminal, and therefore whether to perform PDSCH transmission and deferral may be, of course, determined in consideration of one or more symbols.

Eighth Embodiment

The eighth embodiment relates to a situation in which a gap between a DL symbol requiring downlink reception and a UL symbol requiring uplink transmission is insufficient, and therefore a terminal is unable to perform downlink reception and uplink transmission. At least a DL-UL switching gap is required between downlink reception and uplink transmission of the terminal. Here, the DL-UL switching gap may be described interchangeably with a switching gap, or simply a gap.

A length of the DL-UL switching gap may vary depending on a carrier frequency. For example, if a frequency of a carrier is 6 GHz or lower (hereinafter, referred to as frequency range (FR) 1), the DL-UL switching gap may require 13 us. Alternatively, if the frequency of the carrier is 6 GHz or higher (hereinafter, referred to as FR2), the DL-UL switching gap may require 7 us.

The DL-UL switching gap is also affected by a timing advance (TA) value and a TA offset value. The DL-UL switching gap may be affected by subcarrier spacing (SCS). That is, the DL-UL switching gap may be determined based on a TA value and a TA offset value and/or subcarrier spacing. For example, when a length (duration) of one symbol is X us, a symbol (G) necessary for the DL-UL switching gap may be given as G=ceil((Rx2Tx+TA+

TA_offset)/X). Here, Rx2Tx is time taken for an RF circuit to switch from reception to transmission, and a value thereof may vary depending on a frequency of a carrier. If a frequency of a carrier is GHz or lower (FR1), Rx2Tx may be 13 us, and if frequency of a carrier is 6 GHz or higher (FR2), Rx2Tx may be 7 us. TA may be a TA value configured for the terminal by the base station or may be a maximum value among TA values configurable for the terminal by the base station. TA_offset may be 39936*Tc or 25600*Tc in FR1 and may be 13792*Tc in FR2. Here, Tc=1/(480*103*4096). Here, the switching gap may be an RF interruption time.

Table 3 is an example of the number of symbols required for a DL-UL switching gap according to subcarrier spacing.

TABLE 3

| Subcarrier spacing configuration for the active UL BWP | G |
|---|---|
| 15 kHz or 30 kHz | 1 |
| 60 kHz or 120 kHz | 2 |

Table 4 is another example of the number of symbols required for a DL-UL switching gap according to subcarrier spacing.

TABLE 4

| Subcarrier spacing configuration for the active UL BWP | G |
|---|---|
| 15 kHz or 30 kHz | 2 |
| 60 kHz or 120 kHz | 2 |

Hereinafter, a method of processing transmission of an uplink channel or an uplink signal on the basis of a downlink signal received by a terminal and a UL-DL switching gap (G) will be described. A downlink signal may include an SS/PBCH block, PDSCH, PDCCH, a periodic signal, a measurement signal, and the like. An uplink channel may include PUSCH, PUCCH, PRACH, and the like, and an uplink signal may include an SRS, a periodic signal, a measurement signal, and the like.

(Method 1)—Symbol for SS/PBCH Block Transmission and Uplink Transmission

Method 1 is a method of processing uplink transmission by a terminal, in which the terminal may determine whether at least one of symbols indicated for transmission of an uplink channel or transmission of an uplink signal is configured to overlap (i.e., to be contradicted to) symbols (or symbols for SS/PBCH block transmission) indicated to receive an SS/PBCH block from a base station, and may transmit the uplink channel or the uplink signal on the basis of the determination. Here, if at least some of the symbols in which the SS/PBCH block is received is configured to overlap transmission of the uplink channel or transmission of the uplink signal, the terminal does not transmit the uplink channel or the uplink signal and, otherwise, the terminal transmits the uplink signal.

Method 1 is another method of processing uplink transmission by a terminal, in which the terminal may determine whether at least one of symbols indicated for transmission of an uplink channel or transmission of an uplink signal is configured to overlap a symbol(s) to which an SS/PBCH block indicated to be received from a base station is assigned, and may transmit the uplink channel or the uplink signal on the basis of the determination. Here, if at least some of G symbol(s) are configured to overlap transmission of the uplink channel or transmission of the uplink signal, the terminal does not transmit the uplink channel or the uplink signal and, otherwise, the terminal transmits the uplink signal.

(Method 2)—Symbol for Downlink Transmission and Uplink Transmission

Method 2 is a method of processing uplink transmission by a terminal, in which the terminal may determine whether at least one of symbols indicated for transmission of an uplink channel or transmission of an uplink signal is configured to overlap symbols (or symbols for downlink transmission) indicated to receive downlink transmission from a base station, and may transmit the uplink channel or the uplink signal on the basis of the determination. Here, if at least some of the symbols in which downlink transmission is received are configured to overlap transmission of the uplink channel or transmission of the uplink signal, the terminal does not transmit the uplink channel or the uplink signal and, otherwise, the terminal transmits the uplink signal.

Method 2 is another method of processing uplink transmission by a terminal, in which the terminal may determine whether at least one of symbols indicated for transmission of an uplink channel or transmission of an uplink signal is configured to overlap G symbol(s) subsequent to symbol(s) indicated for reception of downlink transmission from a base station, and may transmit the uplink channel or the uplink signal on the basis of the determination. Here, if at least some of G symbol(s) are configured to overlap transmission of the uplink channel or transmission of the uplink signal, the terminal does not transmit the uplink channel or the uplink signal and, otherwise, the terminal transmits the uplink signal.

In addition to the described method, the base station may perform scheduling (e.g., dynamic scheduling of layer 1 (L1)) so that symbols for downlink transmission and symbols for uplink transmission do not overlap each other. That is, when the base station performs scheduling for the terminal, uplink transmission based on symbol G may be configured. In this case, the terminal may not expect the base station to configure uplink transmission of the terminal in symbol G.

If uplink transmission based on an RRC configuration instead of dynamic scheduling of L1 is configured, the terminal may determine whether uplink transmission configured via RRC overlaps symbol G, and the terminal may or may not perform transmission of an uplink channel or signal on the basis of the determination.

Hereinafter, a method in which a terminal processes downlink reception and transmission of an uplink channel (or uplink signal) on the basis of a UL-DL switching gap (G) is described. A downlink signal may include an SS/PBCH block, PDSCH, PDCCH, CSI-RS, and the like. An uplink channel may include PUSCH, PUCCH, PRACH, and the like, and an uplink signal may include an SRS, and the like.

(Method 3)—Processing of Downlink Signals According to Whether Flexible Symbol and Uplink Signal Overlap In symbols that are configured by flexible symbols by semi-static DL/UL assignment information or symbols that are not configured by semi-static DL/UL assignment information, the terminal may receive or may fail to receive a downlink signal configured by a UE-specific RRC message (e.g., downlink periodic signal or measurement signal). In this case, the terminal may process the configured downlink reception, based on an arrangement relationship (e.g., overlapping relationship) between the UL-DL switching gap and the uplink signal.

When describing a method of processing the configured downlink reception by the terminal, the terminal may determine whether the terminal is configured to transmit an uplink signal in G symbol(s) subsequent to a last symbol of the configured downlink signal, and may receive the configured downlink signal on the basis of the determination. Here, as a result of the determination, if the uplink signal does not overlap in G symbol(s) subsequent to the last symbol of the configured downlink signal, the terminal may receive the configured downlink signal. On the contrary, if the uplink signal overlaps in G symbol(s), the terminal does not receive the configured downlink signal. That is, if there are not at least G gap symbols between the last DL symbol configured by the semi-static DL/UL assignment information and the first symbol assigned to the uplink signal in one slot, the terminal drops the downlink signal.

The uplink signal may include an uplink signal configured by a cell-specific RRC message. For example, the uplink signal configured by the cell-specific RRC message may include PRACH.

The uplink signal may include an uplink signal indicated by L1 signaling. For example, the uplink signal indicated by L1 signaling may include PUSCH scheduled with DCI format 0_0 or 0_1. The uplink signal indicated by L1 signaling may include PUCCH including an HARQ-ACK response of PDSCH scheduled by DCI format 1_0 or 1_1. The uplink signal indicated by L1 signaling may include an SRS signal indicated by DCI. The uplink signal indicated by L1 signaling may include first transmission of uplink semi-persistent scheduled (SPS) PDSCH transmissions indicated by DCI scrambled with CS-RNTI.

The downlink signal may include a CSI-RS configured by a UE-specific RRC message. For example, the downlink signal may include CORESET for PDCCH monitoring configured by the UE-specific RRC message. The downlink signal may include downlink SPS PDSCH transmission (excluding the first transmission) scrambled with a CS-RNTI.

In another method of processing the downlink reception by the terminal, the terminal may determine whether a UL symbol configured by semi-static DL/UL assignment information overlaps in G symbol(s) subsequent to the last symbol of the downlink signal, and may receive a downlink signal on the basis of the determination. As a result of the determination, if the UL symbol configured by the semi-static DL/UL assignment information overlaps in G symbol(s), the terminal does not receive the downlink signal and, otherwise, the terminal receives the downlink signal. That is, if there are not at least G gap symbols between the last DL symbol configured by the semi-static DL/UL assignment information and the first symbol allocated to the uplink signal in one slot, the terminal drops the downlink signal.

In another method of processing the configured downlink reception by the terminal, the terminal may determine whether a UL symbol indicated by dynamic SFI overlaps in G symbol(s) subsequent to a last symbol of the configured downlink signal, and may receive the configured downlink signal on the basis of the determination. As a result of the determination, if the UL symbol indicated by the dynamic SFI overlaps in G symbol(s), the terminal does not receive the configured downlink signal and, otherwise, the terminal receives the downlink signal. That is, if there are not at least G gap symbols between the last DL symbol configured by the semi-static DL/UL assignment information and the first symbol allocated to the uplink signal in one slot, the terminal drops the downlink signal.

In another method of processing the configured downlink reception by the terminal, the terminal may determine whether the DL symbol configured by the semi-static DL/UL assignment information overlaps in G symbol(s) preceding a first symbol of the uplink signal, and the terminal may receive the configured downlink signal on the basis of the determination. As a result of the determination, if the DL symbol configured by the semi-static DL/UL assignment information overlaps in G symbol(s), the terminal does not receive the configured downlink signal and, otherwise, the terminal receives the configured downlink signal. That is, if there are not at least G gap symbols between the last DL symbol configured by the semi-static DL/UL assignment information and the first symbol allocated to the uplink signal in one slot, the terminal drops the downlink signal.

In another method of processing the configured downlink reception by the terminal, the terminal may determine whether the DL symbol indicated by the dynamic SFI overlaps in G symbol(s) preceding the first symbol of the uplink signal, and may receive the configured downlink signal on the basis of the determination. As a result of the determination, if the DL symbol indicated by the dynamic SFI overlaps in G symbol(s), the terminal does not receive the configured downlink signal and, otherwise, the terminal receives the configured downlink signal. That is, if there are not at least G gap symbols between the last DL symbol configured by the semi-static DL/UL assignment information and the first symbol assigned to the uplink signal in one slot, the terminal drops the downlink signal.

The aforementioned method of processing uplink transmission by the terminal may include an operation wherein the terminal does not expect the uplink signal to be configured or indicated by L1 signaling during G symbols subsequent to the downlink signal (downlink periodic signal or measurement signal) configured by the UE-specific RRC message, in symbols configured by flexible symbols by semi-static DL/UL assignment information or in symbols that are not configured by semi-static DL/UL assignment information.

(Method 4)—Processing of Uplink Signals According to Whether Flexible Symbol and Downlink Signal Overlap In symbols configured by flexible symbols by semi-static DL/UL assignment information or symbols that are not configured by semi-static DL/UL assignment information, the terminal may transmit or may fail to transmit an uplink signal configured by a UE-specific RRC message (e.g., uplink periodic signal or measurement signal). In this case, the method of processing the uplink transmission by the terminal may include making a determination based on an arrangement relationship (e.g., overlapping relationship) between the UL-DL switching gap and the downlink signal.

In a method of processing the configured uplink transmission by the terminal, the terminal may transmit the configured uplink signal, based on whether the terminal receives the downlink signal in G symbol(s) preceding a first symbol of the configured uplink signal. That is, if the downlink signal does not overlap in G symbol(s) preceding the first symbol of the configured uplink signal, the terminal may transmit the configured uplink signal. On the contrary, if the downlink signal overlaps in G symbol(s), the terminal does not transmit the configured uplink signal. That is, if there are not at least G gap symbols between the first UL symbol configured by semi-static DL/UL assignment information and the last symbol assigned to the downlink signal in one slot, the terminal drops the uplink signal.

Here, the downlink signal may include a downlink signal configured by a cell-specific RRC message. The downlink signal configured by the cell-specific RRC message may include an SS/PBCH block. The downlink signal configured by the cell-specific RRC message may include type-0 common search space. Here, the type-0 common search space is a search space for receiving remaining minimum scheduling information (RMSI). The downlink signal configured by the cell-specific RRC message may include a type-OA common search space. The type-OA common search space is a search space for receiving a response of PRACH during a random access procedure.

The downlink signal may include a downlink signal indicated by L1 signaling. For example, the uplink signal indicated by L1 signaling may include PDSCH scheduled by DCI format 1_0 or 1_1. The uplink signal indicated by L1 signaling may include an aperiodic CSI-RS indicated by DCI. The uplink signal indicated by L1 signaling may include first transmission of uplink semi-persistent scheduled (SPS) PDSCH transmissions indicated by DCI scrambled with CS-RNTI.

The uplink signal may include an SRS configured by the UE-specific RRC message. The uplink signal may include periodic PUCCH and PUSCH configured by the UE-specific RRC message. The uplink signal may include an SR configured by the UE-specific RRC message.

In another method of processing the configured uplink transmission by the terminal, the terminal may determine whether the DL symbol configured by the semi-static DL/UL assignment information overlaps in G symbol(s) preceding a first symbol of the configured uplink signal, and the terminal may transmit the configured uplink signal on the basis of the determination. As a result of the determination, if the DL symbol configured by semi-static DL/UL assignment information does not overlap in G symbol(s), the terminal transmits the configured uplink signal and, otherwise, the terminal does not transmit the configured uplink signal. That is, if there are not at least G gap symbols between the first UL symbol configured by semi-static DL/UL assignment information and the last symbol assigned to the downlink signal in one slot, the terminal drops the uplink signal.

The aforementioned method may additionally include an operation wherein the terminal does not expect the downlink signal to be configured or indicated by L1 signaling during G symbols subsequent to the downlink signal (downlink periodic signal or measurement signal) configured by the UE-specific RRC message, in symbols configured by flexible symbols by semi-static DL/UL assignment information or in symbols that are not configured by semi-static DL/UL assignment information.

In symbols configured by flexible symbols by semi-static DL/UL assignment information or symbols that are not configured by semi-static DL/UL assignment information, if the number of symbols between the last symbol of the downlink signal configured by a cell-specific RRC message or indicated by L1 signaling and the first symbol of the uplink signal configured by the cell-specific RRC message or indicated by L1 signaling is less than G, the operation of the terminal is as follows.

The terminal may receive a downlink signal configured by the cell-specific RRC message but may not transmit an uplink signal configured by the cell-specific RRC message or indicated by L1 signaling.

The terminal may transmit an uplink signal configured by the cell-specific RRC message and may not receive a downlink signal configured by the cell-specific RRC message or indicated by L1 signaling.

The terminal may operate according to L1 signaling. That is, if L1 signaling indicates downlink reception and the cell-specific RRC message configures uplink transmission, the terminal may perform downlink reception and may not perform uplink transmission. Conversely, if L1 signaling indicates uplink reception and the cell-specific RRC message configures downlink transmission, the terminal may perform uplink transmission and may not perform downlink reception.

Hereinafter, in the present specification, reception of a synchronization signal block (SSB) in an SS block-based RRM measurement timing configuration (SMTC) will be described.

A terminal should be able to perform measurement without a measurement gap when an SSB is completely included in an active bandwidth part of the terminal. If a subcarrier spacing of a measurement signal is different from PDSCH/PDCCH, or in frequency range FR2, there may be limitations in scheduling flexibility.

Specifically, if a subcarrier spacing of a measurement signal in frequency range FR1 is the same as PDSCH/PDCCH, there is no limitation in scheduling availability. However, if the subcarrier spacing of the measurement signal in frequency range FR1 is different from PDSCH/PDCCH, there may be a scheduling availability limitation, which will be described later. First, if the terminal is able to receive a data signal and an SSB having different subcarrier spacings (that is, if the terminal supports simultaneousRx-DataSSB-DiffNumerology), there is no scheduling availability limitation. Conversely, if the terminal is unable to receive a data signal and a synchronization signal block (SSB) having different subcarrier spacings (that is, if the terminal does not support simultaneousRxDataSSB-DiffNumerology), the terminal has limited scheduling availability. In this case, the following scheduling availability limitations are applied for SS-RSRP/RSRQ/SINR measurement.

i) If deriveSSB_IndexFromCell is enabled, the terminal expects neither to receive PDCCH/PDSCH nor to transmit PUCCH/PUSCH in consecutive SSB symbols and one symbol immediately preceding and one symbol immediately subsequent to the consecutive SSB symbols within an SMTC window.

ii) If deriveSSB_IndexFromCell is disabled, the terminal expects neither to receive PDCCH/PDSCH nor to transmit PUCCH/PUSCH in all symbols within the SMTC window.

deriveSSB_IndexFromCell indicates whether the UE, in order to derive an SSB index of a cell for an indicated SSB frequency and subcarrier spacing, can use a timing of a cell having the same SSB frequency and subcarrier spacing.

The following scheduling availability limitations are applied for SS-RSRP/SINR measurement in frequency range FR2.

i) The terminal expects neither to receive PDCCH/PDSCH nor to transmit PUCCH/PUSCH in consecutive SSB symbols and one symbol immediately preceding and one symbol immediately subsequent to the consecutive SSB symbols within the SMTC window.

The following scheduling availability limitations are applied for SS-RSRQ measurement in frequency range FR2.

i) The terminal expects neither to receive PDCCH/PDSCH nor to transmit PUCCH/PUSCH in consecutive SSB symbols, RSSI measurement symbols, and one symbol immediately preceding and one symbol immediately subsequent to the consecutive SSB/RSSI symbols within the SMTC window.

In the above description, the SMTC window follows smtc2 if smtc2 is configured from a higher layer and, otherwise, the SMTC window follows smtc1.

The present specification describes a method of determining, when there is a limitation on scheduling availability for reception of a measurement signal, a slot for repetition transmission of PUCCH according to the scheduling availability limitation. Specifically, when the terminal is configured to repeatedly transmit PUCCH K times, the terminal needs to determine K slots for repetition transmission of PUCCH.

The terminal is configured with carrier aggregation or dual connectivity for transmission of two or more cells in a bundle, wherein it is assumed that two cells are configured for convenience. The following description is applicable even when two or more cells are configured. One of two cells is a Pcell, and the Pcell is a cell in which the terminal transmits PUCCH. The other one of the two cells is an Scell, and the Scell is a cell in which the terminal does not transmit PUCCH. A measurement signal may be configured in an Scell.

The terminal may be set/configured with MeasObjectNR IE (information element) from a higher layer. MeasObjectNR IE includes information for intra/inter-frequency measurement. ssbFrequency included in MeasObjectNR IE informs of a frequency of an SSB, ssbFrequencySpacing informs of a subcarrier spacing of an SSB, and ssb-ToMeasure informs of configuration information on a time domain of an SSB to be measured. smtc1 or smtc2 included in MeasObjectNR IE informs of a configuration of the SMTC window.

The following is a method of determining K slots for transmission of PUCCH when the terminal is set/configured to repeatedly transmit PUCCH in K slots. i) If symbols to which PUCCH transmission is assigned in one slot overlap a measurement signal (SSB configured in MeasObjectNR) within the SMTC window, the terminal does not include the slot in K slots for transmission of PUCCH. ii) If symbols to which PUCCH transmission is assigned in one slot overlap a measurement signal (SSB configured in MeasObjectNR) in one symbol immediately subsequent to the measurement signal within the SMTC window, the terminal does not include the slot in K slots for transmission of PUCCH. iii) If symbols to which PUCCH transmission is assigned in one slot overlap a measurement signal (SSB configured in MeasObjectNR) in one symbol immediately subsequent to or one symbol immediately preceding the measurement signal within the SMTC window, the terminal does not include the slot in K slots for transmission of PUCCH. The described i) to iii) are applicable only when scheduling availability is limited.

The following is method of PUCCH transmission within the SMTC window after the terminal is set/configured to repeatedly transmit PUCCH in K slots and determines K slots for transmission of PUCCH. i) If symbols to which PUCCH transmission is assigned in one slot overlap a measurement signal (SSB configured in MeasObjectNR) and one symbol immediately subsequent to the measurement signal within the SMTC window, the terminal does not transmit PUCCH in the slot. ii) If symbols to which PUCCH transmission is assigned in one slot overlap a measurement signal (SSB configured in MeasObjectNR) and one symbol immediately subsequent to the measurement signal within the SMTC window, the terminal does not transmit PUCCH in the slot. iii) If symbols to which PUCCH transmission is assigned in one slot overlap a measurement signal (SSB configured in MeasObjectNR) and one symbol immediately subsequent to or one symbol immediately preceding the measurement signal within the SMTC window, the terminal does not transmit PUCCH in the slot. The described i) to iii) are applicable only when scheduling availability is limited.

The present specification describes a method of determining a slot for repetition PUCCH transmission when the terminal has only half-duplex capability. If the terminal has only half-duplex capability, the terminal cannot perform transmission and reception at the same time. That is, when the terminal performs transmission in one cell, the terminal cannot perform reception in another cell. Similarly, when the terminal performs reception in one cell, the terminal cannot perform transmission in another cell. Therefore, the terminal should operate in only one direction of transmission and reception in one cell.

The present specification provides descriptions of a method of, when there is a measurement signal that a terminal should receive in a Pcell/Scell, and the terminal is set/configured to repeatedly transmit PUCCH in K slots in the Pcell, determining K slots for transmission of PUCCH by the terminal. If a terminal determines, without considering a measurement signal required to be received in a Pcell/Scell, K slots for transmission of PUCCH in the Pcell, the terminal should transmit PUCCH in the Pcell and should receive a measurement signal in the Pcell/Scell in some slots. This operation is possible for a terminal having a full-duplex capability, but there is a problem in that this operation is not possible for a terminal having only a half-duplex capability. Therefore, the terminal should consider a measurement signal of the Pcell/Scell, to determine a slot in which PUCCH is to be transmitted.

In a method in which a terminal having a half-duplex capability determines K slots for repetition transmission of PUCCH, the terminal may, if symbols to which PUCCH transmission is assigned in one slot overlap a measurement signal of a Pcell/Scell within an SMTC window, exclude the slot from K slots in which PUCCH is to be repeatedly transmitted.

In a method in which a terminal having a half-duplex capability determines K slots for repetition transmission of PUCCH, the terminal may, if symbols to which PUCCH transmission is assigned in one slot overlap a measurement signal of a Pcell/Scell and a symbol immediately subsequent to the measurement signal within an SMTC window, exclude the slot from K slots in which PUCCH is to be repeatedly transmitted.

In a method in which a terminal having a half-duplex capability determines K slots for repetition transmission of PUCCH, the terminal may, if symbols to which PUCCH transmission is assigned in one slot overlap a measurement signal of a Pcell/Scell and a symbol immediately subsequent to or a symbol immediately preceding the measurement signal within an SMTC window, exclude the slot from K slots in which PUCCH is to be repeatedly transmitted.

The measurement signal may include an SSB configured in MeasObjectNR. The measurement signal may include a CSI-RS configured in MeasObjectNR. The CSI-RS may be configured via csi-rs-ResourceConfigMobility in MeasObjectNR IE.

In 3GPP NR Rel-16 enhanced URLLC (eURLLC), a technology for providing a service with high reliability as well as low latency will be introduced. In particular, in a case of uplink, a method in which a terminal repeatedly transmits a physical uplink shared channel (PUSCH) to a base station as quickly as possible so as to reduce a delay time and increase reliability may be supported. Hereinafter, the present specification describes a method in which a terminal repeatedly transmits a physical uplink data channel as quickly as possible.

A terminal receives scheduling information of PUSCH from a base station through PDCCH (or DCI). The terminal transmits PUSCH in uplink, based on the received scheduling information. The terminal may recognize a time-frequency resource in which PUSCH is to be transmitted, by using time domain assignment information (time domain resource assignment) and frequency domain assignment information (frequency domain resource assignment) for PUSCH transmission, which are included in DCI. A time resource in which PUSCH is transmitted includes consecutive symbols, and one PUSCH cannot be scheduled across a slot boundary.

3GPP NR Rel-15 supports repetition PUSCH transmission between slots. First, the terminal may receive a configured number of repetition transmissions from the base station. For example, a value configured for the terminal is assumed to be K. When the terminal receives PDCCH (or DCI) for scheduling of PUSCH in slot n and is indicated/configured to transmit PUSCH in slot n+k, the terminal may transmit PUSCH in K consecutive slots starting from slot n+k. That is, the terminal may transmit PUSCH in slot n+k, slot n+k+1, . . . , slot n+k+K−1. Time and frequency resources in which PUSCH is transmitted in each slot are the same as those indicated/configured via DCI. That is, PUSCH may be transmitted in the same symbol and the same PRB in a slot. In order to obtain a diversity gain in the frequency domain, frequency hopping may be configured for the terminal. Frequency hopping includes intra-slot frequency hopping in which frequency hopping is performed within a slot and inter-slot frequency hopping in which frequency hopping is performed for each slot. If intra-slot frequency hopping is configured for the terminal, the terminal divides PUSCH in half in the time domain in each slot, then transmits one half in a scheduled PRB, and transmits the other half in a PRB obtained by adding an offset value to the scheduled PRB. Here, for the offset value, two or four values may be configured via a higher layer, and one of the values may be indicated via DCI. If inter-slot frequency hopping is configured for the terminal, the terminal transmits PUSCH in a scheduled PRB in an odd-numbered slot in which PUSCH is transmitted, and transmits PUSCH in a PRB obtained by adding an offset value to the scheduled PRB in an even-numbered slot. When the terminal performs repetition transmission in a slot, if a symbol in which PUSCH should be transmitted is configured by a semi-static DL symbol in a specific slot, the terminal does not transmit PUSCH in the slot. PUSCH that has failed to be transmitted is deferred to another slot and is not transmitted.

The described repetition transmission of Rel-15 is not suitable for providing an eURLLC service. This is because there are problems that i) it is difficult to provide high reliability, and ii) a delay time is long. Specifically, if one slot includes 14 symbols and PUSCH is transmitted in symbols 12 and 13, PUSCH should be repeatedly transmitted in symbols 12 and 13 also in a subsequent slot. Therefore, although PUSCH transmission is possible in symbols 1 to 11 in the subsequent slot, transmission is not performed and it is thus difficult to obtain high reliability. In addition, it is assumed that one slot includes 14 symbols, and PUSCH is transmitted in symbols 0 to 13 in order to obtain high reliability. In order for the base station to successfully receive PUSCH, a last symbol of PUSCH, i.e., symbol 13, should be received. Therefore, there occurs a problem that a delay time becomes longer according to a length of PUSCH.

To solve this problem, in the present specification, a method of repeatedly transmitting PUSCH in one slot will be described. Specifically, a terminal may continuously and repeatedly transmit scheduled PUSCH. Continuous means that PUSCH is transmitted again from a symbol immediately after one PUSCH ends. This may be described as mini-slot-level PUSCH repetition, and the aforementioned 3GPP NR Rel-15 repetition transmission method may be described as slot-level PUSCH repetition.

When the mini-slot-level PUSCH repetition method is applied, the above-described problem can be solved. Specifically, i) high reliability may be provided. For example, if one slot includes 14 symbols and PUSCH is transmitted in symbols 12 and 13, PUSCH may be repeatedly transmitted in symbols 1 and 2 in a subsequent slot. Therefore, since PUSCH is directly and continuously transmitted, high reliability can be obtained. In addition, ii) a delay time may be decreased. For example, it is assumed that one slot includes 14 symbols, and PUSCH is transmitted in symbols 0 to 1 in order to obtain high reliability. Since PUSCH is repeatedly transmitted in a slot, PUSCH may be transmitted in symbols 2-3 and may be repeatedly transmitted in symbols 4-5. Accordingly, reliability similar to that of PUSCH transmission in which a length of one slot is 14 may be obtained. However, in this case, the base station may achieve reception success not only when all repetition transmissions are received according to a channel situation, but the base station may achieve reception success in the middle of repetition transmission. Accordingly, after symbol 2 in which first repetition transmission ends, the terminal may successfully receive PUSCH depending on a situation, so that a delay time can be reduced.

Hereinafter, a case in which mini-slot-level PUSCH repetition is repeatedly transmitted in another slot across a slot will be described. As described above, in mini-slot-level PUSCH repetition, subsequent repetition transmission of PUSCH starts from a symbol immediately following the end of one PUSCH transmission. However, continuous transmission may not be possible in the following situations.

i) First, a case where, when repetition PUSCH transmission is performed from a symbol immediately subsequent to a symbol in which first PUSCH transmission ends, symbols for PUSCH transmission and a semi-static DL symbol overlap. In this case, due to overlapping with the semi-static DL symbol, PUSCH cannot be transmitted from the immediately subsequent symbol. Therefore, PUSCH may be repeatedly transmitted in another symbol.

ii) Next, a case where, when repetition PUSCH transmission is performed from a symbol immediately subsequent to a symbol in which first PUSCH transmission ends, repeatedly transmitted PUSCH crosses a slot boundary. Since one PUSCH is not allowed to cross a slot boundary, PUSCH may be transmitted via another symbol.

In the present specification, a repetition PUSCH transmission method in consideration of cases i) and ii) will be described.

Figure 18:
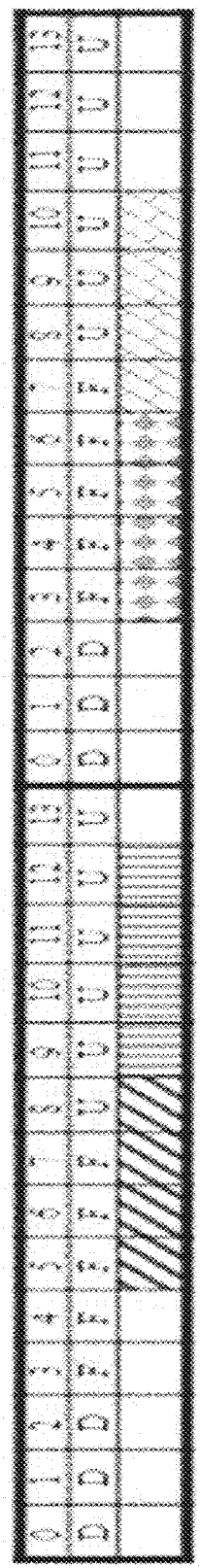
FIG. 18 illustrates repetition mini-slot-level PUSCH transmission according to an embodiment of the present disclosure.

FIG. 18 illustrates repetition mini-slot-level PUSCH transmission according to an embodiment of the present disclosure.

If a terminal is configured to perform mini-slot-level PUSCH repetition, the terminal transmits PUSCH in a symbol immediately subsequent to one PUSCH transmission. If PUSCH cannot be transmitted (as described above, in the case of overlapping with a semi-static DL symbol or crossing a slot boundary), the terminal may transmit PUSCH in an earliest symbol available for transmission. Here, the earliest symbol available for transmission refers to a case where PUSCH does not overlap a semi-static DL symbol and does not cross a slot boundary. Referring to FIG. 18, the terminal may be configured to perform transmission repeatedly 4 times with mini-slot-level PUSCH repetition, and may be configured/indicated, from PDCCH (or DCI), to transmit PUSCH via 4 symbols from a fifth symbol of a slot. In FIG. 18, D, U, and F refer to a downlink symbol, an uplink symbol, and a flexible symbol in semi-static DL/UL configuration. The terminal may transmit first PUSCH in slot symbols 5 to 8, and may determine whether second PUSCH is transmittable in symbols 9 to 12 which are immediately subsequent repetition PUSCH transmission periods. If transmission is possible (that is, if PUSCH does not overlap a semi-static DL symbol and does not cross a slot boundary), the terminal may transmit second PUSCH in symbols 9 to 12. In this case, PUSCH starting in symbol 13, which is a subsequent symbol of a last symbol (symbol 12) in which second PUSCH is transmitted, crosses a slot boundary and overlaps a semi-static DL symbol, third PUSCH transmission cannot be performed. Subsequent transmittable symbols are symbols 3 to 6 of the subsequent slot, and since these symbols are flexible symbols, PUSCH transmission is possible. Therefore, third repetition PUSCH transmission is performed in the corresponding symbols. Thereafter, fourth repetition PUSCH transmission is performed in symbols 7 to 10. Since the terminal has completed 4 repetition transmissions, repetition transmission is no longer performed.

Figure 19:
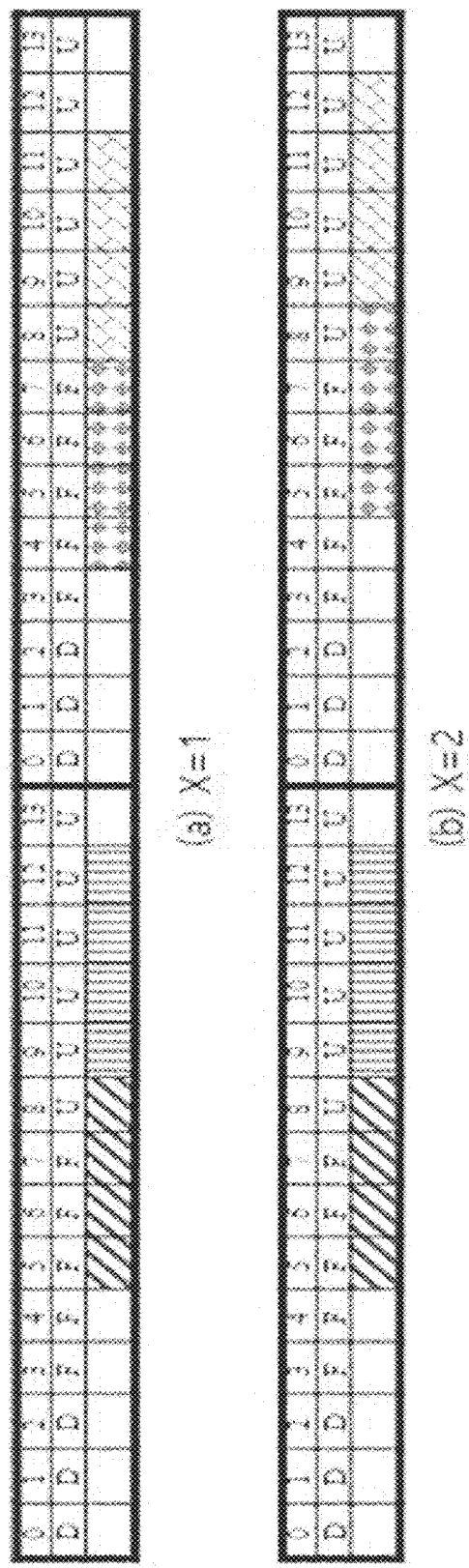
FIG. 19 illustrates repetition mini-slot-level PUSCH transmission according to another embodiment of the present disclosure.

FIG. 19 illustrates repetition mini-slot-level PUSCH transmission according to another embodiment of the present disclosure.

If a terminal is configured/indicated to perform mini-slot-level PUSCH repetition, the terminal transmits PUSCH in a symbol immediately subsequent to one PUSCH transmission. If PUSCH cannot be transmitted (if overlapping with a semi-static DL symbol or X flexible symbols immediately subsequent to the semi-static DL symbol, or crossing a slot boundary), the terminal may transmit PUSCH in an earliest symbol available for PUSCH transmission. Here, the earliest symbol available for transmission refers to a symbol in which PUSCH does not overlap a semi-static DL symbol, does not overlap X flexible symbols immediately subsequent to the semi-static DL symbol, and does not cross a slot boundary. Referring to FIG. 19, it is assumed that the terminal may be configured to perform transmission repeatedly 4 times with mini-slot-level PUSCH repetition, and may be indicated, from PDCCH (or DCI), to transmit PUSCH via 4 symbols from a fifth symbol of a slot. D, U, and F of FIG. 19 refer to a downlink symbol, an uplink symbol, and a flexible symbol in semi-static DL/UL configuration. According to FIG. 19, the terminal may transmit PUSCH in symbols 5 to 8 of a first slot, and may determine whether PUSCH is transmittable in symbols to 12 which are immediately subsequent repetition PUSCH transmission periods. If transmission is possible (that is, if PUSCH does not overlap a semi-static DL symbol, does not overlap X flexible symbols immediately subsequent to the semi-static DL symbol, and does not cross a slot boundary), the terminal may perform second repetition PUSCH transmission in symbols 9 to 12. A third PUSCH transmission duration starting from subsequent symbol 13 crosses a slot boundary and overlaps a semi-static DL symbol, so that third PUSCH cannot be transmitted. FIG. 19(*a*) is a case where X=1, and FIG. 19(*b*) is a case where X=2. Referring to FIG. 19(*a*), a subsequent duration in which PUSCH is transmittable is symbol 4 to symbol 7 of a subsequent slot. These symbols are flexible symbols, and transmission is thus possible. Therefore, third repetition PUSCH transmission is performed in the corresponding symbols. Fourth repetition PUSCH transmission is performed in symbols 8 to 11. Since the terminal has completed 4 repetition transmissions, repetition transmission is no longer performed. Referring to FIG. 19(*b*), a subsequent duration in which PUSCH is transmittable is symbol 5 to symbol 8 of a subsequent slot. These symbols are flexible symbols or semi-static UL symbols, and transmission is thus possible. Therefore, third repetition PUSCH transmission is performed in the corresponding symbols. Fourth repetition PUSCH transmission is performed in symbols 9 to 12. Since the terminal has completed 4 repetition transmissions, repetition transmission is no longer performed.

If an SS/PBCH block is configured in a cell for repetition PUSCH transmission, or if an SS/PBCH block for measurement is configured in another cell and measurement is required to be performed, the terminal processes symbols corresponding to the SS/PBCH block in the same way as a semi-static DL symbol. For example, as described above, a case where PUSCH cannot be transmitted may include a symbol overlapping an SS/PBCH block and X flexible symbols immediately subsequent to the symbol overlapping the SS/PBCH block, in addition to a case of overlapping a semi-static DL symbol or X flexible symbols immediately subsequent to the semi-static DL symbol or crossing a slot boundary.

The terminal configured to repeatedly transmit PUSCH K times may, until PUSCH is transmitted K times, defer PUSCH until symbols available for transmission are found. However, deferring PUSCH for too long does not meet the purpose of mini-slot-level PUSCH repetition. Mini-slot-level PUSCH repetition is a method for supporting an uplink URLLC service, and if PUSCH is deferred for too long, this goes against requirements of the URLLC service. In addition, an operation of PUSCH transmission caused by deferring of PUSCH for too long prevents a base station from using a corresponding resource for other terminals, so that there is a problem that network resources are wasted. Therefore, in the present specification, a condition of terminating repetition transmission in mini-slot-level PUSCH repetition will be described.

Figure 20:
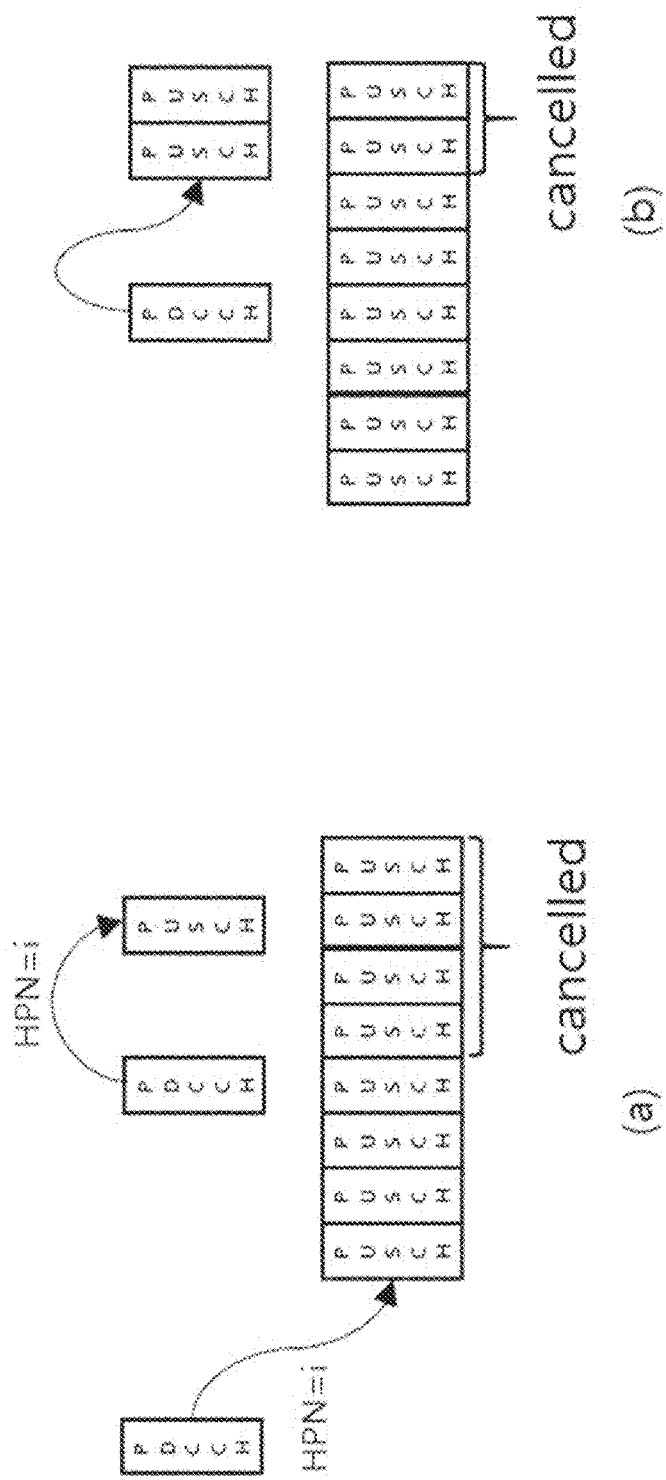
FIG. 20 is a diagram illustrating a condition in which repetition mini-slot-level PUSCH transmission ends according to an embodiment of the present disclosure.

FIG. 20 is a diagram illustrating a condition in which repetition mini-slot-level PUSCH transmission ends according to an embodiment of the present disclosure.

i) If new PUSCH having the same HARQ process number (HPN) as repeatedly transmitted PUSCH is scheduled, a terminal may stop preceding PUSCH repetition. Specifically, referring to FIG. 20(*a*), scheduling information for scheduling of repeatedly transmitted PUSCH includes HPN=. If another PDCCH (or DCI) (DCI format 0_0 or 0_1) for scheduling of PUSCH has the same HPN (HPN=i) as the HPN, or a new data indication (NDI) is toggled additionally, repetition PUSCH transmission may not be performed after PDCCH. A processing time is required to receive PDCCH and cancel PUSCH so that, after a last symbol of PDCCH, PUSCH before a predetermined time may not be cancelled and only PUSCH after the predetermined time may be cancelled.

ii) If another PUSCH is scheduled in the same symbol of repeatedly transmitted PUSCH, the terminal may not perform repetition transmission of the PUSCH. Referring to FIG. 20(*b*), if PDCCH is scheduled to overlap previously scheduled PUSCH in the time domain, repetition transmission of PUSCH may be terminated.

iii) If the terminal receives explicit HARQ-ACK for repeatedly transmitted PUSCH, the terminal may no longer perform repetition transmission. Explicit HARQ-ACK refers to information notified to the terminal by the base station through a separate channel so as to indicate whether PUSCH transmission is successfully performed.

iv) The terminal may no longer transmit repeatedly transmitted PUSCH after a predetermined time. For example, if the requirements of the URLLC service via which PUSCH is transmitted is to finish transmission within 1 ms, the terminal may no longer transmit PUSCH after 1 ms. The predetermined time may be an absolute time, such as 1 ms, or may be determined according to slots, such as 2 slots. The predetermined time is a value configurable by the base station.

The terminal set/configured to transmit PUSCH repeatedly K times may count the number of PUSCHs repeatedly transmitted K times. Conventionally, the terminal increases the number of repeatedly transmitted PUSCHs only when PUSCH is actually transmitted. However, as described above, an excessively long delay may occur to transmit PUSCH K times. In order to solve this problem, in the present specification, a counting rule will be described.

Figure 21:
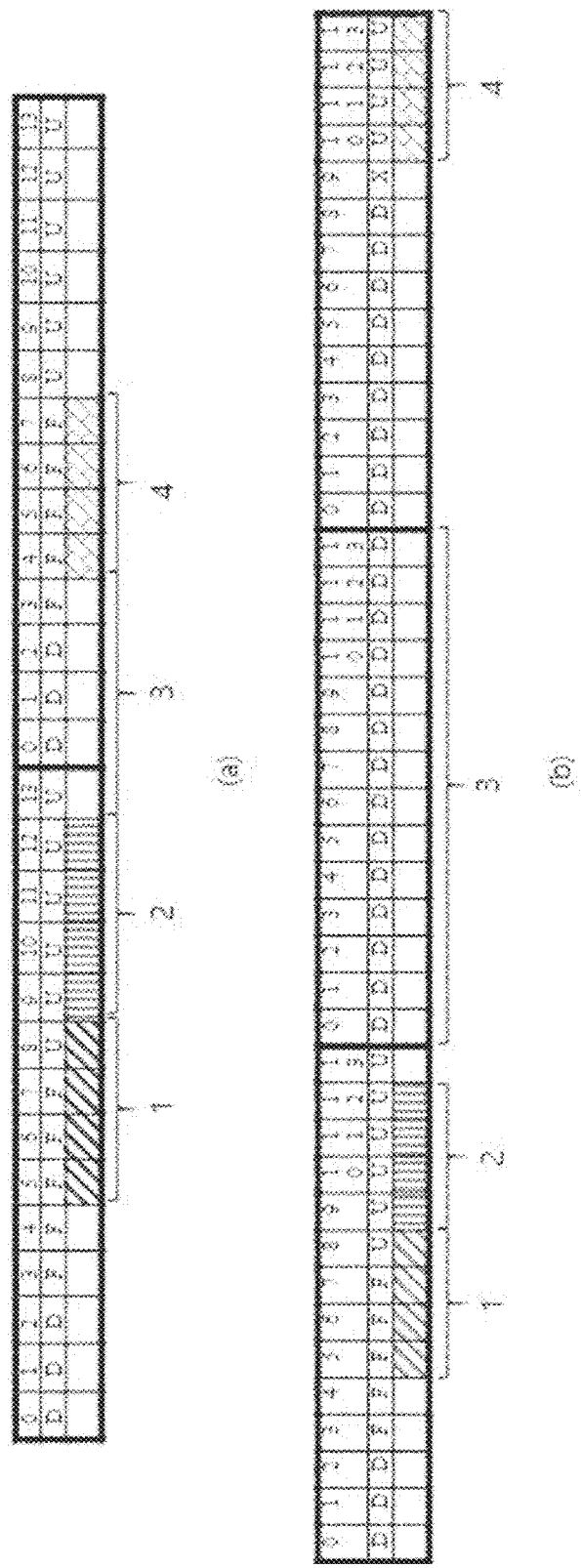
FIG. 21 is a diagram illustrating a counting rule of repetition mini-slot-level PUSCH transmission according to an embodiment of the present disclosure.

FIG. 21 is a diagram illustrating a counting rule of repetition mini-slot-level PUSCH transmission according to an embodiment of the present disclosure.

i) A terminal counts the number of PUSCHs when PUSCH is actually transmitted. The terminal performs counting if PUSCH cannot be transmitted during Y symbols. If a counted value exceeds the number K of PUSCH repetitions, PUSCH is no longer transmitted. Here, Y symbols may be the number of symbols assigned to the PUSCH. Y symbols may be the number of symbols included in one slot. Y symbols may correspond to a value set/configured from a higher layer.

FIG. 21(a) shows the number of repetition PUSCH transmissions obtained according to i). Referring to FIG. 21(a), it is assumed that the terminal is configured/indicated to repeatedly transmit (K=4) PUSCH 4 times, and that Y=5 is configured. The terminal has performed no repetition PUSCH transmission in a last symbol of a first slot and first 4 symbols of a second slot, but has failed to perform transmission for Y=5 symbols (from the last symbol of the first slot to a fourth symbol of the second slot), and therefore the terminal needs to count the number of PUSCHs. In symbols 4, 5, 6, and 7 of the second slot, the last fourth repetition PUSCH transmission may be performed.

ii) The terminal counts the number of PUSCHs when PUSCH is actually transmitted. If repetition PUSCH transmission is not performed even once in Z slot, the number of PUSCHs is counted. If the counted number of PUSCHs exceeds the number K of PUSCH repetitions, the PUSCH is no longer transmitted. Here, Z slot may correspond to 1 slot. Z slot may correspond to a value configured from a higher layer.

FIG. 21(b) shows the number of repetition PUSCH transmissions obtained according to ii). It is assumed that the terminal is configured/indicated to repeatedly transmit (K=4) PUSCH 4 times, and that Z=1 is set/configured. Even if the terminal has performed no repetition PUSCH transmission in a second slot (reference numeral 3 in FIG. 21), the number of PUSCHs is counted because the terminal has failed to perform PUSCH transmission during one slot. In symbols 10, 11, 12, and 13 of a third slot, the last fourth repetition PUSCH transmission may be performed.

Referring to the 3GPP standard documents, PUSCH for transmission of uplink data by the terminal cannot cross a slot boundary. That is, a start symbol and a last symbol of scheduled PUSCH should always be located in the same slot. (In a case of repetition PUSCH transmission, a start symbol and a last symbol may be located in different slots, but general PUSCH transmission excluding a case of repetition transmission will be described in this document.) Specifically, a base station may inform a terminal of information on symbols in which PUSCH transmission is possible, via a starting and length indication value (SLIV). SLIV may inform about a position (expressed as S and may have one of values 0, 1, 2, . . . , 13) and a length (expressed as L and may have one of values 1, 2, . . . , 14) of a start symbol in a slot. In other words, an SLIV value has one of S+L=1, 2, . . . , 14. If a combination of S+L>14 is used, the start symbol and the last symbol cannot be located in the same slot. For example, if S=5 and L=10, transmission starts from a 6th symbol of a slot and has a length of 10 symbols, so that 1 symbol becomes a first symbol of a subsequent slot. Accordingly, a start symbol and an end symbol are located in different slots, which is inappropriate. SLIV may be obtained based on Equation 3 below.

[Equation 3]

if $(L-1) \le 7$ then $$SLIV = 14 \cdot (L-1) + S$$

else $$SLIV = 14 \cdot (14 - L + 1) + (14 - 1 - S)$$

where $0 < L \le 14 - S$, and

In order to provide the URLLC service, the base station needs to assign resources to the terminal so that PUSCH transmission starts as quickly as possible. Sufficiently many symbols are required to be used to satisfy reliability. However, since PUSCH cannot be scheduled beyond a slot boundary, if the number of symbols available for uplink transmission in the current slot is not sufficient, PUSCH transmission should be scheduled in a subsequent slot. This is not suitable for the URLLC service due to a problem of a time delay until transmission in the subsequent slot. In order to solve this problem, in the present specification, a SLIV design method enabling scheduling beyond a slot boundary will be described.

When the terminal receives an SLIV value beyond a slot boundary (i.e., S+L>14), the terminal cannot transmit PUSCH crossing the slot boundary. Accordingly, the terminal may transmit first PUSCH in symbols included in the front side of the slot based on the slot boundary and may transmit second PUSCH in symbols included in the rear side of the slot. Specifically, first PUSCH having a length of L1=13−S+1 is transmitted in a duration from symbol S to symbol 13 (last symbol) of the front side of the slot, and second PUSCH having a length of L2 may be transmitted in a duration from symbol 0 to symbol L2-1 of the rear side of the slot. Here, L2=L−L1. First PUSCH and second PUSCH may correspond to repetition transmission of the same transport block (TB). If the symbols are not available for uplink transmission, the terminal may transmit the first PUSCH and the second PUSCH in symbols other than the symbols. In this case, the symbols unavailable for uplink transmission may include DL symbols determined according to semi-static DL/UL assignment, P flexible symbols immediately subsequent to the DL symbols, symbols corresponding to an SS/PBCH block, and P flexible symbols immediately subsequent to symbols corresponding to the SS/PBCH block. P may have a value of 1 or 2.

Figure 22:
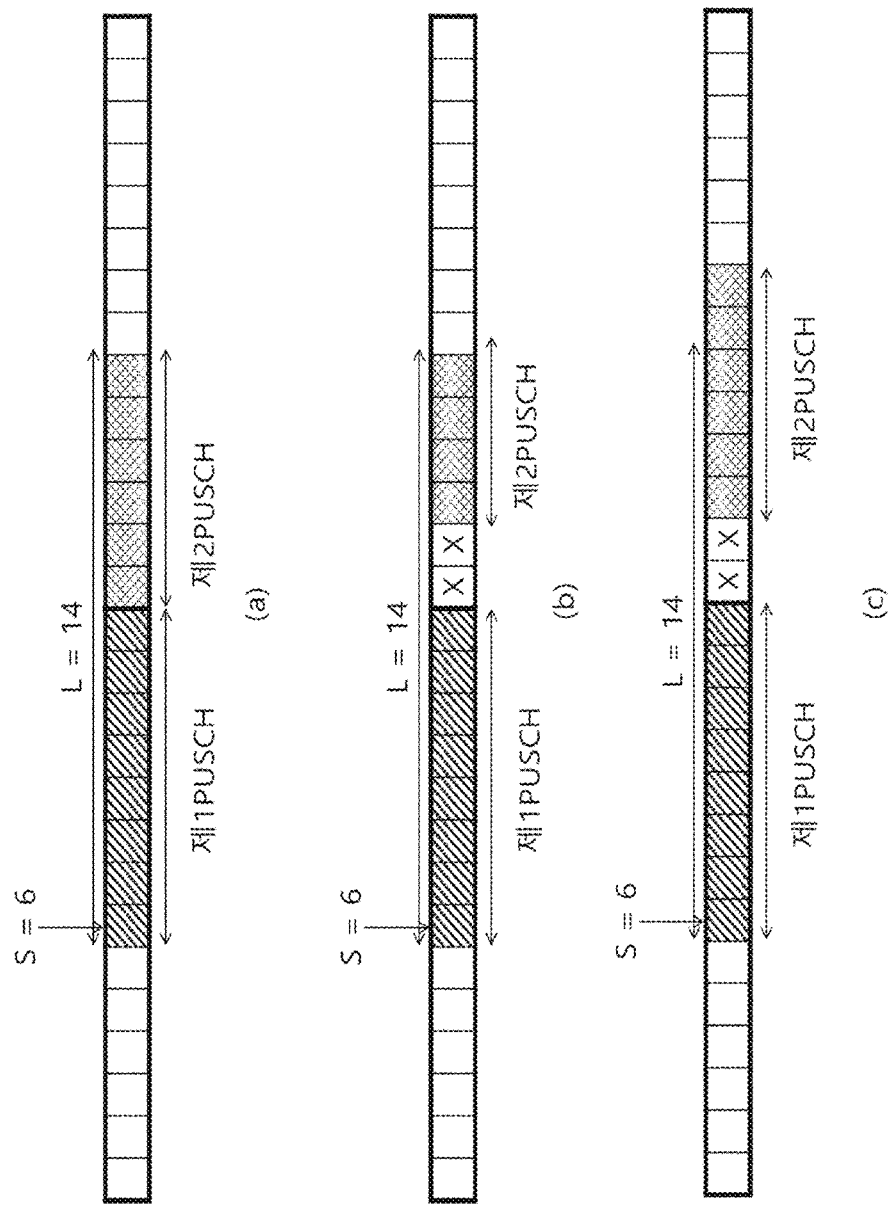
FIG. 22 is a diagram illustrating PUSCH transmission in consideration of a slot boundary according to an embodiment of the present disclosure.

FIG. 22 is a diagram illustrating PUSCH transmission in consideration of a slot boundary according to an embodiment of the present disclosure.

Referring to FIG. 22(a), when a start symbol is symbol 6 (S) and PUSCH with a length of 14 is scheduled, first PUSCH with a length of 8 may be transmitted from symbol 6 to symbol 13 of a first slot, and second PUSCH with a length of 6 may be transmitted from symbol 0 to symbol 5 of a second slot. Referring to FIG. 22(b), if first two symbols of the second slot are symbols in which uplink transmission cannot be performed, the terminal may not transmit PUSCH in the two symbols. Accordingly, second PUSCH may be transmitted via 4 symbols from a third symbol of the second slot.

As in FIG. 22(b), if there is a symbol unavailable for uplink transmission, a length of PUSCH is reduced. To prevent this, when a symbol for PUSCH transmission overlaps a symbol in which uplink transmission is impossible, PUSCH may be transmitted by deferring transmission to symbols in which uplink transmission is possible, subsequent to the symbol in which uplink transmission is impossible. For example, referring to FIG. 22(c), if first two symbols of the second slot are symbols in which uplink transmission cannot be performed, the terminal may transmit second PUSCH via 6 symbols, in which uplink transmission is possible, subsequent to the two symbols. In this case, transmission of PUSCH may be delayed for a while, but the number of symbols assigned to PUSCH may be maintained, and deterioration of reception performance of PUSCH may thus be prevented.

Hereinafter, an SLIV design method will be described in the present specification.

SLIV may be designed to satisfy the following conditions.

The position (S) of a start symbol may have one of 0, 1, ..., 13, and the length (L) of the entire PUSCH may have one of 1, 2, ..., 14. A value of S+L may be any value from 1 to 27 without a separate restriction. SLIV satisfying this condition may be calculated as follows.

$$SLIV=S+14*(L-1) \text{ or}$$

$$SLIV=L-1+14*S$$

When SLIV=S+14*(L−1) is used as an equation to calculate SLIV, S may be obtained using the remainder of dividing SLIV by 14 (S=SLIV mod 14), and L may be obtained by adding 1 to a quotient obtained by dividing SLIV by 14. (L=floor(SLIV/14)+1). When SLIV=L−1+14*S is used as an equation to calculate SLIV, L may be obtained by adding 1 to the remainder of dividing SLIV by 14 (L=(SLIV mod 14)+1), and S may be obtained using a quotient obtained by dividing SLIV by 14. (S=floor(SLIV/14))

When SLIV is determined by the above method, the terminal may perform scheduling beyond a slot boundary. However, when PUSCH transmission is scheduled in this way, scheduling may not be performed up to the last symbol of the second slot (based on a slot boundary, a front side is referred to as a first slot and a rear side is called a second slot). This has a problem that it is not efficient in terms of a frequency use efficiency because only some symbols are used despite available symbols in the second slot. Hereinafter, a method for solving these problems will be described in the present specification.

The position (S) of a start symbol may have one of 0, 1, ..., 13, and the length (L) of the entire PUSCH may have one of 1, 2, ..., 28. A value of S+L should be smaller than or equal to 28. For reference, up to L=28 is possible in this case, but since PUSCH transmitted according to SLIV is divided at a slot boundary, a length of one PUSCH is equal to or smaller than 14 symbols. An equation for obtaining SLIV satisfying this condition is as shown in Equation 4.

If $(L-1) \leq 7+14$ then $$SLIV=14*(L-1)+S$$

else $$SLIV=141*4+14*(28-L+1)+(4-1-S) \qquad [\text{Equation 4}]$$

where 0<L≤28−S

Generally speaking, the position (S) of a start symbol may have one of 0, 1, ... B, and the length (L) of the entire PUSCH may have one of 1, 2, ..., A. A value of S+L should be smaller than or equal to A. An equation for obtaining SLIV satisfying this condition is the same as Equation 5.

If $(L-1)-\text{floor}((A-(B+1))/2) \leq \text{floor}(A/2)$ then $$SLIV=(B+1)*(L-1)+S$$

else $$SLIV=(B+1)*(A-L+A-B)+(B-S) \qquad [\text{Equation 5}]$$

where 0<L≤A−S

If A=14 and B=13, the equation is the same as Equation 3, and if A=28, and B=13, the equation is the same as Equation 4. A may be determined as a multiple of the number of symbols included in one slot. For example, if the number of symbols included in one slot is 14, A=14, 28, 42, etc. may be determined. B may be determined as a value obtained by subtracting 1 from a multiple of the number of symbols included in one symbol. For example, if the number of symbols included in one slot is 14, B=13, 27, 41, etc. may be determined.

An SLIV value crossing a slot boundary may be obtained by multiplying, by an integer, the length among the SLIV values in Equation 3. The position (S) of a start symbol may have one of 0, 1, ..., 13, and the length (L) of the entire PUSCH may have one of 2, 4, 6, ..., 28. A value of S+L should be smaller than or equal to 28. An equation for obtaining SLIV satisfying this condition is as shown in Equation 6. Here, L=2*X may be obtained, where one of values X=1, 2, 3, ..., 14 may be obtained. This method doubles the length obtained from Equation 3, thereby enabling scheduling beyond a slot boundary. In general, L=A*X may be obtained, where A is determined as one of two or more natural numbers.

If $(X-1) \leq 7$ then $$SLIV=14*(X-1)+S$$

else $$SLIV=14*(14-X+1)+(14-1-S) \qquad [\text{Equation 6}]$$

where 0<X≤14−S

When Equation 6 is used, not only an SLIV interpretation scheme is similar to Equation 3, but also SLIV is expressed with the same number of bits, so that it is advantageous in terms of overhead.

According to Equation 3, a total number of possible values of SLIV are 14*15/2=105, which may be expressed by 7 bits. Since 7 bits can express 0, 1, ..., 127, the remaining 23 values (127-105) according to Equation 3 are not used. In this case, a base station may perform scheduling beyond a slot boundary by using 23 values that are not used by SLIV. Specifically, when SLIV is one of unused 23 values, values of the position (S) and the length (L) of the start symbol may be predetermined. For example, if SLIV is one of the 23 values, a determination may be made so that S=7 and L=14. S and L values may be configured/indicated via a higher layer.

Hereinafter, the present specification provides descriptions of a repetition PUSCH transmission scheme in which mini-slot-level PUSCH repetition and multi-segment transmission schemes are combined.

Figure 23:
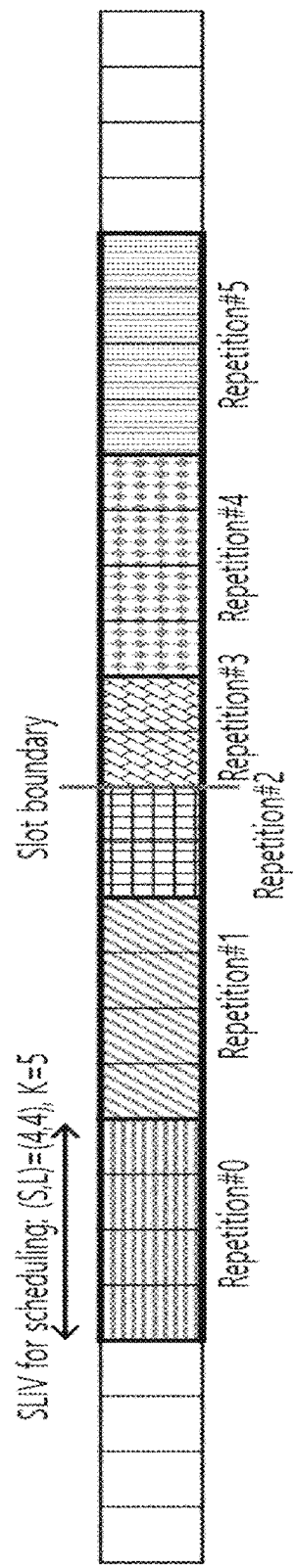
FIG. 23 to FIG. 26 are diagrams illustrating repetition PUSCH transmission in consideration of multi-segment transmission and repetition mini-slot-level PUSCH transmission according to an embodiment of the present disclosure.
Figure 24:
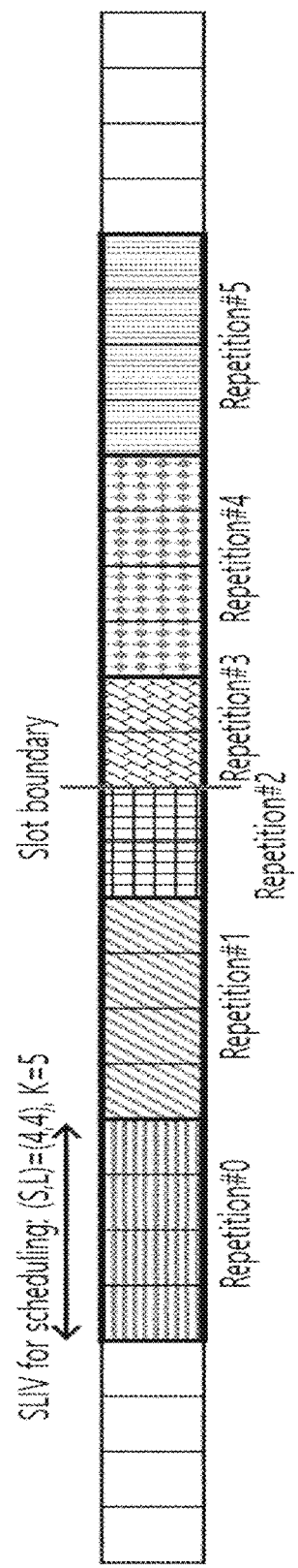
Figure 25:
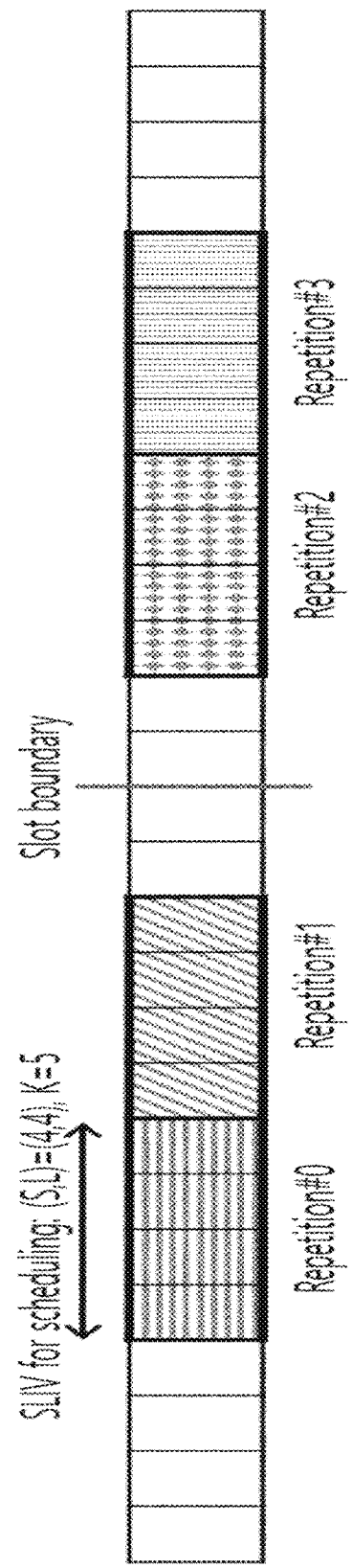
Figure 26:
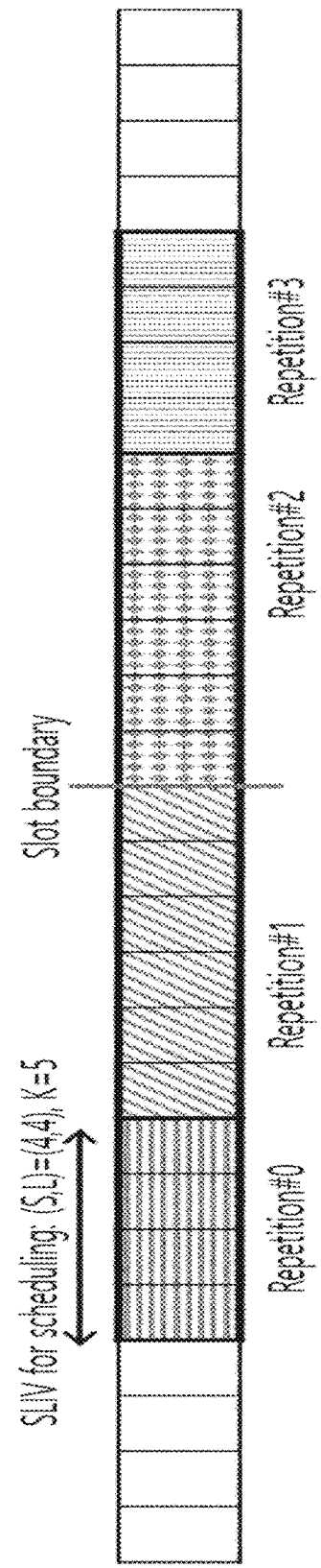

FIG. 23 to FIG. 26 are diagrams illustrating repetition PUSCH transmission in consideration of multi-segment transmission and repetition mini-slot-level PUSCH transmission according to an embodiment of the present disclosure.

i) Referring to FIG. 23, a base station transmits time domain resource assignment information (S: start symbol index, L: length) for first repetition PUSCH transmission of PUSCH to a terminal. Then, the number (K) of repetitions is transmitted. The terminal determines symbols in which repetition PUSCH transmission is performed using the received information. In this case, subsequent repetition PUSCH transmission is continuously performed in a symbol immediately subsequent to a symbol in which first repetition PUSCH transmission is performed. If one repetition PUSCH transmission crosses a slot boundary, the repetition PUSCH transmission may be divided based on the slot boundary. If one repetition PUSCH transmission overlaps an SS/PBCH block or a DL symbol configured in a semi-static UL/DL configuration, repetition PUSCH transmission may be performed in a symbol that does not overlap the DL symbol. The terminal may exclude, from repetition PUSCH transmission, a flexible symbol immediately subsequent to the DL symbol configured in the semi-static UL/DL configuration. Referring to FIG. 23, when it is configured that an index of a start symbol in which first repetition PUSCH transmission is performed is 4, a length is 4, and the number of repetition transmissions is 5, since third repetition PUSCH transmission crosses a slot boundary, the third repetition PUSCH transmission is divided based on the slot boundary. This method may cause disadvantages that, when repetition PUSCH transmission is divided at the slot boundary, the number of symbols included in one repetition PUSCH transmission is too few. In order to solve this problem, if repetition PUSCH transmission is configured by only one symbol, the terminal may not perform the repetition PUSCH transmission. This is because, if repetition PUSCH transmission is configured by only one symbol, data other than a DM-RS cannot be transmitted in the corresponding one symbol. If the number of symbols in which repetition PUSCH transmission is performed is equal to or less than the number of DM-RS symbols required to be transmitted via repetition PUSCH transmission, the terminal may not perform repetition PUSCH transmission.

ii) Referring to FIG. 24, a base station transmits, to a terminal, time domain resource assignment information (S: start symbol index, L: length) for PUSCH transmission. Then, the number (K) of repetitions is transmitted. The base station determines whether L*K symbols from a start symbol corresponding to S have crossed a slot boundary. If the slot boundary is not crossed, first repetition PUSCH transmission is configured by L symbols starting from the start symbol, and K−1 subsequent repetition PUSCH transmissions may continuously start from a symbol immediately subsequent to the symbol in which first repetition PUSCH transmission is performed, and may be configured by L symbols. If the slot boundary is crossed, the terminal may divide repetition PUSCH transmission of L*K symbols on the basis of the slot boundary. Referring to FIG. 24, when it is given that an index of the start symbol of PUSCH is 4, a length is 4, and the number of repetition transmissions is 5, since 20 symbols from a symbol corresponding to index 4 cross a slot boundary, the terminal may divide the 20 symbols on the basis of the slot boundary. Therefore, in FIG. 24, two repetition PUSCH transmissions may be performed.

iii) Referring to FIG. 25, a base station transmits time domain resource assignment information (S: start symbol index, L: length) for first repetition PUSCH transmission of PUSCH to a terminal. Then, the number (K) of repetitions is transmitted. The terminal determines symbols in which repetition PUSCH transmission is to be performed, via the received information. Subsequent repetition PUSCH transmission is continuously performed in a symbol immediately subsequent to a symbol in which first repetition PUSCH transmission is performed. In this case, if one repetition PUSCH transmission crosses a slot boundary, the terminal does not perform the repetition PUSCH transmission. If one repetition PUSCH transmission overlaps an SS/PBCH block or a symbol configured for DL in a semi-static UL/DL configuration, the terminal may not perform the repetition PUSCH transmission. For example, in FIG. 25, third repetition PUSCH transmission should be performed in symbols 12 and 13 of a first slot and in symbols 0 and 1 of a second slot, but this crosses a slot boundary and no transmission is thus performed.

iv) Referring to FIG. 26, a base station transmits time domain resource assignment information (S: start symbol index, L: length) for first repetition PUSCH transmission of PUSCH to a terminal. Then, the number (K) of repetitions is transmitted. The terminal determines symbols in which repetition PUSCH transmission is to be performed, via the received information. Subsequent repetition PUSCH transmission is continuously performed in a symbol immediately subsequent to a symbol in which first repetition PUSCH transmission is performed. If symbols assigned to one repetition PUSCH transmission cross a slot boundary, the terminal may divide, based on the slot boundary, the symbols assigned for the repetition PUSCH transmission, and the divided symbols may be included in adjacent repetition PUSCH transmission in the same slot. If there is no adjacent repetition PUSCH transmission in the same slot, the terminal may perform repetition PUSCH transmission by using the symbols. For example, symbols (symbols 12 and 13 of a first slot and symbols 0 and 1 of a second slot) assigned to third repetition PUSCH transmission of FIG. 26 cross the slot boundary. Accordingly, division may be performed in units of two symbols (symbols 12 and 13, and symbols 0 and 1) according to the slot boundary, first two symbols may be included in preceding repetition PUSCH transmission, and second two symbols may be included in subsequent repetition PUSCH transmission.

Figure 27:
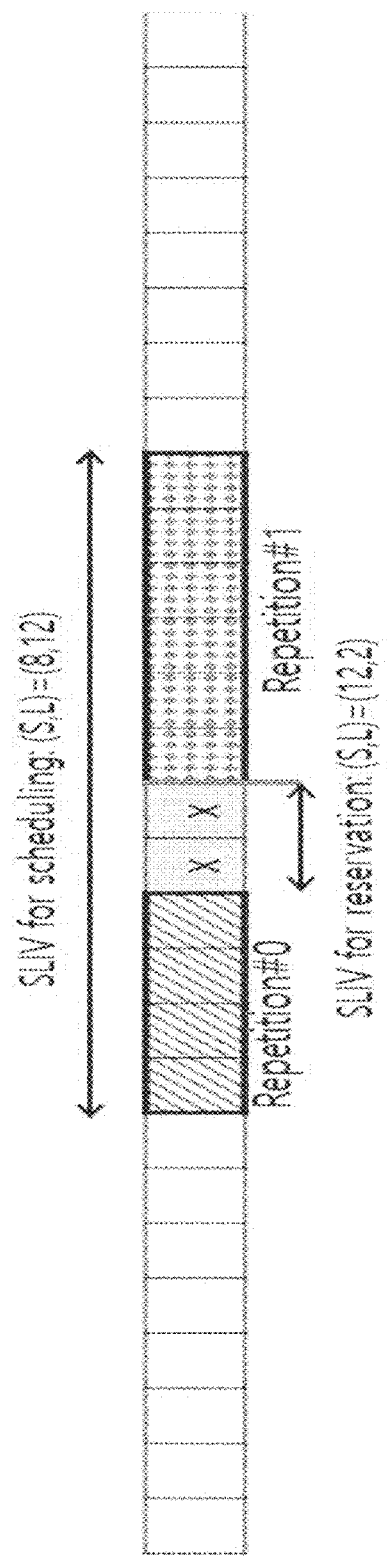
FIG. 27 is a diagram illustrating repetition PUSCH transmission according to an embodiment of the present disclosure.

FIG. 27 is a diagram illustrating repetition PUSCH transmission according to an embodiment of the present disclosure.

Referring to FIG. 27, a base station may additionally transmit, to a terminal, information on symbol(s) unavailable for repetition PUSCH transmission. The terminal may perform repetition PUSCH transmission using the aforementioned i) to iv) transmission methods, wherein, if symbols unavailable for the repetition PUSCH transmission overlap a symbol to which the repetition PUSCH transmission is allocated, the symbols unavailable for repetition PUSCH transmission may be excluded from the repetition PUSCH transmission. If the symbols unavailable for repetition PUSCH transmission overlap the symbol to which the repetition PUSCH transmission is allocated, the terminal may not perform the repetition PUSCH transmission. Information on the symbol(s) unavailable for repetition PUSCH transmission may be configured to the terminal via an RRC signal. The symbol(s) unavailable for repetition PUSCH transmission may be configured to the terminal via the RRC signal, and which symbol(s) among the configured symbol(s) unavailable for repetition PUSCH transmission cannot be actually used for repetition PUSCH transmission may be indicated. When the base station configures, to the terminal, the symbol(s) unavailable for repetition PUSCH transmission, via a time domain resource assignment (TDRA) table, configuration may be performed differently for each entry in each table. The terminal may be configured/indicated with one entry of the TDRA table configured via DCI, and may perform repetition PUSCH transmission according to the symbol(s) unavailable for repetition PUSCH transmission, which are configured in the entry.

Hereinafter, in the present specification, a method of obtaining a size of a transport block (TB) when performing repetition PUSCH transmission will be described. According to the 3GPP standard documents, a size of a TB may be proportional to the number of REs of a resource to which PUSCH is allocated. That is, PUSCH to which more REs are assigned may have a larger TB size. However, as described above, the number of REs available for each repetition PUSCH transmission may be different. For example, first repetition PUSCH transmission may use 2 symbols and second repetition USCH transmission may use 10 symbols. In this case, it is necessary to determine the number of which REs is to be used to determine a size of a TB.

First, a method is to determine a size of a TB so as to enable decoding of first PUSCH (decodable). A reason for using repetition PUSCH transmission is to reduce a delay time by fast decoding success. Therefore, it is important that first PUSCH is transmitted decodably. Accordingly, the terminal may determine the size of the TB according to the number of REs for first PUSCH. The terminal may determine the size of the TB, based on a minimum value of REs corresponding to repetition PUSCH transmission having a redundancy version (RV) value of 0. However, when the size of the TB is determined based on the number of REs for first PUSCH, since the number of REs occupied by another PUSCH is not considered, there is a problem that an optimal TB size cannot be determined. For example, when the number of REs used for first PUSCH transmission is more than the number of REs used for second PUSCH transmission, if the size of the TB is determined based on the number of REs used for first PUSCH transmission, since the number of REs used for second PUSCH transmission is less, a code rate may be increased, which may cause performance degradation.

Therefore, if the number of REs used for first repetition PUSCH transmission is less than an average (that is, a value obtained by dividing the number of REs used for all repetition PUSCH transmissions by the number of repetitions) of the number of REs used for all repetition transmissions, the size of the TB is determined according to the number of REs used for first repetition PUSCH transmission, and otherwise, the size of the TB is determined according to the average value of the number of REs used for all repetition transmissions. That is, if the size of the TB determined according to the number of REs used for first repetition PUSCH transmission is smaller than an average TB size (that is, a value obtained by dividing the sum of the sizes of TBs determined according to the number of REs used for respective repetition PUSCH transmissions by the number of repetition transmissions) determined according to the number of REs used for all repetition transmissions, the size of the TB is determined according to the number of REs used for first repetition PUSCH transmission, and otherwise, the size of the TB is determined by the average TB size according to the number of REs used for all repetition transmissions.

Hereinafter, in the present specification, a method of interpreting scheduling information of PDSCH or PUSCH will be described.

The base station may configure a set (or table) of assignment information of possible PUSCH time domains via an RRC signal in order to indicate assignment information of the time and frequency domains of PUSCH to the terminal, and may indicate one piece of time domain assignment information in the configured set (or table) by DCI for scheduling of PUSCH. In order to configure a set (or table) of assignment information of the time domain of PUSCH, the base station may indicate, via the RRC signal, a relative PUSCH start symbol index ($S_{start}'$) and a length of PUSCH ($L_{symbols}$) to the terminal through SLIV using Equation 7 as follows.

if $L_{symbols}-1 \leq \text{floor}(N_{symbols}/2)$ then $\text{SLIV} = N_{symbols}(L_{symbols}-1) + S_{start}'$ else $\text{SLIV} = N_{symbols}(N_{symbols}-L_{symbols}+1) + (N_{symbols}-1-S_{start}')$ [Equation 7]

Where $L_{symbols} \geq 1$ and shall not exceed $N_{symbols}-S_{start}'$.

In this case, $N_{symbols}$ is the number of symbols included in a slot and is 14.

The terminal may obtain, from $S_{start} = S_{start}'+R$, an index ($S_{start}$) of a start symbol to which PUSCH is actually assigned, on the basis of the relative PUSCH start symbol index ($S_{start}'$) obtained via an SLIV value calculated using Equation 7. Here, R is a reference symbol index value of the PUSCH start symbol index ($S_{start}'$). An $S_{start}$ value is an index of a symbol in which PUSCH transmission starts in a slot, and may have one value in the range of {0, 1, . . . , $N_{symbols}-1$} if $N_{symbols}$ OFDM symbols are included in one slot.

Hereinafter, in the present specification, a method of determining an R value will be described.

The terminal may always assume that R=0. That is, an index of a reference symbol may always be fixed to a first symbol of a slot. This is a method in which a first symbol is a symbol corresponding to a symbol index indicated by an SLIV, in a symbol duration in which PUSCH is actually transmitted.

SLIV may be calculated using Equation 8.

If $L+S \leq 14$, then if $(L-1) \leq 7$ $\text{SLIV} = 14*(L-1)+S,$ else $\text{SLIV} = 14*(14-L+1)+(14-1-S)$ If $L+S > 14$, then if $(L-1) \leq 6$ $\text{SLIV} = 14*(14-L+1)+(14-1-S)$ else $\text{SLIV} = 14*(L-1)+S$ [Equation 8]

S indicates a start symbol of PUSCH in a slot and has one value among 0, 1, 2, . . . , 13, and L is the number of symbols occupied by PUSCH. If PUSCH is configured to be repeatedly transmitted, L is a length of first repetition transmission of PUSCH. If L+S is less than or equal to 14 (in this case, PUSCH is located in one slot), L+S has the same value as SLIV in Rel-15, and if L+S is greater than 14 (in this case, PUSCH is located across two slots), a value other than the SLIV in Rel-15 is used. Therefore, SLIV values for all combinations of S=0, 1, . . . , 13 and L=1, 2, . . . , 14 may be defined. The terminal may determine an S value and an L value from an SLIV value. SLIV values for Equation 8 are shown in Table 5 below. In Table 5 below, the horizontal axis is S=0, 1, . . . , 13, and the vertical axis is L=1, 2, . . . , 14. Values in the table are SLIV values.

TABLE 5

| | S = 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| L = 1 | 0 | 1 | 2 | 3 | 4 | 5 | 6 | 7 | 8 | 9 | 10 | 11 | 12 | 13 |
| 2 | 14 | 15 | 16 | 17 | 18 | 19 | 20 | 21 | 22 | 23 | 24 | 25 | 26 | 182 |
| 3 | 28 | 29 | 30 | 31 | 32 | 33 | 34 | 35 | 36 | 37 | 38 | 39 | 169 | 168 |
| 4 | 42 | 43 | 44 | 45 | 46 | 47 | 48 | 49 | 50 | 51 | 52 | 156 | 155 | 154 |
| 5 | 56 | 57 | 58 | 59 | 60 | 61 | 62 | 63 | 64 | 65 | 143 | 142 | 141 | 140 |
| 6 | 70 | 71 | 72 | 73 | 74 | 75 | 76 | 77 | 78 | 130 | 129 | 128 | 127 | 126 |
| 7 | 84 | 85 | 86 | 87 | 88 | 89 | 90 | 91 | 117 | 116 | 115 | 114 | 113 | 112 |
| 8 | 98 | 99 | 100 | 101 | 102 | 103 | 104 | 105 | 106 | 107 | 108 | 109 | 110 | 111 |
| 9 | 97 | 96 | 95 | 94 | 93 | 92 | 118 | 119 | 120 | 121 | 122 | 123 | 124 | 125 |
| 10 | 83 | 82 | 81 | 80 | 79 | 131 | 132 | 133 | 134 | 135 | 136 | 137 | 138 | 139 |
| 11 | 69 | 68 | 67 | 66 | 144 | 145 | 146 | 147 | 148 | 149 | 150 | 151 | 152 | 153 |
| 12 | 55 | 54 | 53 | 157 | 158 | 159 | 160 | 161 | 162 | 163 | 164 | 165 | 166 | 167 |
| 13 | 41 | 40 | 170 | 171 | 172 | 173 | 174 | 175 | 176 | 177 | 178 | 179 | 180 | 181 |
| 14 | 27 | 183 | 184 | 185 | 186 | 187 | 188 | 189 | 190 | 191 | 192 | 193 | 194 | 195 |

The terminal may determine an R value according to a semi-static DL/UL configuration. The semi-static DL/UL configuration indicates that a base station informs a terminal whether each symbol of a slot is for downlink transmission (DL symbol) or for uplink transmission (UL symbol), via a cell-specific RRC signal and a UE-specific RRC signal. A symbol that is not indicated as a DL symbol and a UL symbol is a flexible symbol. A gap for DL/UL switching of the terminal may be located in a flexible symbol. When a flexible symbol index starting immediately subsequent to DL symbols of a slot, to which PUSCH is allocated, is denoted as X, the terminal may assume that a reference symbol index (R) of PUSCH is X. That is, the terminal may assume that the flexible symbol immediately subsequent to the DL symbol in the slot is the reference symbol index. When the flexible symbol index starting immediately subsequent to DL symbols of the slot, to which PUSCH is allocated, is denoted as X, the terminal may assume that the reference symbol index (R) of PUSCH is X+Y. Y may be a value indicating the number of symbols for a gap for DL transmission and UL transmission. The number Y of symbols for a gap may be obtained via a timing advance (TA) value and an OFDM symbol length, or may be set/configured for the terminal by the base station. A Y value may be 1 or 2.

The terminal may determine an R value according to CORESET in which PDCCH is received. Specifically, the terminal may obtain an R value from indices of OFDM symbol(s) in which CORESET having received DCI for scheduling of PUSCH, which is transmitted from the base station, is located. Since CORESET is a downlink signal, PUSCH cannot be scheduled for a symbol corresponding to CORESET. Also, PUSCH transmission scheduling cannot be performed before CORESET. Accordingly, a symbol in which the terminal can be scheduled with PUSCH transmission earliest is a symbol immediately subsequent to CORESET. Therefore, an index of a symbol immediately subsequent to CORESET may be used as a reference symbol index for determining a start symbol of PUSCH. For example, if an index of an OFDM symbol, in which CORESET having received DCI for scheduling of PUSCH transmission starts, is K and a length of CORESET is D, the terminal may obtain a reference symbol index R via K+D. As another example, a gap for Rx-to-Tx switching is required for the terminal to transmit PUSCH immediately after receiving CORESET. Accordingly, the reference symbol index may be determined in consideration of the gap. For example, if an index of an OFDM symbol, in which CORESET having received DCI for scheduling of PUSCH transmission starts, is K and a length of CORESET is D, the terminal may obtain a reference symbol index R via K+D+Y. Y is the number of gap symbols, and may be 1 or 2. When the base station configures/indicates the terminal to transmit PUSCH by using a slot in which PDCCH for scheduling of PUSCH is received, the terminal may determine a reference symbol index by means of the aforementioned method. However, if the base station configures/indicates the terminal to transmit PUSCH by using a slot other than the slot in which PDCCH for scheduling of PUSCH is received, the terminal may assume that R=0. That is, the terminal may determine whether the slot to which PUSCH is assigned and the slot to which PDCCH is assigned are the same, and then may determine an R value. In order for the terminal to transmit PUSCH immediately after receiving CORESET, time for calculating PUSCH is required. A minimum time required to calculate PUSCH after reception of PDCCH is referred to as a PUSCH preparation time ($T_{proc,2}$). That is, the terminal does not expect PUSCH transmission to be configured/indicated by the base station before the PUSCH preparation time. By using this information, the terminal may determine a reference symbol index. For example, if an index of an OFDM symbol, in which CORESET having received DCI for scheduling of PUSCH transmission starts, is K and a length of CORESET is D, the terminal may obtain a reference symbol index (R) via (K+D+T) mod $N_{symbols}$. Here, T is a value indicating the PUSCH preparation time by using the number of symbols. A reason for performing mod $N_{symbols}$ is to allow a reference symbol index to have one of values among 0, 1, . . . , 13 because the reference symbol index should be located in a slot. If the terminal is scheduled with PUSCH in a slot including a symbol after T symbols from a symbol immediately subsequent to CORESET, the reference symbol index (R) may be assumed to be (K+D+T)

mod $N_{symbols}$, and if a slot subsequent to the slot is indicated, the reference symbol index R may be assumed to be 0.

If subcarrier spacings (SCS) of a cell in which PDCCH is scheduled and a cell in which PUSCH is scheduled are different, an index K of the symbol in which the CORESET starts and a length L value of the CORESET may be ambiguous. For example, if an SCS (hereinafter, SCS1) of a first cell in which PDCCH is scheduled is greater than an SCS (hereinafter, SCS2) of a second cell in which PUCCH is scheduled, one symbol of the first cell and multiple symbols of the second cell overlap. In this case, a symbol corresponding to the index (K) of the symbol in which CORESET starts may be an earliest symbol among the symbols of the second cell, which overlaps the symbol in which CORESET of the first cell starts. A length of the symbol of the second cell, which overlaps CORESET of the first cell may be obtained by multiplying a length of CORESET of the first cell by SCS2/SCS1. Specifically, if the length of one symbol in the first cell is T, the length of one symbol in the second cell is T*SCS2/SCS1. Accordingly, when assuming that a symbol duration including CORESET in the first cell is 2 symbols, a symbol duration in which PUCCH in the second cell is scheduled is 2*SCS2/SCS1. For example, when SCS2 is 15 KHz and SCS1 is 30 KHz, CORESET of the first cell, which has a length of 2 symbols, overlaps 1 symbol (2*15 KHz/30 KHz) of the second cell.

Hereinafter, in the present specification, a position of a DM-RS when PUSCH is repeatedly transmitted will be described. A time domain resource assignment (TDRA) field of DCI for scheduling of PUSCH may indicate not only a length of PUSCH but also a DM-RS location of PUSCH. If the terminal is indicated with PUSCH mapping type A, a DM-RS of PUSCH may be transmitted at a fixed position within a slot. If the terminal is indicated with PUSCH mapping type B, the DM-RS of PUSCH may be transmitted in a first symbol among symbols to which PUSCH is allocated. That is, if the terminal is indicated with PUSCH mapping type B, the DM-RS may be transmitted in another symbol within the slot according to PUSCH scheduling.

If the base station configures/indicates the terminal to repeatedly transmit PUSCH, and the terminal is indicated with PUSCH mapping type A, the DM-RS should be transmitted at a fixed position (symbol) of the slot according to PUSCH mapping type A. However, in a case of mini-slot-level repetition PUSCH transmission, a symbol duration used for first repetition PUSCH transmission includes a symbol in which a DM-RS is located (mapped) so that transmission of the DM-RS is possible, but a symbol duration used for second repetition PUSCH transmission may not include a symbol to which the DM-RS is mapped. Therefore, when the terminal performs repetition PUSCH transmission, it is necessary to determine where the DM-RS is mapped to so as to be transmitted. Hereinafter, in the present specification, a DM-RS transmission method will be described.

First, provided is a method in which, in first repetition PUSCH transmission, a DM-RS is transmitted on a mapped symbol according to PUSCH mapping type A, and in second repetition PUSCH transmission and subsequent repetition PUSCH transmission thereof, a DM-RS is mapped to a symbol according to PUSCH mapping type B so as to be transmitted. In other words, in the second repetition PUSCH transmission and subsequent repetition PUSCH transmission thereof, the DM-RS may be transmitted on a first symbol in which each repetition PUSCH transmission is performed.

Next, provided is a method in which, even though the terminal is indicated with PUSCH mapping type A via DCI, the terminal transmits a DM-RS in consideration of PUSCH mapping type B. The difference from the above-described method is that the terminal follows PUSCH mapping type B even in first repetition PUSCH transmission, instead of following PUSCH mapping type A.

Figure 28:
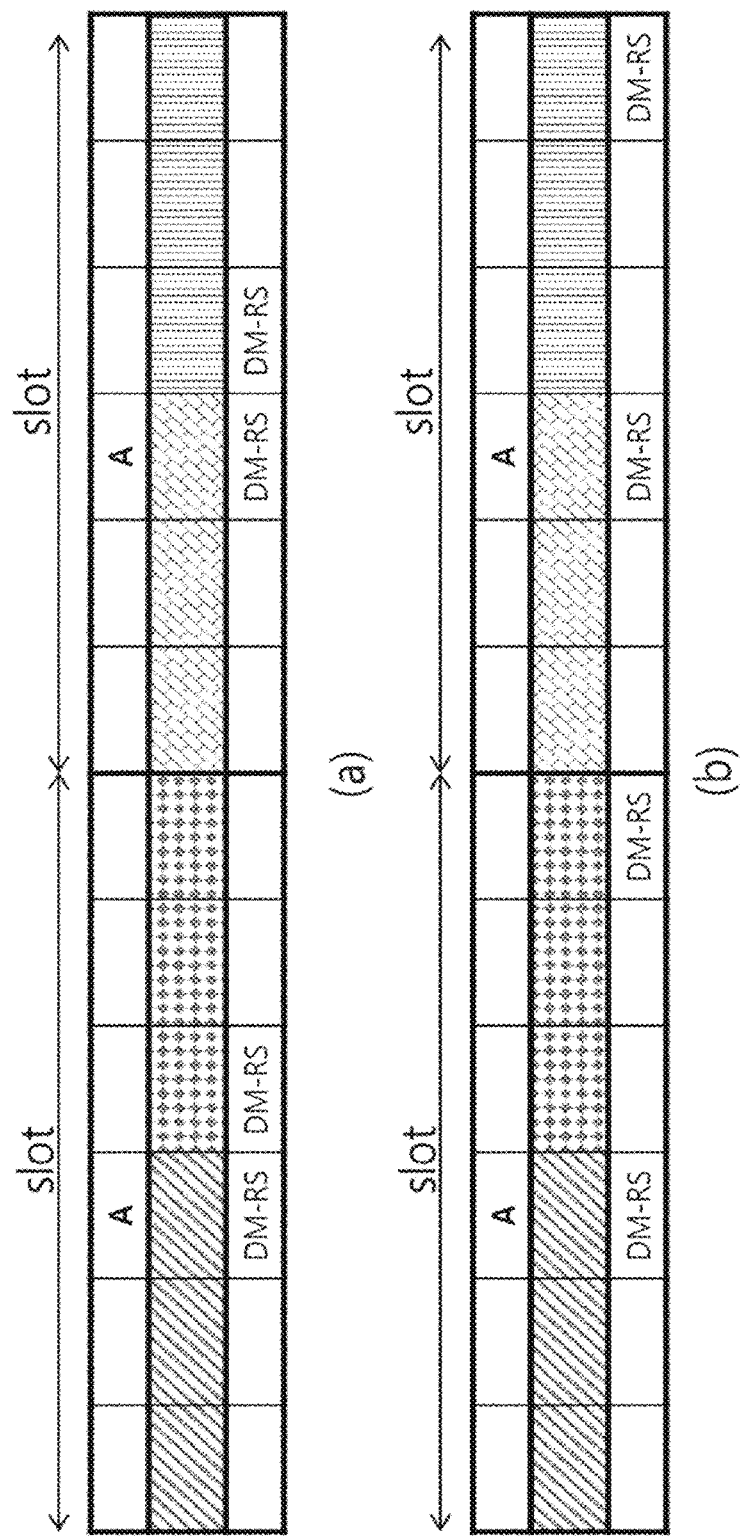
FIG. 28 is a diagram for a method of locating a DM-RS in repetition PUSCH transmission according to an embodiment of the present disclosure.

FIG. 28 is a diagram for a method of locating a DM-RS in repetition PUSCH transmission according to an embodiment of the present disclosure.

Next, provided is a method in which, if repetition PUSCH transmission includes a DM-RS symbol according to PUSCH mapping type A, a DM-RS is transmitted according to mapping time A and, otherwise, a DM-RS symbol is transmitted according to PUSCH mapping type B. Referring to FIG. 28(a), a slot includes 6 symbols, and when a third symbol of each slot corresponds to a position to which a DM-RS according to PUSCH mapping type A is mapped, since a symbol duration in which first repetition PUSCH transmission (first slot symbol 0 to symbol 2) and third repetition PUSCH transmission (second slot symbol 0 to symbol 2) are performed includes a DM-RS position (third symbol in slot, i.e., symbol 2 in each slot) according to mapping type A, a terminal transmits a DM-RS in the symbol. The remaining symbol durations in which second and fourth repetition PUSCH transmissions are performed do not include the DM-RS position, and the terminal may thus transmit a DM-RS in a first symbol in the symbol durations in which repetition PUSCH transmission is performed.

Subsequently, first repetition PUSCH transmission transmits a DM-RS in a DM-RS symbol according to PUSCH mapping type A, and second repetition PUSCH transmission and subsequent repetition PUSCH transmission transmit a DM-RS at the same position as that of the first repetition PUSCH transmission in PUSCH. Referring to FIG. 28(b), a DM-RS by PUSCH mapping type A is located in a third symbol in a symbol duration in which first repetition PUSCH transmission is performed. Accordingly, a DM-RS according to PUSCH mapping type A is also located in a third symbol of a symbol duration, in which repetition PUSCH transmission is performed, in subsequent repetition PUSCH transmission in the same manner. This is to locate DM-RSs at equal intervals in the time domain in order to minimize a channel estimation error in a time varying channel.

Hereinafter, in the present specification, a position of a DM-RS of PUSCH according to a reference symbol index will be described. A TDRA field of DCI for scheduling of PUSCH may indicate not only a length of PUSCH but also a DM-RS position of PUSCH. However, if a reference symbol index (R) is not fixed to 0, there may be a case in which symbols in which PUSCH is scheduled do not include a symbol in which a DM-RS according to PUSCH mapping type A is located. In the current 3GPP standards, since R is always fixed to 0, PUSCH symbols indicated by the TDRA field indicating SLIV and PUSCH mapping type A always include a symbol in which a DM-RS according to PUSCH mapping type A is located.

Hereinafter, in the present specification, a method of determining a position to which a DM-RS is mapped in PUSCH will be described.

i) If a symbol to which a DM-RS according to PUSCH mapping type A is mapped is included in PUSCH indicated using a reference symbol index, the DM-RS is transmitted in the symbol, and otherwise, the DM-RS may be transmitted according to PUSCH mapping type B. That is, if PUSCH determined according to the reference symbol index does not include a symbol in which a DM-RS according to PUSCH mapping type A is located, the DM-RS may be transmitted in a first symbol of PUSCH.

ii) If a terminal is indicated with PUSCH mapping type A by a base station, the terminal may always assume that R=0 (that is, a symbol corresponding to the reference symbol index is a first symbol of the slot), and when the terminal is indicated with PUSCH mapping type B by the base station, R may be determined according to the aforementioned method. As such, by interpreting the reference symbol index differently according to a PUSCH mapping type, even if the terminal is indicated with PUSCH mapping type A by the base station, a case of not including a symbol to which a DM-RS is mapped does not occur.

Hereinafter, in the present specification, a method of determining a reference symbol index of PDSCH will be described. As described above, similar to the method of determining a reference symbol index of PUSCH, a method of determining a reference symbol index (R) is also required in a case of downlink PDSCH.

The terminal may determine a reference symbol index of PDSCH, based on CORESET. Specifically, a first symbol of CORESET in which PDCCH for scheduling of PDSCH is received may be a reference symbol index of PDSCH. For example, if a first symbol of CORESET in which PDCCH is received is an R-th symbol of a slot, and an SLIV of a TDRA field of the PDCCH indicates S and L, PDSCH may start at an R+S-th symbol of the slot and may have a length of L.

Hereinafter, in the present specification, a method of determining a reference symbol index of PDSCH when cross-carrier scheduling is indicated will be described. If an SCS of a cell in which PDCCH is received and an SCS of a cell in which PDSCH is received are the same, a first symbol of CORESET in which PDCCH is received may be determined as a reference symbol of PDSCH. However, if the SCS of the cell in which PDCCH is received and the SCS of the cell in which PDSCH is received are different, the method described below may be considered.

Figure 29:
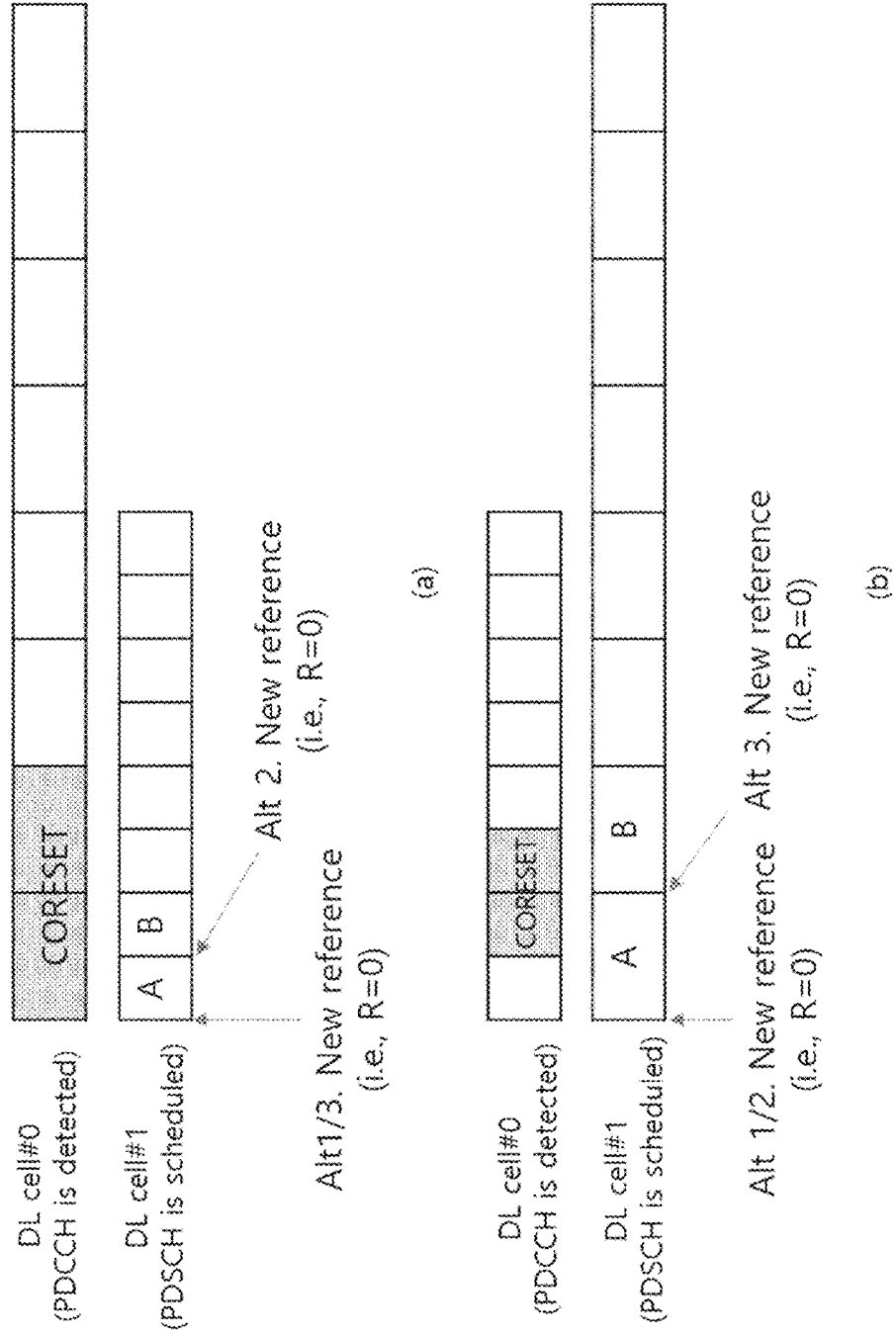
FIG. 29 is a diagram illustrating a method of determining a reference symbol index of PDSCH according to an embodiment of the present disclosure.

FIG. 29 is a diagram illustrating a method of determining a reference symbol index of PDSCH according to an embodiment of the present disclosure.

i) If an SCS of a cell in which PDCCH is received and an SCS of a cell in which PDSCH is received are different, an index of an earliest symbol among symbols of a cell in which PDSCH overlapping a first symbol of CORESET of the PDCCH is transmitted may be determined as a reference symbol index of PDSCH. FIG. 29(a) shows a case in which the SCS of the cell (DL cell #0) in which PDCCH is received is smaller than that of the cell (DL cell #1) in which PDSCH is received. The first symbol of CORESET of PDCCH and two symbols (A and B) of the cell in which PDSCH is received may overlap. An index of a preceding symbol A among the two symbols may be determined as a reference symbol index of PDSCH. If the first symbol of CORESET is symbol n of a slot of the cell in which PDCCH is received, the reference symbol index in the cell in which PDSCH is received is floor $(n*2^{u1-u0})$ mod $N_{symbol}$. Here, the SCS of the cell in which PDCCH is received is $2^{u1}$ kHz, the SCS of the cell in which PDSCH is received is $2^{u2}$ kHz, and $N_{symbol}$ is the number of symbols included in one slot.

ii) If an SCS of a cell in which PDCCH is received and an SCS of a cell in which PDSCH is transmitted are different, a latest symbol among symbols of the cell, in which PDSCH is transmitted, which overlap a first symbol of CORESET of the PDCCH may be determined as a reference symbol index of PDSCH. FIG. 29(a) shows a case in which the SCS of the cell (DL cell #0) in which PDCCH is received is smaller than that of a cell (DL cell #1) in which PDSCH is received. The first symbol of CORESET of PDCCH and two symbols (A and B) of the cell in which PDSCH is received may overlap. In this case, an index of a last symbol (B) of the two symbols may be determined as a reference symbol index of PDSCH. If the first symbol of CORESET is symbol n of a slot of the cell in which PDCCH is received, the reference symbol index in the cell in which PDSCH is received is ceil $((n+1)*2^{u1-u0})-1$ mod $N_{symbol}$. Here, the SCS of the cell in which PDCCH is received is $2^{u1}$ kHz, the SCS of the cell in which PDSCH is received is $2^{u2}$ kHz, and $N_{symbol}$ is the number of symbols included in one slot.

iii) The aforementioned methods i) and ii) have a problem that an index of a symbol starting before CORESET of PDCCH may be a reference symbol index of PDSCH. If an index of a symbol starting before CORESET of PDCCH is a reference symbol index of PDSCH, a terminal needs to buffer the preceding symbol. For example, FIG. 29(b) shows a case in which the SCS of the cell (DL cell #0) in which PDCCH is received is greater than that of the cell (DL cell #1) in which PDSCH is received. In this case, the first symbol of CORESET overlaps one symbol A of the cell in which PDSCH is received. When the aforementioned methods i) and ii) are applied, an index of symbol A is determined as a reference symbol index. However, symbol A starts before the first symbol of CORESET, and thus the terminal needs to perform buffering, which causes a problem of increasing complexity.

Accordingly, in order to solve this problem, an index of an earliest symbol among symbols of the cell in which PDSCH is received, which do not precede the first symbol of CORESET of PDCCH, may be determined as a reference symbol index. In FIG. 29(b), symbol A starts before the first symbol of CORESET, so that the index of symbol A cannot be a reference symbol index. Therefore, an index of subsequent symbol B may be determined as a reference symbol index. Referring to FIG. 29(a), the SCS of the cell (DL cell #0) in which PDCCH is received is smaller than that of the cell (DL cell #1) in which PDSCH is received, wherein symbol A and the first symbol of CORESET start at the same time. Therefore, the index of symbol A may be determined as a reference symbol index.

A method of determining a reference symbol index by a terminal on the basis of CORESET may not be applied to cross-carrier scheduling. That is, the terminal does not expect an RRC configuration in which a method of determining a reference symbol index on the basis of CORESET and cross-carrier scheduling are simultaneously applied. In other words, the terminal may treat this as an error case.

When the terminal is indicated with cross-carrier scheduling, the terminal may determine a first symbol index of a slot to be a reference symbol index, and in a case of self-carrier scheduling (i.e., if PDCCH and PDSCH are transmitted in the same cell), the terminal may determine a reference symbol index according to methods i) to iii) described above. The terminal is indicated with cross-carrier scheduling, and if the SCS of the cell in which PDCCH is received and the SCS of the cell in which PDSCH is received are different, a first symbol index of the slot may be determined as a reference symbol index, and in a case of self-carrier scheduling or if the SCS of the cell in which PDCCH is received and the SCS of the cell in which PDSCH is received are the same, a reference symbol index may be determined according to methods i) to iii) described above.

The method of determining a reference symbol index of PDSCH may be applied when PDCCH and PDSCH are received in the same slot. In other words, the method may be applied when the number (K0) between a slot in which PDCCH is received and a slot in which reception of the PDSCH is scheduled is 0. That is, if K0 is 0, PDCCH and PDSCH may be located in the same slot. The method of determining a reference symbol index of the PDSCH may be applied when PDSCH mapping type B is indicated (when a value of K0 is 0). The method of determining a reference symbol index of PDSCH may be applied when PDCCH and PDSCH are received in the same slot (when a value of K0 is 0) and PDSCH mapping type B is indicated (when a value of K0 is 0). If the aforementioned method is not applied, the terminal may determine an index of a first symbol of the slot, as a reference symbol index of PDSCH.

Hereinafter, in the present specification, a method of determining a position of a DM-RS of PDSCH according to a reference symbol index will be described. A TDRA field of DCI for scheduling of PDSCH may indicate not only a length of PDSCH but also a DM-RS position of PDSCH. However, if a reference symbol index (R) of PDSCH is not fixed to 0, symbols in which PDSCH is scheduled may not include a symbol in which a DM-RS according to PDSCH mapping type A is mapped. In the current 3GPP standards, since R is always fixed to 0, PDSCH symbols indicated by a TDRA field indicating SLIV and PDSCH mapping type A always include a symbol in which a DM-RS according to PDSCH mapping type A is mapped. In the present disclosure, it is necessary to determine a position at which a DM-RS should be transmitted in the PDSCH.

If PDSCH configured/indicated based on a reference symbol index includes a symbol in which a DM-RS according to PDSCH mapping type A should be transmitted, the DM-RS is transmitted on the symbol, and otherwise the DM-RS may be transmitted according to PDSCH mapping type B. That is, if PDSCH configured/indicated based on a reference symbol index does not include a symbol in which a DM-RS according to PDSCH mapping type A should be transmitted, the DM-RS may be transmitted in a first symbol of PDSCH.

As another embodiment of the present disclosure, if the terminal is indicated with PDSCH mapping type A, the terminal always considers that R=0 (i.e., it is assumed that a reference index is a first symbol of a slot), and in a case of PDSCH mapping type B, R may be determined according to the aforementioned embodiment. As such, by interpreting a reference index differently according to a PDSCH mapping type, in a case of PDSCH mapping type A, a case where a DM-RS symbol is not included does not occur.

Figure 30:
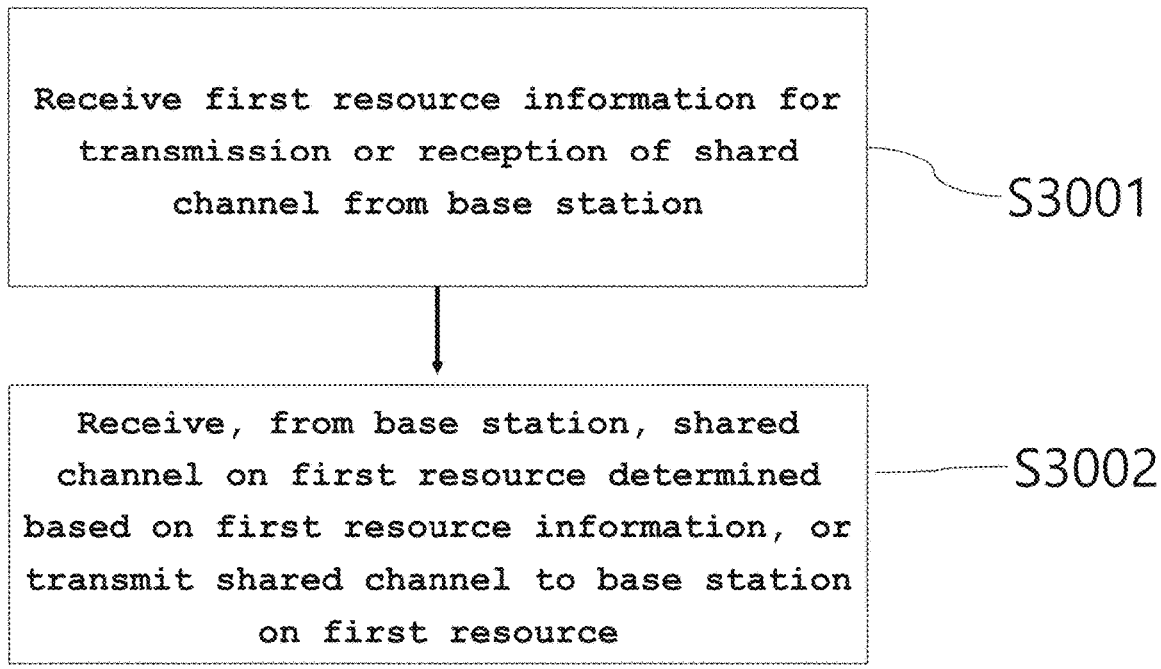
FIG. 30 is a flowchart illustrating an operation procedure in a terminal performing a method of transmitting a shared channel according to an embodiment of the present disclosure.

FIG. 30 is a flowchart illustrating an operation procedure in a terminal performing a method of transmitting a shared channel according to an embodiment of the present disclosure.

That is, illustrated is a procedure of performing the methods (embodiments) described with reference to FIG. 12 to FIG. 29 by a terminal.

First, a terminal receives, from a base station, first resource information for transmission or reception of a shared channel, in S3001.

The first resource information may include a relative start symbol index and a symbol length in a time domain resource for transmission or reception of the shared channel.

The terminal receives the shared channel from the base station on a first resource determined based on the first resource information or transmits the shared channel to the base station on the first resource, in S3002.

A start symbol index of the first resource may be determined based on the relative start symbol index and a predefined reference symbol index.

The reference symbol index may be 0 or may be determined based on a length and a start symbol of a resource including the first resource information.

The first resource may be determined based on a first subcarrier spacing (SCS) of a first cell including the first resource information and a second SCS of a second cell including the shared channel.

If the first SCS and the second SCS are the same, the reference symbol index may be an index of a first symbol among symbols including the first resource information of the first cell.

If the first SCS is smaller than the second SCS, the reference symbol index may be an index of an earliest symbol among symbols including the shared channel of the second cell, which overlap in the time domain with symbols including the first resource information of the first cell.

If the first SCS is smaller than the second SCS, the reference symbol index may be an index of a last symbol among symbols including the shared channel of the second cell, which overlap in the time domain with symbols including the first resource information of the first cell.

If the first SCS is greater than the second SCS, the reference symbol index may be an index of an earliest symbol among symbols that do not precede symbols including the first resource information, from among symbols including the shared channel of the second cell, which overlap in the time domain with symbols of the first cell.

The first resource information may further include a first position of a demodulation-reference signal (DM-RS) mapped to the first resource.

If the first resource includes the first position, the DM-RS may be mapped to the first position, and if the first resource does not include the first position, the DM-RS may be mapped to a symbol indicated by the start symbol index of the first resource.

If the shared channel is transmitted first on the first resource and repeatedly transmitted second on a second resource, the DM-RS may be mapped to the first position in the first resource, and the DM-RS may be mapped to a first symbol of the second resource in the second resource.

If the shared channel is transmitted first on the first resource and repeatedly transmitted second on the second resource, the DM-RS may be mapped to the first position in the first resource. In the second resource, the DM-RS is mapped to a position corresponding to the first position, and the corresponding position may be a position separated from a first symbol of a second duration by a duration that the first position and a first symbol of the first resource are separated.

The DM-RS may be mapped to a symbol indicated by the start symbol index of the first resource regardless of the first position.

The terminal may receive, from the base station, second resource information for transmission or reception of the shared channel.

The second resource information may include information on a use of multiple symbols constituting a slot of the first resource.

The reference symbol index may be determined based on the first resource information and the second resource information.

When the terminal transmits the shared channel to the base station on the first resource, the reference symbol index is an index of a symbol which has a direction configured to flexible and is immediately subsequent to a last symbol the use of which is configured to downlink from among the multiple symbols.

The use of symbols may have the same meaning as the aforementioned symbol direction. Specifically, the use of symbols indicates whether a symbol is used for downlink transmission, is used for uplink transmission, or is a flexible symbol that may be used for either one of downlink and uplink.

When the terminal transmits the shared channel to the base station on the first resource, the reference symbol index may be an index of a symbol which has a use configured to flexible or uplink and is immediately subsequent to a gap symbol located after a last symbol the use of which is configured to downlink, from among the multiple symbols.

Although the method and system of the present disclosure have been described in connection with specific embodiments, some or all of their components or operations may be implemented using a computing system having a general-purpose hardware architecture.

The above description of the present disclosure is for illustrative purposes only, and those of ordinary skill in the art to which the present disclosure pertains will be able to understand that other specific forms can be easily modified without changing the technical spirit or essential features of the present disclosure. Therefore, it should be understood that the embodiments described above are illustrative and non-limiting in all respects. For example, each component described as a single type may be implemented in a distributed manner, and similarly, components described as being distributed may also be implemented in a combined form.

The scope of the present disclosure is indicated by the claims to be described later rather than the detailed description, and all changes or modified forms derived from the meaning and scope of the claims and their equivalent concepts should be construed as being included in the scope of the present disclosure.

The invention claimed is:

1. A method for transmitting or receiving a shared channel by a terminal in a wireless communication system, the method comprising:
receiving, from a base station, first resource information for transmission or reception of a shared channel on a control channel,
wherein the first resource information includes information related to a symbol length and a relative start symbol index in a time domain resource for transmission or reception of the shared channel; and
receiving, from the base station, the shared channel on a first resource determined based on the first resource information, or transmitting, to the base station, the shared channel on the first resource,
wherein a start symbol index of the first resource is determined based on the relative start symbol index and a reference symbol index,
wherein the first resource is determined based on a first subcarrier spacing (SCS) for the control channel and a second SCS for the shared channel.

2. The method of claim 1,
wherein the reference symbol index is an index of an earliest symbol among symbols for monitoring the control channel.

3. The method of claim 1,
wherein the reference symbol index is determined based on a length and a start symbol of a resource comprising the first resource information.

4. The method of claim 1,
wherein the control channel is included in a first cell, and wherein the shared channel is included in a second cell.

5. The method of claim 4,
wherein, if the first SCS and the second SCS are the same, the reference symbol index is an index of an earliest symbol among symbols for monitoring the control channel.

6. The method of claim 4,
wherein, if the first SCS is smaller than the second SCS, the reference symbol index is an index of an earliest symbol among symbols comprising the shared channel of the second cell, which overlap in the time domain with symbols for monitoring the control channel.

7. The method of claim 4,
wherein, if the first SCS is smaller than the second SCS, the reference symbol index is an index of a last symbol among symbols comprising the shared channel of the second cell, which overlap in the time domain with symbols for monitoring the control channel.

8. The method of claim 4,
wherein, if the first SCS is greater than the second SCS, the reference symbol index is an index of an earliest symbol among symbols that do not precede symbols for monitoring the control channel, from among symbols comprising the shared channel of the second cell, which overlap in the time domain with symbols of the first cell.

9. The method of claim 1,
wherein the first resource information further includes information related to a first position of a demodulation-reference signal (DM-RS) mapped to the first resource.

10. The method of claim 9,
wherein, if the first resource includes the first position, the DM-RS is mapped to the first position, and
wherein, if the first resource does not include the first position, the DM-RS is mapped to a symbol indicated by the start symbol index of the first resource.

11. The method of claim 9,
wherein, if the shared channel is transmitted firstly on the first resource and is repeatedly transmitted secondly on a second resource,
wherein the DM-RS is mapped to the first position in the first resource, and
wherein the DM-RS is mapped to a first symbol in the second resource.

12. The method of claim 9,
wherein, if the shared channel is transmitted firstly on the first resource and is repeatedly transmitted secondly on a second resource,
wherein the DM-RS is mapped to the first position in the first resource,
wherein the DM-RS is mapped to a position corresponding to the first position in the second resource, and
wherein the corresponding position is a position separated from a first symbol of a second duration by a duration that the first position and a first symbol of the first resource are separated.

13. The method of claim 9,
wherein the DM-RS is mapped to a symbol indicated by the start symbol index of the first resource regardless of the first position.

14. The method of claim 1, further comprising:
receiving, from the base station, second resource information for transmission or reception of the shared channel, wherein the second resource information includes comprises information on a use of multiple symbols constituting a slot of the first resource, and wherein the reference symbol index is determined based on the first resource information and the second resource information.

15. The method of claim 14, wherein, if the shared channel is transmitted to the base station on the first resource, wherein the reference symbol index is an index of a symbol, which has a direction configured to flexible and is immediately subsequent to a last symbol the use of which is configured to downlink, from among the multiple symbols.

16. The method of claim 14, wherein, if the shared channel is transmitted to the base station on the first resource, wherein the reference symbol index is an index of a symbol, which has a use configured to flexible or uplink and is immediately subsequent to a gap symbol located after a last symbol the use of which is configured to downlink, from among the multiple symbols.

17. A terminal for transmitting or receiving a shared channel in a wireless communication system, the terminal comprising:

a transceiver;

a processor; and a memory connected to the processor and configured to store instructions for operations executed by the processor, wherein the operations comprise:

receiving, from a base station, first resource information for transmission or reception of a shared channel on a control channel, wherein the first resource information includes information related to a symbol length and a relative start symbol index in a time domain resource for transmission or reception of the shared channel; and receiving, from the base station, the shared channel on a first resource determined based on the first resource information, or transmitting, to the base station, the shared channel on the first resource, wherein a start symbol index of the first resource is determined based on the relative start symbol index and a reference symbol index;

wherein the first resource is determined based on a first subcarrier spacing (SCS) for the control channel and a second SCS for the shared channel.

18. The terminal of claim 17, wherein the reference symbol index is an index of an earliest symbol among symbols for monitoring the control channel.

19. The terminal of claim 17, wherein the reference symbol index is determined based on a resource comprising the first resource information.

20. The terminal of claim 17, wherein the control channel is included in a first cell, and wherein the shared channel is included in a second cell.

* * * * *